United States Patent
Delefevre

(10) Patent No.: US 9,734,262 B2
(45) Date of Patent: Aug. 15, 2017

(54) METHOD AND SYSTEM FOR UNDERSTANDING TEXT

(71) Applicant: Patrick Delefevre, Belmont, MA (US)

(72) Inventor: Patrick Delefevre, Belmont, MA (US)

(*) Notice: Subject to any disclaimer, the term of this patent is extended or adjusted under 35 U.S.C. 154(b) by 335 days.

(21) Appl. No.: 13/987,797

(22) Filed: Sep. 4, 2013

(65) Prior Publication Data

US 2014/0067376 A1  Mar. 6, 2014

Related U.S. Application Data

(60) Provisional application No. 61/743,482, filed on Sep. 5, 2012.

(51) Int. Cl.
*G06F 17/27* (2006.01)
*G06F 17/30* (2006.01)

(52) U.S. Cl.
CPC .............. *G06F 17/30976* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC ............... 704/1, 9, 10; 707/706–708
See application file for complete search history.

(56) References Cited

U.S. PATENT DOCUMENTS

| | | | | |
|---|---|---|---|---|
| 5,398,199 | A * | 3/1995 | Lefons | G06F 17/30542 708/446 |
| 6,711,563 | B1 * | 3/2004 | Koskas | G06F 17/30324 707/600 |
| 7,013,308 | B1 * | 3/2006 | Tunstall-Pedoe | G06F 17/30654 707/709 |
| 2002/0095397 | A1 * | 7/2002 | Koskas | G06F 17/30324 |
| 2002/0095421 | A1 * | 7/2002 | Koskas | G06F 17/30595 |
| 2003/0233224 | A1 * | 12/2003 | Marchisio | G06F 17/271 704/4 |
| 2004/0064438 | A1 * | 4/2004 | Kostoff | G06F 17/30705 |
| 2005/0177558 | A1 * | 8/2005 | Dixon | G06F 17/30507 |
| 2005/0187905 | A1 * | 8/2005 | Dixon | G06F 17/30507 |
| 2006/0200431 | A1 * | 9/2006 | Dwork | G06F 17/30539 706/12 |
| 2008/0052268 | A1 * | 2/2008 | Koudas | G06F 17/30469 |
| 2008/0235208 | A1 * | 9/2008 | Rouhani-Kalleh | G06F 17/30864 |
| 2009/0319503 | A1 * | 12/2009 | Mehul | H04W 4/02 |
| 2010/0042588 | A1 * | 2/2010 | Smyros | G06F 17/30613 707/706 |

(Continued)

*Primary Examiner* — Lamont Spooner
(74) *Attorney, Agent, or Firm* — Hayes Soloway PC

(57) ABSTRACT

A query answer engine converts a query and answers into a non-natural language forming units that correspond to words, symbols, numbers and spaces and combinations of the above, and establishes the contextual meaning of the units utilizing read, recognize and relate processes to populate a query matrix and an answer matrix with 3-valued points corresponding to the read, recognize and relate values of a unit. The two matrices are cross correlated to yield a robust answer to a query taking into account context. The conversion of text to units uses contextual meaning parametric tables, databases, libraries, rules and an engine for determining the focal point of a query or an answer.

18 Claims, 57 Drawing Sheets

(56) References Cited

U.S. PATENT DOCUMENTS

| | | | |
|---|---|---|---|
| 2010/0042589 A1* | 2/2010 | Smyros | G06F 17/30616 707/710 |
| 2010/0042590 A1* | 2/2010 | Smyros | G06F 17/30616 707/706 |
| 2010/0042602 A1* | 2/2010 | Smyros | G06F 17/30091 707/711 |
| 2010/0042603 A1* | 2/2010 | Smyros | G06F 17/30675 707/711 |
| 2010/0057704 A1* | 3/2010 | Duffie | G06F 11/2268 707/E17.062 |
| 2010/0159438 A1* | 6/2010 | German | G06F 17/30525 434/433 |
| 2011/0258173 A1* | 10/2011 | Ratiner | G06F 17/30637 707/706 |
| 2011/0258196 A1* | 10/2011 | Lepsoy | G06F 17/3069 707/741 |
| 2011/0289081 A1* | 11/2011 | Willits | G06F 17/3043 707/728 |
| 2011/0317923 A1* | 12/2011 | Hondo | G06F 17/30247 382/190 |
| 2012/0084282 A1* | 4/2012 | Chiang | G06F 17/30864 707/725 |
| 2012/0102018 A1* | 4/2012 | Yang | G06F 17/3069 707/709 |
| 2012/0297253 A1* | 11/2012 | Barajas | G06F 11/0727 714/42 |
| 2013/0124488 A1* | 5/2013 | Kang | G06F 17/30958 707/693 |

\* cited by examiner

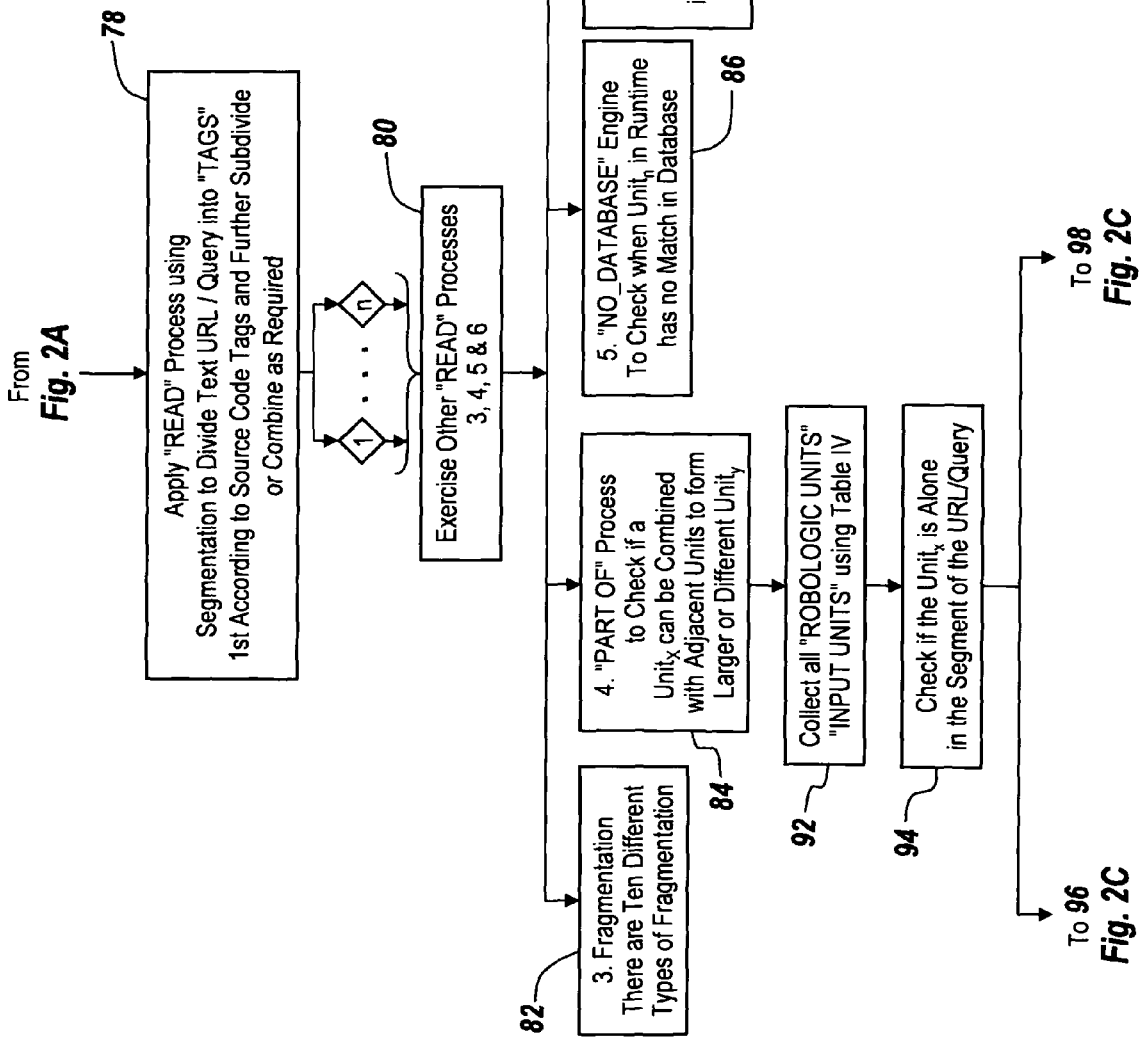

Fig. 10A

Contextual Meaning Parametric Tables

| GETEX | | PATEX | | AU1 | | AU2 | | AU3 | |
|---|---|---|---|---|---|---|---|---|---|
| 1 | Type fo selected category | 21 | Measurement | 37 | Time Factor | 47 | List of "Units" that can be connected to the beginning of Nucleus "Units" | 53 | Action Symbols |
| 2 | types of the rest of the not selected categories | 22 | Quantity | 38 | Choice Factor | 48 | List of "Units" that can be connected to the end of Nucleus "Units" | | |
| 3 | "Parts" of types of selected category | 23 | Rank | 39 | Reason Factor | 49 | List of Neutral units that do not change the TI of Nucleus "Units" | | |
| 4 | "Parts" of the rest of the not selected categories | 24 | Date | 40 | Distance Factor | 50 | List of Neutral units that change the TI of Nucleus "Units" | | |
| 5 | Color | 25 | Time | 41 | Quantity Factor | 51 | Units that adds to the meaning (TI) of Nucleus "Units" | | |
| 6 | Material/Submaterial | 26 | Reference | 42 | Estimation Factor | 52 | Units that negate the meaning (TI) of Nucleus "Units" | | |
| 7 | Shape Pattern | 27 | Price | 43 | Retrieve | | | | |
| 8 | Finish Surface Condition | 28 | Size | 44 | Not Retrieve | | | | |
| 9 | User | 29 | Telephone | 45 | Position Factor | | | | |
| 10 | Function/SubFunction | 30 | Address | 46 | Calculation | | | | |
| 11 | Status | 31 | Insurance | | | | | | |
| 12 | Style | 32 | Warranty | | | | | | |
| 13 | Movement | 33 | Return | | | | | | |
| 14 | Set | 34 | Packing | | | | | | |
| 15 | Maintenance | 35 | Cancellation | | | | | | |
| 16 | Accessories | 36 | Contact | | | | | | |
| 17 | Special Characteristic | | | | | | | | |
| 18 | Animal Parts | | | | | | | | |
| 19 | Human Parts | | | | | | | | |
| 20 | Accounting | | | | | | | | |

Contextual Meaning Parametric Tables

| AU4 | AU5 | AU6 | Characteristic | Proper Noun (PN) |
|---|---|---|---|---|
| 54 Numbers | 55 Countable Nouns | 58 Other Words, (Verbs, Nouns, Adjectives, Adverbs) | 59 Smell | 88 Proper Noun |
| | 56 Users Indicators | | 60 Taste | |
| | 57 Action Units for "Part of" | | 61 Hear | |
| | | | 62 Sight | |
| | | | 63 Touch | |
| | | | 64 Feel | |
| | | | 65 Behavior | |
| | | | 66 Thoughts | |
| | | | 67 Appearance | |
| | | | 68 Change | |
| | | | 69 Experience | |
| | | | 70 Mobility | |
| | | | 71 Static | |
| | | | 72 Abstract | |
| | | | 73 Non Abstract | |
| | | | 74 Tangible | |
| | | | 75 Intangible | |
| | | | 76 Positive | |
| | | | 77 Negative | |
| | | | 78 Possible | |
| | | | 79 Not Possible | |
| | | | 80 Close | |
| | | | 81 Open | |
| | | | 82 Group | |
| | | | 83 Disperse | |
| | | | 84 Connect | |
| | | | 85 Disconnect | |
| | | | 86 Biotic | |
| | | | 87 Abiotic | |

*Fig. 10B*

Having established the format that words must have normal letters, symbols, numbers and spaces, all "words" in Natural Language will be converted to Robologic "Types of Units" which are the basic formats and their combinations

Types of UNITS  Table II

| UNIT | Description | Example |
|---|---|---|
| U1 | Combination of (LET) only | (Table) (Red) (Steel) |
| U2 | Combination of (#) only | (1938) (69) |
| U3 | Combination of (SYB) only | (.) (,) (/) |
| U4 | Combination of U1 + U2 w/o (SP) | (A4) (3D) |
| U5 | Combination of U1 + U3 w/o (SP) | Wed., H", A* (Layout) |
| U6 | Combination of U2 + U3 w/o (SP) | (25-) (25) (25*) |
| U7 | Combination of U1 + U2 + U3 w/o (SP) | (4-Cylinder) (4"tv) (5:00 AM) |

*Fig. 11*

Table III
Forms of Unit Tables

| | | | Example |
|---|---|---|---|
| | | Type-A Nucleus (NUC)<br>"Single Element Unit" (U1) | |
| 1 | U1 | SEU-A | when a "Unit" (U1) SEU-A is reduced its size by taking out letters and still retaines its original contextual meaning, then the smallest size of it is the NUC of the "unit" | Chair<br>Shine<br>Bottom<br>top<br>revenant<br>rose<br>yogurt<br>table<br>twenty<br>shorts<br>spoken |
| 2 | U1 | SEU-A | when a special "Unit" (U1) SEU that is a Nucleus is fixed in size and cannot be added by AU2 and there is no possibility to change SEU/AJU-(A) to (B) A/O (C) | To<br>chr<br>within<br>ize<br>ed<br>anti |

Fig. 12A

| | | | |
|---|---|---|---|
| 3 | U1 | SEU-B | Combination of NUC+ AU2(1-n) condition that none of the AU2 is adjacent to each other | Aquamarine → (Aqua(AU2) + marine(NUC))<br>Chairs → (Chair(NUC) + s(AU2))<br>Shiny → (Shine(NUC) + y(AU@))<br>wettest → (wet(NUC) + t + est(AU2)<br>crosswise → (cross(NUC) + wise(AU2))<br>asleep → (a(AU2) + sleep(NUC))<br>unfamiliar → (un(AU2) + familiar(NUC)<br>computerize → (Computer(NUC) + ize(AU2))<br>befriend → (be(AU2) + friend(NUC))<br>transform → (trans(AU2) + form(NUC))<br>undertake → (under(AU2) + take(NUC))<br>illegal → (il(AU2) + legal(NUC))<br>unfamiliarity → (un(AU2) + familiar(NUC) + ity(AU2))<br>Prejudgement → (pre(AU2) + judge(NUC) + ment(AU2))<br>transpolar → (trans(AU2) + pole(NUC) + ar(AU2)) |
| 4 | U1 | SEU-C | combination of NUC+ AU2(1-n) condition that at least two of the AU2s is adjacent to each other | Unpopularity → (un(AU2) + popular(NUC) + ar(AU2) + ity(AU2))<br>abortionist → (abort(NUC) + ion(AU2) + ist(AU2))<br>seductive → (seduce(NUC) + ion(AU2) +ive(AU2))<br>undiscovered → (un(AU2) + dis(AU2) + cover(NUC) + ed(AU2))<br>sensitiser → (sense(NUC) + ity(AU2) + ise(AU2) + er(AU2)) |
| 5 | U1 | AJU-A | Attached Joint Unit NUC + NUC + ... + NUC | Dipchick → (dip(NUC) + chick(NUC))<br>dcm2 → (dc(NUC) + m(NUC) + 2)<br>armchair → (arm(NUC) + chair(NUC))<br>whereinsoever → (where(NUC) + in(NUC) + so(NUC) + ever(NUC)) |
| 6 | U1 | AJU-B | NUC + NUC + ... + NUC + AU2 | Brickmaker → (brick(NUC) + make(NUC) + er(AU2))<br>chaplainship → (chap(NUC) + lain(NUC) + ship(AU2)) |

*Fig. 12B*

| | | | |
|---|---|---|---|
| 7 | U1 | AJU-C | NUC + NUC + ... + NUC + AU2 + AU2 | Housefurnishings → (house(NUC) + furnish(NUC) + ing(AU2) + s(AU2))<br>Anticorrosionplated → (Anti(AU2) + corrode(NUC) + sign(AU2) + plate(NUC) + ed(AU2)) |
| 8 | U2 | SEU | Single Element Unit | 1969<br>32 |
| 9 | U2 | Layout | Consecutive #s in their appropriate positions indicate different sections of a "Text" | 1........consecutive.....2....3..... |
| 10 | U3 | SEU | "Single Element Unit" (U3) | .<br>:<br>+ |
| 11 | U3 | AJU | "Attached Joint Unit"(U3) | ...<br>+/- |
| 12 | U4 | AJU | "Attached Joint Unit"<br>U1(1-n) + U2(1-n) | 2cylinder<br>A4<br>3D<br>5AM |
| 13 | U4 | SEQ II (#LET#) | U2 + U1 + U2 ... + U2<br>starts w/# and ends w/# | 10 to 50 |
| 14 | U5 | AJU | "Attached Joint Unit"<br>U1(1-n) + U3(1-n) | Wed.<br>h"<br>A" |
| 15 | U6 | AJU | "Attached Joint Unit"<br>U2(1-n) + U3(1-n) | 5.3<br>1-2/2 |
| 16 | U6 | SEQ II (#SYB#) | U2 + U3 + U2 ... +2<br>starts w/# and ends w/# | 10/5 - 10 |
| 17 | U6 | Composite Digits | U2 + U3 + ... + U2 | 5.3<br>1-1/3<br>23, 435, 267, 00 |
| 18 | U6 | Layout | "Attached Joint Unit"<br>U2 + U3<br>Consecutive #s + SYB in their appropriate positions indicate different sections of a "Text" | 1).........2).........3)....... |

*Fig. 12C*

| | | | |
|---|---|---|---|
| 19 | U7 | AJU | "Attached Joint Unit" U1(1-n) + U2(1-n) + U3(1-n) | 2-cylinder 4"TV 5A.M. |
| 20 | U7 | SEQ II (#SYM#LET#) | U2 + U3 + ...U1 + U2 starts w/ # and ends w/# | 10.5/5to10 |
| 21 | Mix | SEQ II (#SYM#LET#) | U2 + U3 + ...U1 + |SP| + U2 starts w/ # and ends w/# | 10.5/5 up to 10 |
| 22 | Mix | SEQ II (#LET#) | U1 + U2 + ... + |SP| + U1, 2 | 5 up to 10 |
| 23 | Mix | SEQ II (#SYB#) | U1 + U3 + ... + |SP| + U1, 3 | 10/5-10 |
| 24 | Mix | Composite Digits | U1 + U3 + ... + |SP| + U1, 3 | 5.3 1-2/2 |
| 24 | Mix | Layout | U1 + U2 ... +W/ |SP|<br>U1 + U3 ... +W/ |SP|<br>U2 + U3 ... +W/ |SP|<br>Consecutive U1 or U2 in their appropriate positions<br>Indicate different sections of a "Text" | (A-Z) 1.........(A-Z)2.........(A-Z)3....<br>A,.........B,.........C,.........<br>1).........2).........3).........<br>Arm chair<br>Carolina spring beauty<br>file chest of drawer<br>gilles marie oppenord<br>long narrow furrow<br>social security administration<br>white clothing storage locker<br>one-of-a-kind |
| 26 | Mix/U7 | CJU | Permutation of (U1-7 + "-" or |SP| + ... + U1-7 | Bottom to top → Result (Mz Linear Element)<br>Set of: chair, table → Result (multi sets of 151)<br>morning 15 past 10 → Result (Time)<br>sit 10 people → Result (char)<br>set to order → Result (char)<br>2 x 4 plank → Result (inch) |
| 27 | Mix | CUS | Combinations of (U1-7 + |SP| + ... + U1-7 + Conditions) | |

*Fig. 12D*

| | | | | |
|---|---|---|---|---|
| 28 | Mix | Entity with # | Combinations of (U1-7 + \|SP\| + ... + U1-7 + #) combination resulting to a Particular Text Expression | Height 24"<br>40" width<br>24 / 05 / 83'<br>Pipe 5 inch<br>Size 155cm High x 112cm Wide x 64cm Depth<br>Dimensions: The length is 6' 6" the width is 1' 4" and height is 6' 9"<br>w: 1800 mm l:2400 mm h: 550 mm<br>Matching Ottoman (L / H / D): 100 / 42 / 76 cm<br>33" dia. x 17" H<br>Table measures 29 inches high x 30 inches in diameter<br>Time 10:13<br>6:00 P.M. traveling<br>new york, 1830-40<br>december, 2010<br>fri. nov. 26<br>Add 35%<br>Item #: fg-007c<br>call (866) 733-0698 |
| 29 | Mix | Entity without # | Combinations of (U1-7 + \|SP\| + ... + U1-7) combination resulting to a Particular Text Expression | Cash payment Method<br>Large<br>double |
| 30 | Mix | SEQ1 | More than one Entity + Conditions | Height 24" x 40" width |
| 31 | Mix | Series | Units U1 Same or Different Ts separated by comma | chair, table, armchair<br>width, height, length |
| 32 | Mix | Composite Let | Combinations of selected (U1) that results in a value of a Number | Five dot three |
| 33 | U1 | Layout | Consecutive U1s in their appropriate positions Indicate different sections of a "Text" | A.......consecutive...B.....C... |
| 34 | U4 | Entity with # | Combinations of (U1-7) + w/o\|SP\| + ... + U1-7 + #) combination resulting to a Particular Text Expression | Qty24books<br>Rank40Th<br>average36to69 |

*Fig. 12E*

| 35 | U7 | Entity with # | Combinations of (U1-7 + w/o|SP| + ... + U1-7 + #) combination resulting in a Particular Text Expression (PATEX) | Height24"<br>40"width<br>24/05/years83' |
|---|---|---|---|---|
| 36 | U5 | Entity without # | Combinations of (U1-7 + w/o|SP| + ... + U1-7 + #) combination resulting in a Particular Text Expression (PATEX) | From classA –lower classB |

Fig. 12F

| Input Units "Part of" Table IV | | |
|---|---|---|
| 1 | U1 | SEU-A |
| 2 | U1 | SEU-B |
| 3 | U1 | SEU-C |
| 4 | U1 | AJU-A |
| 5 | U1 | AJU-B |
| 6 | U1 | AJU-C |
| 7 | U2 | SEU |
| 8 | U3 | SEU |
| 9 | U3 | AJU |
| 10 | U4 | AJU |
| 11 | U5 | AJU |
| 12 | U6 | AJU |
| 13 | U7 | AJU |

*Fig. 13*

| Assigning ID  SET UP TIME (fixed) | | | | | | |
|---|---|---|---|---|---|---|
| ID1 | Description | ID2 | Description | ID3 | Description | ID4 | Description |
| SUT1 | Unique ID in DB | #x | based on alphabetic order | N/A | | | |
| SUT2 | Category Type | #x1, #x2...#xn | based on alphabetic order | N/A | | | |
| SUT3 | "Form of Unit" | 1-36 | 1-36 Table#3 | | | | |
| SUT4 | "Fragmented Units" | 1 to 10 | 1 to 10 Table 6 | | | | |
| SUT5 | "Nucleus Unit" | #x | | SUT3 | "Form of Unit" | 1 to 36 | 1-36 Table#3 |
| SUT6 | DNA of (Type of a Category) | #x1, #x2...#xn | based on alphabetic order | | | | |
| | | SUT6.1 | "Signiture" | | | | |
| | | SUT6.2 | "Essential" | | | | |
| | | SUT6.3 | "Rank1" | | | | |
| | | SUT6.4 | "Rank2" | | | | |
| SUT7 | SMR "Basket" # | #x1, #x2...#xn | based on "Basket" # | | | | |
| | | SUT7.1 | Regular | | | | |
| | | SUT7.2 | Protocol | | | | |
| SUT8 | Parametric Contextual Tables (TIs) | SUT8.1 | "Title" | SUT8.(1-6)1 | Multi TI Valid | | |
| | | SUT8.2 | "Z" | SUT8.(1-6)2 | Multi TI not Valid | | |
| | | SUT8.3 | "Active" | SUT8.(1-6)3 | STI TI | | |
| | | SUT8.4 | "Passive" | | | | |
| | | SUT8.5 | "background" | | | | |
| | | SUT8.6 | "Implication" | | | | |

| TOTAL ID |
|---|
| (SUT1, #x) |
| (SUT2,#x1,#x2...#xn) |
| (SUT3, 1 to 36) + SUT1 |
| (SUT4,1 to 10,SUT3,1 to 36) + SUT1 |
| (SUT5,#x) + SUT1 |
| (SUT6,#x1,#x2...#xn) + SUT1-n |
| ((SUT6),(#x1,#x2...#xn),(SUT6.1-4)) +SUT1-n |
| (SUT7,#x1,#x2...#xn) + SUT1-n |
| ((SUT7),(#x1,#x2...#xn),(SUT7.(1-2)) + SUT1-n |
| ((SUT8.1-6),(SUT8.(1-6),(1-3)) + SUT1 |

*Fig. 14A*

| Assigning ID | | Run TIME (Temporary) | | | | | |
|---|---|---|---|---|---|---|---|
| ID1 | Description | ID2 | Description | ID3 | Description | ID4 | Description | TOTAL ID |
| RUT1 | Location "Unit" relation Segment # | #x | based on beginning to end of URL | N/A | | | | (RUT1,#x) |
| RUT2 | Location of "Unit" in Segment | RUT.1 | Beginning of Segment | N/A | | | | RUT.1 |
| | | RUT.2 | Intermidiary of Segment | | | | | RUT.2 |
| | | RUT.3 | End of Segment | | | | | RUT.3 |
| RUT3 | "Form of Unit" | 1-36 | 1-36 Table#3 | | | | | (RUT3,1to36) + SUT1 |
| RUT4 | "Fragmented Units" | 1 to 10 | 1 to 10 Table 6 | RUT3 | "Form of Unit" | 1 to 36 | 1-36 Table#3 | (RUT4,1to10,RUT3,1to36)+ SUT1 |
| RUT5 | "No Data Base" | #x | | | | | | (RUT5,#x) + SUT1 |
| RUT6 | According to Protocol | #x1,#x2...#xn | based on sequential # of protocol | | | | | (RUT6,#x1,#x2...#xn) + SUT1-n |
| RUT7 | SMR "Basket" # | #x1,#x2...#xn | based on "Basket" # | | | | | (SUT7,#x1,#x2...#xn) + SUT1-n |
| | | SUT7.1 | Regular | | | | | ((RUT7),(#x1,#x2...#xn), (RUT7.(1-2) + SUT1-n |
| | | SUT7.2 | Protocol | | | | | |
| RUT8 | Ref to Relation Table | #x1,#x2...#xn | based on sequential # of relation Table | | | | | (RUT8,#x1,#x2...#xn) + SUT1-n |
| RUT9 | Ref to Relation Tools | #x1,#x2...#xn | based on sequential # of tools | | | | | (RUT9,#x1,#x2...#xn) + SUT1-n |
| RUT10 | Relation to other "Unit" | #x1,#x2...#xn | based on level of Relation | "UNIT1" #x1,#x2...#xn | "UNIT1" | "UNIT2" #x1,#x2...#xn | "UNIT2" | ((RUT10),(#x1,#x2...#xn), (UNIT1(#x1,#x2...#xn), (UNIT2(#x1,#x2...#xn) |
| RUT11 | Loc. in (Query) | #x | | | | | | #x |
| RUT12 | Loc. in URL | #x | | | | | | #x |
| RUT13 | Loc. in "Title" of URL | #x | | | | | | #x |

*Fig. 14B*

| UNITx(TI#1) | Contextual Meaning Parametric Tables (TI) | | | | | |
|---|---|---|---|---|---|---|
| | GETEX | PATEX | AU1 | AU4 | AU6 | Characteristic | Proper Noun (PN) |
| | TI# (2-20) | TI# (21-36) | TI# (37-46) | TI#54 | TI#58 | TI# (59-87) | TI#88 |

DNA

*Fig. 15*

Fragmentation

Fragmentation: is a process used as a tool in the process of "Understanding" through Robologic Language.
Fragmentation is to divide or break a "UNITx" (1-36 Form of Units) into smaller "units"
UNITx = (unitx1 + unitx2 + ............unitxm)
There are 10 different Types of Fragmentations depending on the "Form of Units" (1-36).
The purpose of the Fragmentation process relates to (Read, Recognize, Relate component)
1. Re: "READ" component: the purpose is to acknowledge a "UNITx" when the "UNITx" is not matched in Data Base
    fragment (divide) UNITx into unitx1 + unitx2..... and send it to another process "No-Data Base" to be able to acknowledge UNITx
    EX: UNITx = "Aquabed" not matched in Data Base then Fragment it through process "No-Data Base" you will get
        unitx1 = "aqua" unitx2(Nucleus) = "bed" bcz "bed" through Relation Tables (RT) of DNA is related to "Aqua"
        therefore "unit" "bed" is TI#1 in Parametric tables, and "unit" "aqua" is TI# 58x (characteristic)
        then TI of UNITx is TI#1
2.2 Re: "RECOGNITION" process SMR (Same Meaning Replacement) by Fragmenting UNITx we can take all the combinations of each
    SMR of fragmented "Units" and generate all possible all possible SMRs of UNITx
3. AT "RELATION" component the purpose is to determine the relation of the "UNITx" to other "Units" in Run Time
    EX: Semicircular wood pedestal, when we fragment "Semicircular" = UNITx into "semi" "circle" "lar"
        in the text also written "1/2 circle pedestal" then by equating "semi" = 1/2 and circle" = circle

| Fragmentation ||||||||
|---|---|---|---|---|---|---|---|
| | | Example ||||||
| Type | Fragmenting Type & Form of Unit | Unit (x) | Unit1 | Unit2 | Unit3 | Unit4 | Change Meaning | Combinations |
| A | MIX Entity | (25 TH DEC. 1975) | 25 | th | DEC. | 1975 | | Date |
| B | MIX CUS | (can sit six people) | can | sit | six | people | | Length/Weight |
| C | MIX/U7 CJU | 4 - row | 4 | (-) | row | | | qty 4 Row |
| D | U1/U3 AJU<br>Fragmentation between Nucleus/SYB | | | | | | | |
| E | U1 Zip Unit (NUC + AU2)<br>SEU-B, AJU-B | finishes | finish | es | | | | Finishes |
| | | adjustable | adjust | able | | | | |
| | | discovered | discover | ed | | | | |
| | | dining | dine | ing | | | | |
| | | latest | late | est | | | | |
| | | movement | move | ment | | | | |
| | | restore | re | store | | | x | store again |
| | | | | | | | | store again |
| | | Unfinished | un | finish | ed | | x | not finished |
| F | U1 Unit (NUC + AU2)<br>Fragment AU2 from Adjacent AU2<br>SEU-C, AJU-C called a zip unit | carefully | care | ful | ly | | | |
| | | requirements | require | ment | s | | | |
| | | adjustability | adjust | able | ity | | | |
| | | graciously | grace | ious | ly | | | |
| | | reinforced | re | in | force | d | x | add force |
| | | | | | | | | strengthed more |
| | | | | | | | | add strength |
| | | | | | | | | force more |
| G | U4 [Let \| # ]<br>between Let (Unit) & # (Unit)<br>Let Unit can be substituted by any of Fragmentation<br>of U1 (D, E, F) | 3D | 3 | D | | | | three dimension<br>three day/depth.. |
| H | U4 [Let \| Syb ]<br>between Let (Unit) & Syb (Unit)<br>Let Unit can be substituted by any of Fragmentation<br>of U1 (D, E, F) | h" | h | " | | | | height inch<br>hour second |

Fig. 17A

| Fragmentation | | | | | | | |
|---|---|---|---|---|---|---|---|
| | | Example | | | | | |
| Type | Fragmenting Type & Form of Unit | Unit (x) | Unit1 | Unit2 | Unit3 | Unit4 | Change Meaning | Combinations |
| I | U6 [#\|Syb]<br>between # (Unit) & Syb (Unit) | 5.3 | 5 | (.) | 3 | | | FN<br>Sequence |
| J | U7 [Let\|#\|Syb]<br>between Let (Unit) # (Unit) & Syb (Unit)<br>Let Unit can be substituted by any of Fragmentation<br>of U1 (D, E, F) | 4"TV | 4 | " | TV | | | Size TV<br>dim. TV<br>Maz. TV |

*Fig. 17B*

Explained in Figs. 18B - Fig. 18E

7- If "UNIT" 1 (Multi TIx) or (Single TIy) & "UNIT" 2 (Multi TIx) or (Multi TIy)
 & between them "UNIT" 3 TI#53.9 (SYB#3 ( - ) )
 Then ("UNIT" 1 + "UNIT" 2 ) will combine to Sigma "UNIT" A with TI of "UNIT" 2
 Plus RELATION accomplished level 1
 Between "UNIT" 1 & "UNIT" 2

8- If "UNIT" TI#53.15 SYB #3 8, 11, 23, 27 (") ( ( ) ( [ ) ( { )
 On left of "UNIT" 1 & same "UNIT" #53.15 on right of "UNIT" n
 THEN ("UNIT" 1 ----- "UNIT" n) = Sigma "UNIT" A
 If n=3 THEN Sigma "UNIT" A will have TI # of third "UNIT" TI
 If n>3 Step 1 check if fits Combined Unit Structure (CUS) "MOLDS"
 which are predetermined list of "UNIT" of "MOLDS" & result TI will be TI of the
 "MOLDS", a combination of units that have a specific TI 9- If "UNIT" 1 or "UNIT" 2 are SMR (Same meaning replacement) of each other which
 means they have the same meaning & if both are Single TIs then will combine to
 Sigma "UNIT" A with TI of "UNIT" 1 / "UNIT" 2

10- If situation #9 but "UNIT" 1 Multi TI & "UNIT" 2 Multi TI
 Therefore they both have a common TI. Go to recognition R 2 before combining them.

11- When "UNIT" 1 - "UNIT" n are both Multi TI or Single TI
 But they both have 1st character capital then combine them with TI # 88.x 12- When a "UNIT" 1 is combined with "UNIT" 2 on its left
 & combined to "UNIT" 3 on its right then
 "UNIT" 2, 1, 3 can be combined to a Sigma "UNIT" A, also the relation audits level
 is also determined.

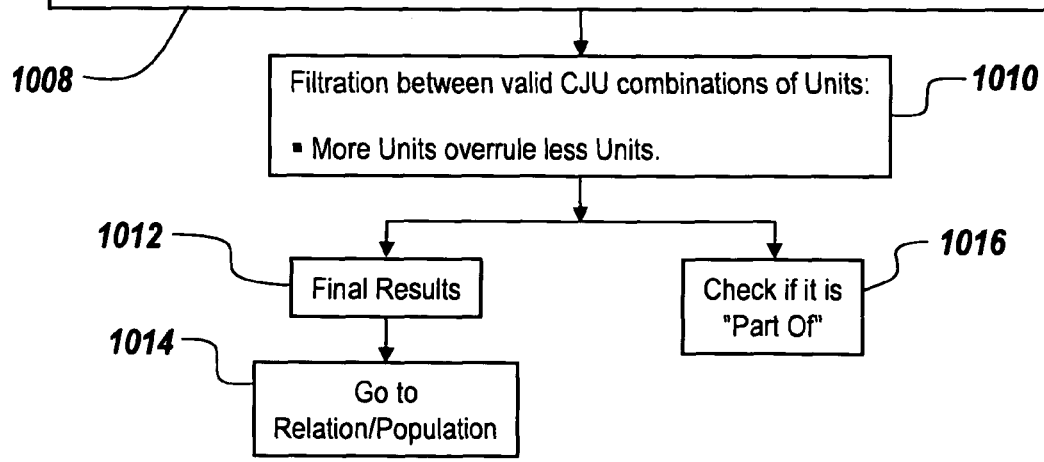

Fig. 20C

| Types of Entities | Complete Entity |
|---|---|
| MZ Linear | Linear Element + Linear Unit + TI54.x |
| MZ Area | Area Unit + TI54.x |
| MZ Volume | Vol Unit + TI54.x |
| MZ Weight | Angle Unit + TI54.x |
| MZ Angle | Date Format (Seq2) |
| Date | Date Format (Seq2) (seq of 3: d-m-y) |
| | Month (TI) + TI54.x |
| | Day (TI) + TI54.x |
| Time | Day (TI) |
| | Day (TI) + Time Formal (Seq2) |
| | "Meet" + "at" + TI54.x |
| Size | TI54.x |
| | TI Unit (Size) |
| | Size Unit can be Converted TI |
| | Size Unit cannot be Converted TI |
| Duration | TI Duration + TI54.x |
| | TI Duration + Duration Format (Seq2) |
| Quantity | TI54.x + "in" + TI54.x |
| | "of" + TI54.x |
| Rank | TI54.x + TI54.x |
| Telephone | TEL SEQ II Format |
| Address | TI Address Element Active + TI54.x |
| Reference | TI Reference + TI54.x |
| Price | TI54.x + TI Price Currency |

*Fig. 20K*

Preset A

When Unitx is Related to the Result a number that number is related to the result

| ID # | Unit$_n$ | TI | Result | TI |
|---|---|---|---|---|
| 1 | arm | 19.2 | length | 21.303.1 |
| 2 | arm | 19.2 | width | 21.303.2 |
| 3 | back | 19.3 | height | 21.303.3 |
| 4 | back | 19.3 | width | 21.303.2 |
| 5 | back bone | 19.4 | height | 21.303.3 |
| 6 | back bone | 19.4 | width | 21.303.2 |
| 7 | Backbone | 19.4 | height | 21.303.3 |
| 8 | backbone | 19.4 | width | 21.303.2 |
| 9 | body | 19.1 | length | 21.303.1 |
| 10 | body | 19.1 | width | 21.303.2 |
| 11 | buttock | 19.5 | width | 21.303.2 |
| 12 | calf | 19.6 | length | 21.303.1 |
| 13 | caput | 19.7 | height | 21.303.3 |
| 14 | elbow | 19.8 | height | 21.303.3 |
| 15 | foot | 19.9 | width | 21.303.2 |
| 16 | forearm | 19.10 | length | 21.303.1 |
| 17 | head | 19.11 | height | 21.303.3 |
| 18 | knee | 19.12 | depth | 21.303.4 |
| 19 | knee | 19.12 | height | 21.303.3 |
| 20 | leg | 19.13 | depth | 21.303.4 |
| 21 | leg | 19.13 | height | 21.303.3 |
| 22 | lumbar | 19.14 | width | 21.303.2 |
| 23 | neck | 19.15 | height | 21.303.3 |
| 24 | nose | 19.16 | thickness | 21.303.5 |
| 25 | shoulder | 19.17 | width | 21.303.2 |
| 26 | thigh | 19.18 | length | 21.303.1 |
| 27 | toe | 19.19 | length | 21.303.1 |
| 28 | waist | 19.20 | width | 21.303.2 |
| 29 | bench | 1.1 | length | 21..303.1 |
| 30 | adder | 3.1 | length | 21.303.1 |
| 31 | base | 3.2 | diameter | 21.303.6 |
| 32 | bead | 3.3 | diameter | 21.303.6 |
| 33 | carpet caster | 3.4 | diameter | 21.303.6 |
| 34 | caster | 3.5 | diameter | 21.303.6 |
| 35 | extension leaf | 3.6 | length | 21.303.1 |
| 36 | extension leaf | 3.7 | width | 21.303.2 |
| 37 | forepart | 3.8 | width | 21.303.2 |

*Fig. 20L*

| Preset A |||||||| 
|---|---|---|---|---|---|---|---|
| ID # | # | Mz Unit | TI | Actual Unit | TI | Result | TI |
| 1 | 10-51 | cm | TI#21.10 | mattress | TI#3 | thickness | TI#21.300.4 |
| 2 | 0.1-3 | cm | TI#21.10 | glass | TI#3 | thickness | TI#21.300.4 |
| 3 | 0-13 | cm | TI#21.10 | tube | TI#3 | diameter | TI#21.300.4 |
| 4 | 0-13 | cm | TI#21.10 | tube | TI#3 | guage | TI#21.300.4 |
| 5 | 13-73.5 | cm | TI#21.10 | leaf | TI#3 | width | TI#21.300.4 |
| 6 | 7.5-30.5 | cm | TI#21.10 | seat | TI#3 | thickness | TI#21.300.4 |
| 7 | 81-305 | cm | TI#21.10 | seat | TI#3 | length | TI#21.300.4 |
| 8 | 81-305 | cm | TI#21.10 | seat | TI#3 | width | TI#21.300.4 |

*Fig. 20M*

| General Protocols for Recognition: |
| --- |
| Apply protocols of criteria to determine TI of the Unit in Runtime in the text |

Universal Horizontal Protocols for Recognition
1. Title (TI x) Next to Passive MTI "Unitx" (Left/Right) → STI "Unitx"
2. Active (TI x) Next to Passive MTI "Unitx" (Left/Right) → STI "Unitx"
3. Active (TI x) Next to Z MTI "Unitx" (Left/Right) → STI "Unitx"
4. Z (TI x) Next to Passive MTI "Unitx" (Left/Right) → STI "Unitx"
5. Active (TI x) Next to Active MTI "Unitx" (Left/Right) → STI "Unitx)
6. Passive (TI x) Next to Passive MTI "Unitx" (Left/Right) → STI "Unitx"
7. Active or Passive MTI (Nuc) Color (TI#5) + AU2 ("ish") → STI Color (TI#5)
8. Title (TI x) Next to Z MTI "Unitx" (Left/Right) → STI "Unitx"
9. Title (TI x) Next to Active MTI "Unitx" (Left/Right) → STI "Unitx"

Protocols for Recognition Generated from "Part of" Process
10. Unit1 TI#1 with Unit2 MTI (TI#1, TI-others) → ΣUnit (Unit1 + Unit2) STI TI#1
11. Unit1 TI#3 with Unit2 MTI (TI#1, TI-others) → ΣUnit (Unit1 + Unit2) STI TI#1
12. Unit1 TI#1 with Unit2 MTI (TI#3, TI-others) → ΣUnit (Unit1 + Unit2) STI TI#3
13. Unit1 TI#3 with Unit2 MTI (TI#3, TI-others) → ΣUnit (Unit1 + Unit2) STI TI#3

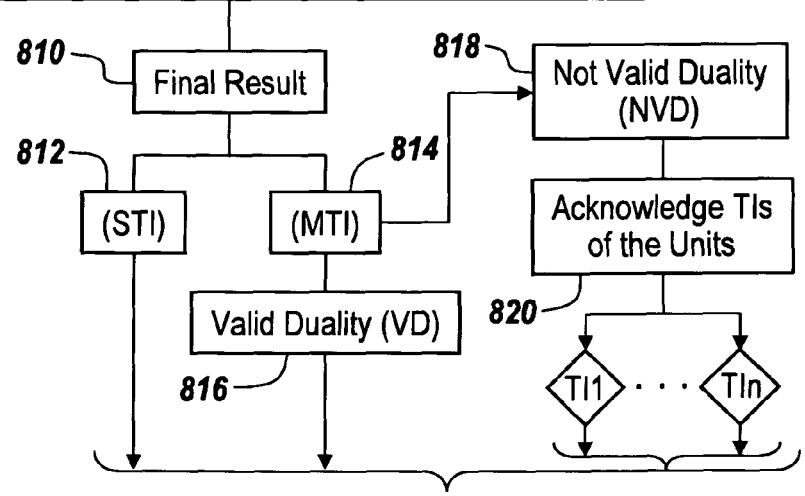

METHOD AND SYSTEM FOR UNDERSTANDING TEXT

RELATED APPLICATIONS

This application claims rights under 35 USC §119(e) from an invention entitled METHOD AND SYSTEM FOR UNDERSTANDING TEXT U.S. Application Ser. No. 61/743,482 filed Sep. 5, 2012, the contents of which are incorporated herein by reference.

FIELD OF INVENTION

This invention relates to understanding text and more particularly to a system that provides contextual meaning to input text for purposes of searching and machine control.

BACKGROUND OF THE INVENTION

In the past search systems included queries in which a sentence was provided and in which natural language techniques were utilized in an attempt to provide the correct result to a particular query. As will be appreciated, present systems involve a key word search to provide a result from text, whether the text exists on the internet or in a particular document. It will be appreciated that while such systems are in fact useful, oftentimes they do not provide a correct result due to a misinterpretation of the text itself. As a result the systems oftentimes return results which do not correspond to the meaning of the input sentence for a particular search query. The result of such searches in the past have oftentimes eliminated finding the appropriate services merchants seeking to sell services or products, and as a result a person seeking a particular service or product may not find the particular merchant or provider that he is seeking.

The reason that text analysis alone does not work well is because key word searching only matches the key words and does not extract contextual meaning from the key words.

Thus, in the past search engines have queried a web page with a particular word or set of words and eliminates those web pages for which those words are not found. As a result, these systems operate disregarding the meaning of the word in a particular context. In an attempt to better understand a query, present search engines utilize statistical analysis and probabilities that the particular key words relate to each other. Having ascertained a high probability that these key words relate to each other, the search engine return results based on these probabilities. The result of the statistical analysis performed by present search engines are unsatisfactory because of the number of returns that are said to be relevant to the particular query. Since nothing other than probabilities is utilized in the returning of results for such queries, presently there is no attempt to further understand the meaning of the query text. By the term query is meant both a formal question and/or a series of words that are utilized for machine understanding.

SUMMARY OF THE INVENTION

Rather than using statistical analysis to return results for a query or the understanding of a particular sentence or words in a sentence, in the subject invention a query answer engine employs an algorithm, herein called Robologic, to change text into "units" and to provide a language that gives numeric values for the text that are in turn used to populate a database composed of two matrices, a question or query matrix and an answer matrix. When the database is populated with the numerically-coded information, in each case the corresponding matrix is formed with numerical matrix values that form the coordinates of the populated matrices. After populating the answer matrix, when input text is provided, the understanding of which is important, it is coded in the same way that the answer matrix is coded, with each matrix coordinate having a particular number associated with it. If there is a match between corresponding numbers in the matrices, then an answer is returned which answer is more robust than previous systems.

The reason that the answer is more robust is that the query and answer matrices are coded in the same manner. Each coordinate of a matrix has three numbers, namely values corresponding to a read component, a recognize component and a relationship component. When so constituted each matrix coordinate completely recognizes context due to the use of the read, recognize and relationship components.

In one embodiment the text is first analyzed in terms of a read component. This read component is generated first using a specialized robotic language. Then seven types of units are established, followed by developing thirty-six possibilities. Once the thirty-six possibilities are established a read component for the matrix determines the corresponding "combinations of units". Then a second matrix component is established. This is the recognize component that establishes the contextual meaning for the "combinations of units". Then as a third component for the matrix a relationship component is established that defines the relationship between the "combinations of units". All three components result in numbers that are combined into a matrix coordinate. Thus each matrix coordinate has three values. With all coordinates having these three valued components, when all of the text is coded and populated into matrices, the comparison leads to a result matrix that takes into account the text understanding provided by the read, recognize and relationship processing.

It will be appreciated that in terms of the understanding provided by the subject system there is no understanding without a question and an answer. Rather than trying to ascertain meaning through probabilities, there is a match between the question matrix and the answer matrix as coded by the subject system. The result is that for each coordinate of an answer matrix there is an associated number and there is also an associated number for the query matrix, such that when the coordinate values in the query matrix match the coordinate values in the answer matrix, the result is an unambiguous contextual result for the query. The subject system thus provides understanding, through establishing the contextual meaning of this text as opposed to natural language analysis. This is done through a relational system in which all potential questions and answers can be categorized and encoded into context-related numbers that are in turn placed into matrices using the subject numeric system.

In operation, the subject system superimposes both the question matrix and answer matrix to obtain a match yielding the result of the robotic non-natural language understanding of the input text.

It will be appreciated that the subject invention provides a complete process of understanding which is achieved through a unique database developed through a process of analysis in which a matrix is populated with three components, namely a read component, a recognize component and a relate component. Thus, the coordinates for any matrix used by the subject invention has the above three components.

Read Component

More particularly, the read component is a process of transforming text into units which in one embodiment is a combination of alphabetic letters, symbols, numbers and spaces. See Table I below.

TABLE I

Alphabet of Robologic Language

Text in URL & Query which is in Natural Language is made up of: Words, #s and Symbols.
Text in Robologic Language is transformed into "Units" and "Forms of Units" which are made of "Elements" (Basic Building Blocks) of the Robologic Language.
  There are four types of "Elements":
  1. Alphabetic letters  ("LET")   (A, B, C ... Z)
  2. Numbers             ("#")     (0 ... 9)
  3. Symbols             ("SYB")   (.) (,) (-) (/) ...
  4. Space               (SP)
     4.1 Space (SP) that is used as SYB for Fraction, Ex: (3 3/4) which is equal to (3,3/4) or (3-3/4) or (3.3/4)
     4.2 Space (SP) that is used as Separation and Binding factor for Sequence type1 (SEQ1)/Sequence type2 (SEQ2)      Ex: (March 1975)/(25 30 40), (5 12 1975)
     4.3 Space (SP) that is used to define the boundary of a "Unit" Ex: Unit1(SP)Unit2
Therefore "Units" and "Forms of Units" are made of different "Elements" in any combination and permutation yielding contextual or non contextual meanings.

In one embodiment these elements which are the building blocks of the system are combined into seven units. These seven units are specified in Table II below.

TABLE II

Types of UNITs

| UNIT | Description | Example |
| --- | --- | --- |
| U1 | combination of (LET) only | (Table) (Red) (Steel) |
| U2 | combination of (#) only | (1938) (69) |
| U3 | combination of (SYB) only | (.) (,) (/) |
| U4 | combination of U1 + U2 w/o (SP) | (A4) (3D) |
| U5 | combination of U1 + U3 w/o (SP) | (Wed.) (H") (A*) |
| U6 | combination of U2 + U3 w/o (SP) | (25-) (25) (25*) |
| U7 | combination of U1 + U2 + U3 w/o (SP) | (4-Cylinder) (4"TV) |

These seven possibilities are transformed by the four basic types of elements of Table I which are building blocks of the subject system into "combination of units" of which there are thirty-six possibilities. (See Table III of FIGS. 12A-12F.)

It will be appreciated that the aforementioned units and forms of units are made of different elements in various combinations and permutations yielding a contextual or non-contextual meaning. Moreover, the subject process not only is useful in understanding contextual meaning but also can analyze synthetic numbers such as for instance model numbers of a product that constitute non-contextual meaning.

Recognize Component

The second component in order to populate the question and answer matrix is the recognize component. The purpose of the recognize component is to filter at run time multi-contextual meanings of the forms of units to a single contextual meaning. In cases of ambiguity, for instance considering the mark which is a quotation mark, the quotation mark symbol can either mean an actual quotation for text, it can mean inches or it can mean seconds. The filtering process decides which amongst various contextual meanings a particular symbol or word means. It will be appreciated that this recognize component is done at run time.

Relationship Component

The third component for populating a matrix is the relate component. The purpose of the relate component is to relate information units to other units in a pattern. The relationship, in one embodiment, forms a matrix which uses branching to relate a major unit of information to different levels of related matter units of information. Thus, once having identified information units it is oftentimes important in contextual understanding to understand the relationship between different information units. One way of understanding the relationship between different information units is to apply a branching information function to show which of the units describe other units.

The result is populating the matrix with 3-D coordinates having a value including the read, recognize and relate components so that the populated matrix reflects a more complete understanding of the context.

The query matrix is populated in the same way as the answer matrix, with the query matrix itself having the above read, recognize and relate components. The reason that each of these matrices is called a 3-D matrix is that for each coordinate in the matrix there are three values, namely read, recognize and relate, which together define the matrix coordinate data point.

Having developed an answer matrix and a query matrix, then superimposing the answer matrix on the query matrix and finding a match provides a unique understanding of the contextual meaning of text to provide a more correct answer to a question or user query.

In summary, a query answer engine converts a query and answers into a non-natural language forming units that correspond to words, symbols, numbers and spaces sand combinations of the above, and establishes the contextual meaning of the units utilizing read, recognize and relate processes to populate a query matrix and an answer matrix with 3-valued points corresponding to the read, recognize and relate values of a unit. The two matrices are cross correlated to yield a robust answer to a query taking into account context. The conversion of text to units uses contextual meaning parametric tables, databases, libraries, rules and an engine for determining the focal point of a query or an answer.

BRIEF DESCRIPTION OF THE DRAWINGS

These and other features of the subject invention will be better understood in connection with the detailed description of which:

FIGS. 2A-2G are flow charts for the operation of the system of FIGS. 1A and 1B starting from digital documents, websites and query sentences and resulting in the population of a query matrix and a URL matrix with the three values that define a data point in the matrix through the utilization of a read process, a recognition process and a relation process illustrating how a query may be matched to an answer;

FIGS. 10A and 10B are tables illustrating the contextual meaning parametric tables used in the system of FIGS. 1A and 1B;

FIG. 11 is a table showing the types of units that may be formed by joining combinations of units;

FIGS. 12A-12F is a table, labelled Table III for the forms of units possible, there being 36 different types of forms of units specifying the different types of combinations of the units that are possible;

FIG. 13 is a table showing input units for the "part of" process for use in the system of FIGS. 1A and 1B;

FIGS. 14A and 14B are diagrammatic illustrations of the assigning of identification numbers or IDs during set up time and run time;

FIG. 15 is a diagrammatic illustration explaining DNA to be a unit that is a type of category;

FIGS. 17A and 17B are tables illustrating the fragmentation process for use in the system of FIGS. 1A and 1B;

FIGS. 20B and 20C are diagrammatic illustrations of the process associated with the combined joint units for use at set up time and run time along with universal protocols for the determination of combined joint units, also illustrating filtration between valid combined joint unit combination of units;

FIG. 20K are diagrammatic illustrations of the different types of entities to show in one embodiment how to complete an entity;

FIGS. 20L and 20M are diagrammatic illustrations of the use of presets to complete the description of an entity if the entity is incomplete;

FIGS. 21 and 22 are diagrammatic illustrations of the recognition process illustrating universal horizontal protocols for recognition and protocols for recognition generated from the "part of" process.

DETAILED DESCRIPTION

Figure 1A:
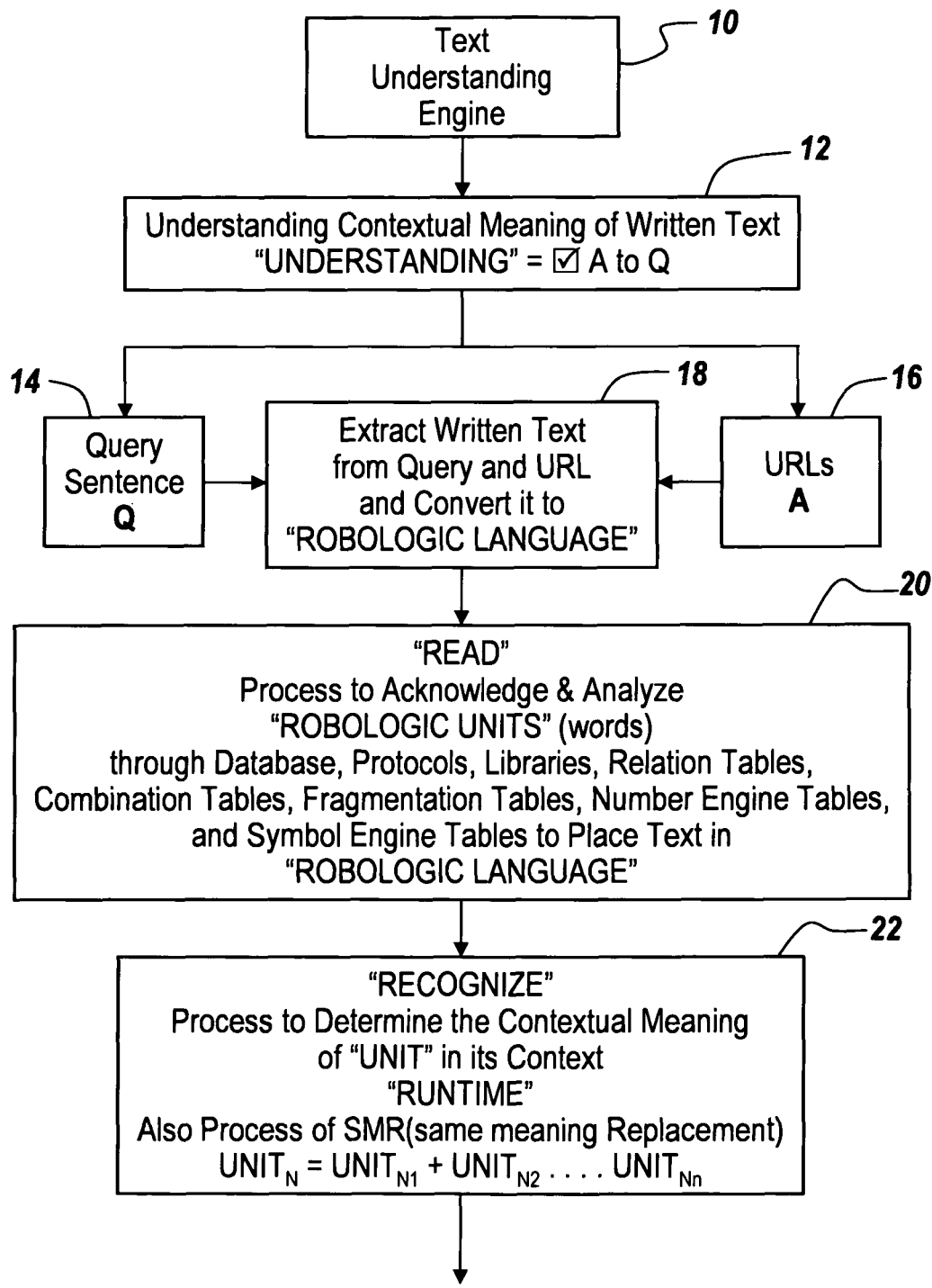
FIGS. 1A and 1B are flow charts illustrating the concept of understanding text involves a query sentence and URLs, with the Robologic language being that language into which the written text from the query and URL are converted, followed by a read, recognize, and relation process, after which a query matrix and an answer matrix is populated.
Figure 1B:
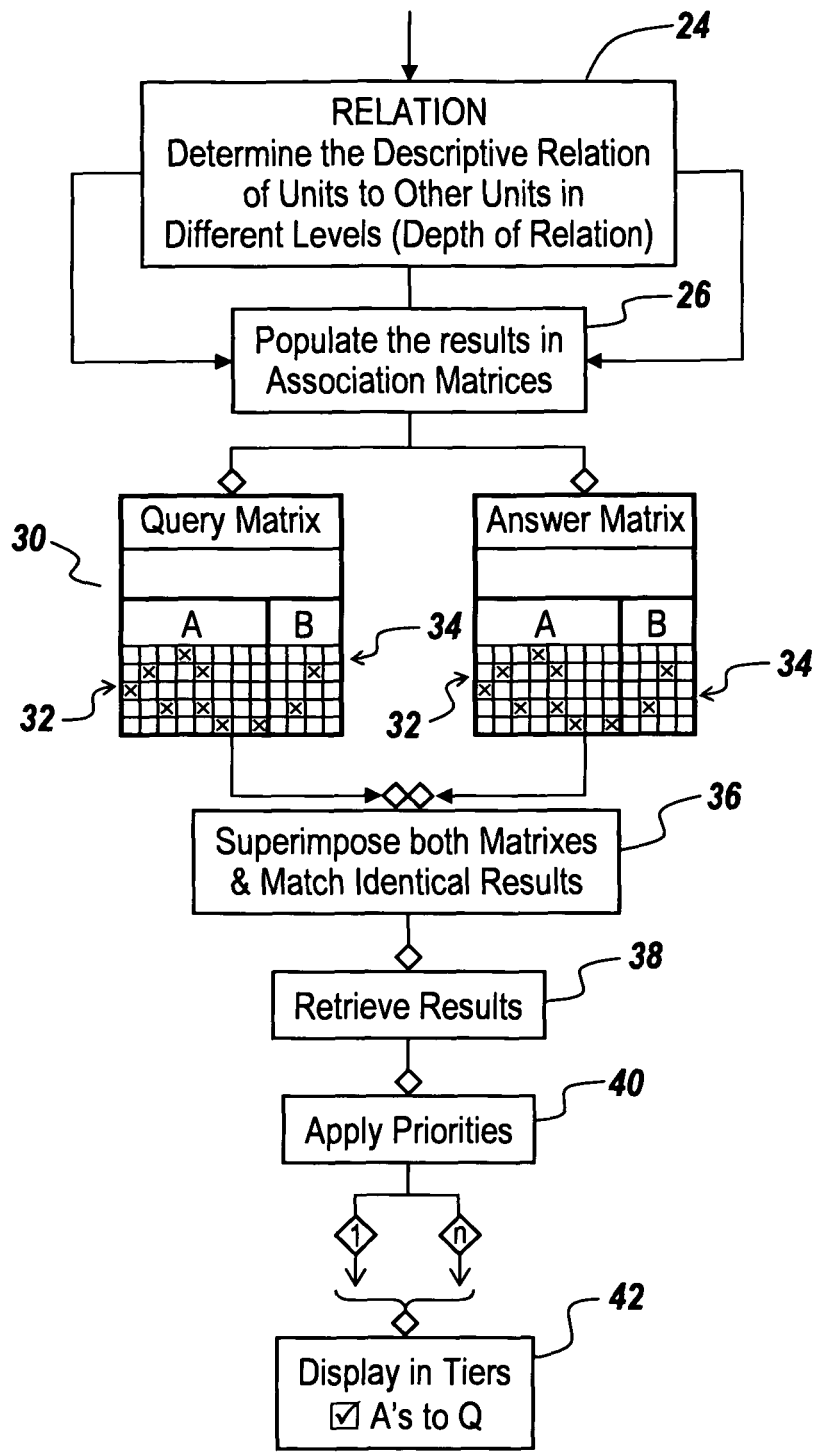

Referring now to FIGS. 1A and 1B, the subject text understanding engine 10 starts out by understanding the contextual meaning of written text as illustrated at 12 by analyzing query text and answer text and by returning an answer to a query that takes into account not only the written text but also contextual meaning provided by the subject Robologic language.

In order for the search engine to operate, a query sentence 14 and an answer sentence 16, in one embodiment in terms of a URL or website, is applied to a unit 18 which extracts written text from the query and URL and converts it to the subject Robologic language. In the Robologic language words in the text are converted into "units" and it is these units that are used to understand the text.

As mentioned, natural language techniques are not used, with the correspondence of the answer to the query being the function of the non-natural language process described herein.

As mentioned above, the contextual meaning of written text, be it in a query sentence or in a URL, is analyzed in terms of a "read" component, a "recognize" component and a "relation" component, called the 3-D 3Rs, here shown at 20, 22 and 24.

With respect to the read component, to provide the contextual meaning for written text, the read process acknowledges and analyzes units, i.e. words, utilizing a database, protocols, libraries, relation tables, combination tables, fragmentation tables, number engine tables and symbol engine tables to place the text into the Robologic language.

Having converted the text into the Robologic language, the recognize component 22 determines the contextual meaning of each unit in its context during a runtime operation. Also during the recognize process there is a process of "same meaning replacement" or SMR in which same meaning matches of a particular unit are returned as having the same meaning as the original unit as they are sharing the same contextual meaning parametric tables.

Having developed the recognize component along with the same meaning replacement function there is a relation component 24 that determines the relation between a unit to other units and does so for instance in one embodiment by returning results having different levels of significance.

Having gone through the read, recognize and relation components, the so-called 3Rs, matrices are populated as illustrated at 26 such that a query matrix 30 is populated with matrix data points, whereas an answer matrix or URL matrix is likewise populated with data points.

It is important to note that each of the data points in each of the matrices has values corresponding to a read component, a recognize component, and a relation component such that each data point is a three valued data point.

In the two matrices there will be some data points such as the A data points here shown at 32 in which where the numerical coordinates read, recognize and relate of each unit match between the two matrices; and in which there are B data points 34 where the read, recognize and relate numerical coordinates do not match between the two matrices.

As illustrated at 36 the matrices are superimposed upon each other and match results 36 are returned and retrieved at 38 such that if there is a match between the query matrix data points and the answer matrix data points then one has established the contextual meaning of a query and an answer. As a result the quality of the answer is very high. If there is no exact match, techniques described hereinafter determine levels of match.

After retrieving the results as illustrated at 38 a priority is applied at 40 to rank the returned results in terms of significance and basically in terms of the degree of correlation between the query and the answer and thus confidence level.

After prioritizing the returned results, the results are displayed in tiers as illustrated at 42 so that the answers to a query are displayed with the most significant or correlated answer on top and with the lesser correlated answers being displayed underneath.

It is important to note that there may be no correlation between the data points of the answer matrix and the data points of the query matrix at least as to certain data points. However since words will always be matched, the subject engine devolves into a word search type of search engine, even though the contextual meaning of the words is uncertain due to the lack of match.

How the contextual meaning of the words in a query sentence and in an answer sentence are derived will be described hereinafter.

More specifically, in understanding contextual meaning of text for instance related to products, one can either go to input text, or go to group of words in a website, or go to any of a variety of digital sources involving text. Once having decided which text to analyze, one goes to a database that collects fragments in the text to be analyzed and arranges them into units that constitute alphabetic letters, symbols, numbers and spaces involving 36 different "combinations of units" or "forms of units" corresponding to the text. These 36 combinations of units or "forms of units" are then analyzed through library tables, relation tables, engines, tools and protocols to yield the 3R matrix components of read, recognize and relate, thus to encode the text into a specialized language. This analysis and a branching operation transforms the results into units of information and related sub-units of information. The results are then converted into a 3-D numerical coordinate system which is utilized to populate the database that specifies the words in the text and contextual meaning.

Having populated a query matrix and an answer matrix, one takes for instance a website-generated matrix and compares it with a query matrix in terms of the three read, recognize and relate components that constitute the values for each of the matrix coordinates. As will be seen there are a set of passed values, i.e. for words, contexts and relations that have passed the cycle of three Rs or have not passed the cycle of three Rs. A matrix compare operation not only compares those elements that have passed the three R's but also those elements that have not passed the three R's test. It will be appreciated that those elements that have not passed the three Rs test refers to the fact that a complete understanding is not found. This is useful when one cross correlates the answer matrix with the query matrix because a subsequent word search may be used in returning answers to a query.

In this process of comparison where the two matrices are superimposed, results tend to converge. Once having established a convergence, the matrix comparison then diverges into more answers that are equivalent or that fall in the range of the "understanding" of the text. Once one has both convergence and divergence, one displays the results in tiers according to pre-established priorities.

To further describe the process of analyzing text without using natural language systems, referring now to FIGS.

Figure 2A:
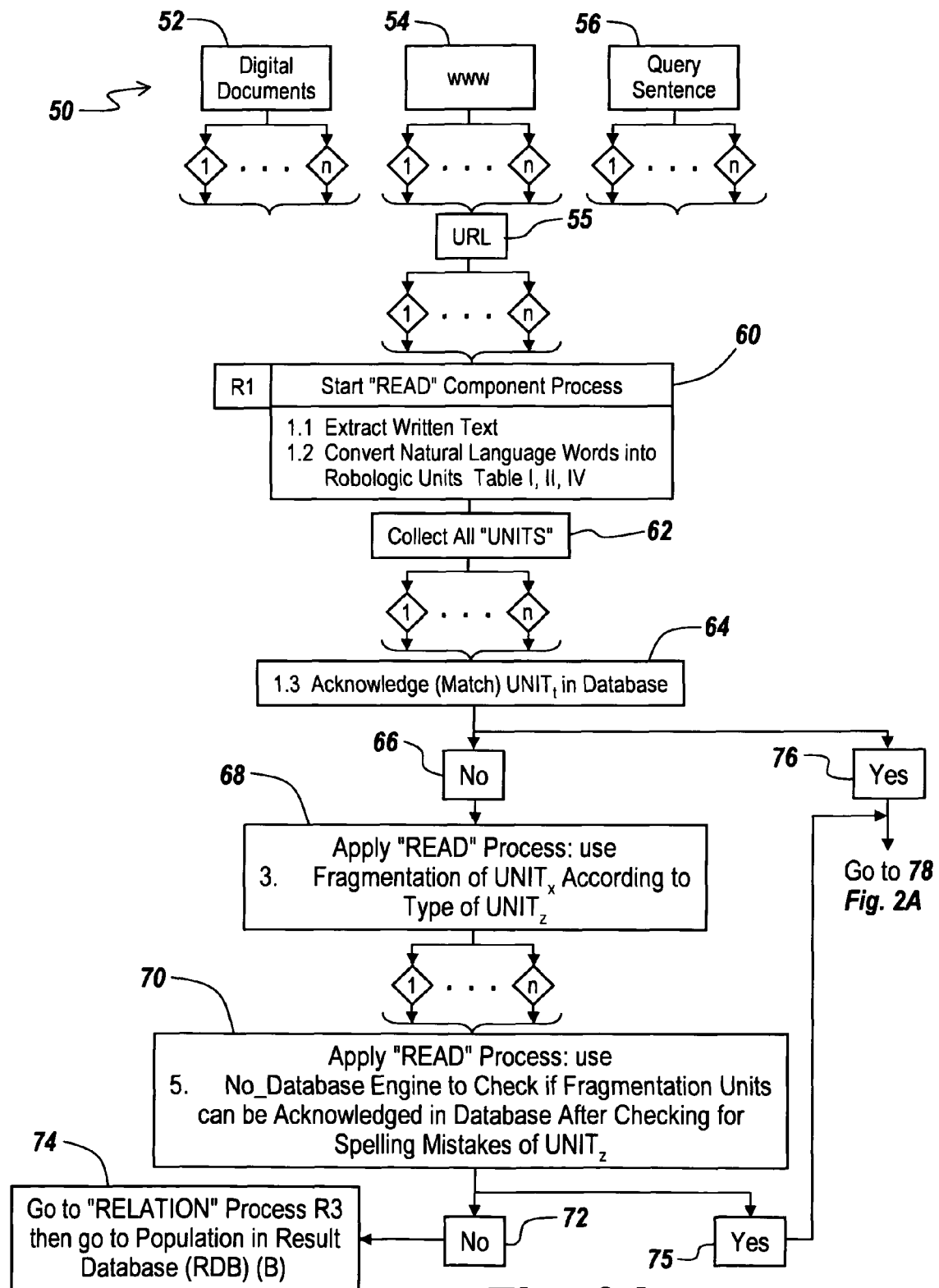

2A-G, one has an input from which one seeks to understand the contextual meaning of the text in the input. Referring to FIG. 2A, what is shown is a flowchart of the subject process in which inputs generally designated by reference character 50 that can include digital documents 52, Worldwide Web content 54 and a query sentence 56 are used to start the process of establishing the read component as illustrated at 60.

The start of the read process includes extracting written text and converting natural language words into Robotic units. The conversion of the natural language words into Robotic units is in accordance with tables I, II and IV as shown at 62. All of the units are collected and at 64 a process acknowledges whether or not a unit can be matched in a database.

If the unit cannot be matched in a database as illustrated at 66 then a process is applied to fragment the unit according to the type of unit. This is shown at 68. The fragmentation permits understanding a unit that is not matchable in the database by finding a match for the fragment. As illustrated at 70 a process is invoked to check if the fragments can be matched or acknowledged in the database after checking for spelling mistakes in the units, uses a "no database" engine. If the fragments are in fact in the database then as seen at no 72 one goes to a relation process 74 which then populates the result database as will be described hereinafter. If however the fragment is not in the database as indicated by yes at 76 then a segmentation process 78 is applied to divide the URL text or query into tags first according to source code tags and further to subdivide and combine as required. By dividing and segmenting the units one can ascertain the relations more easily.

Having discussed the first two of the processes as illustrated at 80 one exercises the other process namely 3 fragmentation, 4 "part of", 5 no-database and 6 focal point processes as will be described.

The third additional processes is the fragmentation process here shown at 82 where there are 10 different types of fragmentations.

The fourth process is ascertaining whether a unit is part of another unit called "a part" of process. This process is to check is a unit can be combined with adjacent units to form a larger or different unit as shown at 84.

The fifth read process is the "no database" engine process to check a unit in run time that does not match a database. This is shown at 86.

Finally, the sixth process is a process to determine the focal point of the text as illustrated at 88 which is the type of category that units in the URL/query relate to. If focal point is determined, one goes to the population of this focal point in the database as illustrated at 90.

Figure 2C:
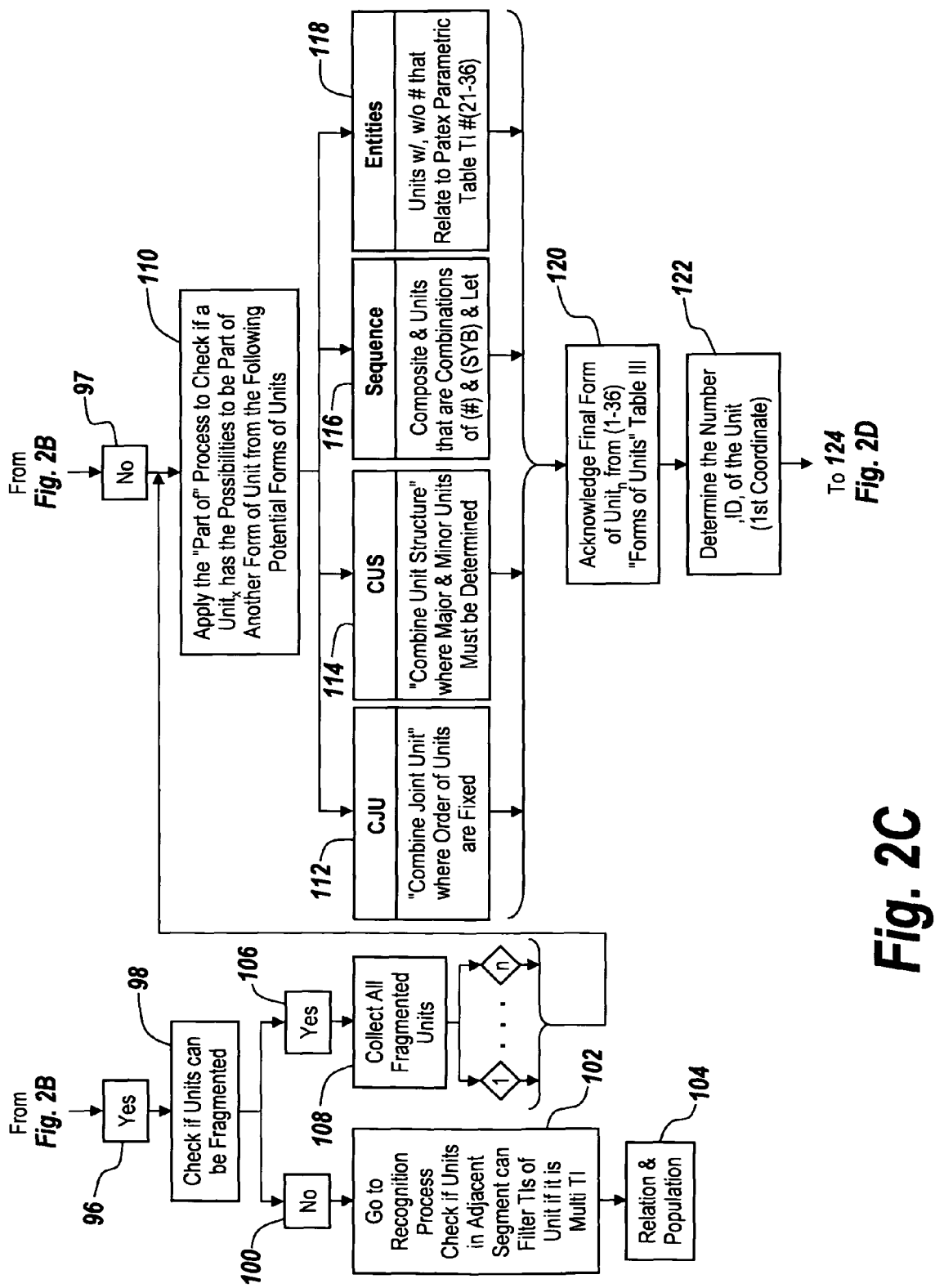

With respect to the fragmentation process and the no database processes these will be discussed hereinafter. However, with respect to the "part of" process the results are collected such that all robotic input units are collected by invoking table IV. If a particular Unit X is alone in the segment URL/query as shown at 94 then if it is alone as it is passed to process 96 of FIG. 2C then the system checks if the units can be fragmented as illustrated at 98. If they cannot be fragmented as illustrated at 100 they go to a recognition process 102 to filter units in adjacent segments using parametric contextual tables, TIs of the unit in the case that multiple contextual tables are involved. The result as illustrated at 104 is a relation and population step.

However, if the units can be fragmented as illustrated at 106 then one collects all the fragments as illustrated at 108 and returns them to another part of the process which applies the "part of" process 110 to check if a Unit X has the possibility to be part of another form of unit as established by the following potential forms of units.

The first of these forms of units is the CJU combined joint unit 112 where the order of the units is fixed.

The second forms of units is the CUS forms of units namely the combined units structure form of units 114 where major and minor units are determined.

The third forms of units is the sequence 116. This is the forms of units sequence in which units are combined in terms of numbers, symbols and letters.

Finally, the forms of units includes entities types of units 118 involving units with and without numbers that relate to specific parametric tables. These parametric tables are listed hereinafter as parametric tables TI 21-36.

Having established the types of units, there is an acknowledgement function at 120 which acknowledges the final forms of units, namely forms of units 1-36 from the forms of units table III also to be described hereinafter.

Having determined the final forms of units one determines as illustrated at 122 the numerical identification or ID of the unit which forms the first coordinate in the matrix to be generated.

Figure 2D:
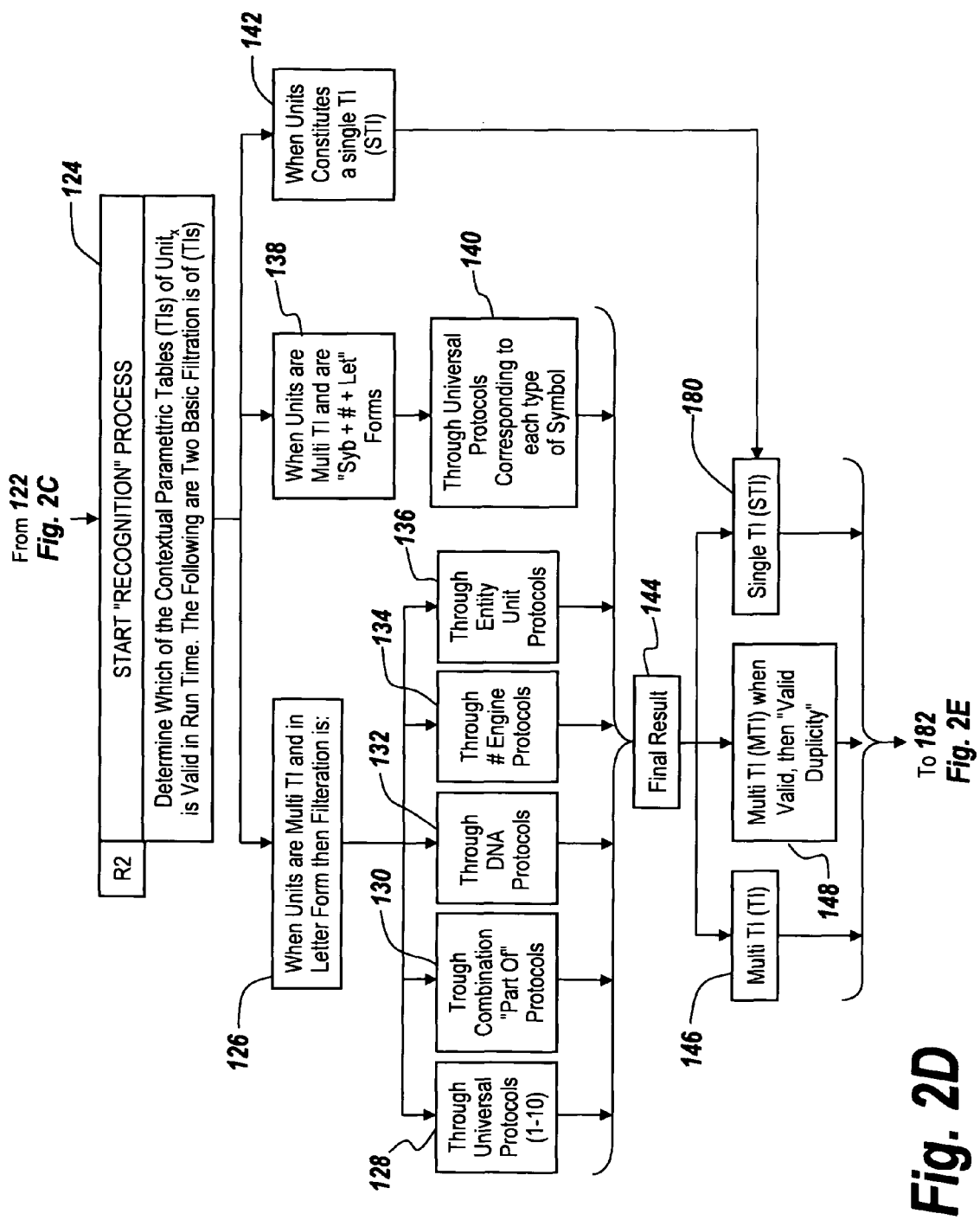

Having defined the numerical value for the first coordinate and referring to FIG. 2D one then starts the process of recognition at 124. The purpose of the recognition is to determine the contextual parameters parametric tables or TIs of Unit X which are valid in runtime. The following are two basic filtration techniques of the contextual parametric tables. The first of the filtration techniques is illustrated at 126 where the units are involve multiple contextual parametric tables, i.e. multiple TIs and have a letter form. Then the filtration is either through the Universal Protocols 1-10 as illustrated at 128, through the protocols of combination of "part of" protocols 130, through the DNA protocols 132 through the number engine protocols 134 and through the entity unit protocols 136. All of these protocols will be discussed hereinafter.

The second filtration is when the units are associated with multiple contextual parametric tables and have the symbol+number+letter form as illustrated at 138. This filtration is accomplished at 140 through universal protocols corresponding to each of the symbol types.

Finally, when the units are characterizable by a single contextual parametric table STI, this is determined at 142.

The filtering protocols of 128-136 as well as the result of protocol 138 determine a final result 144 for all of the units other than those that have associated with it a single contextual parametric table. The final result branches into units that have multiple contextual parametric tables as illustrated at 146. Those multi TI units when exhibiting valid dualities as collected at 148 whereas units involving only a single TI are collected at 180.

Figure 2E:
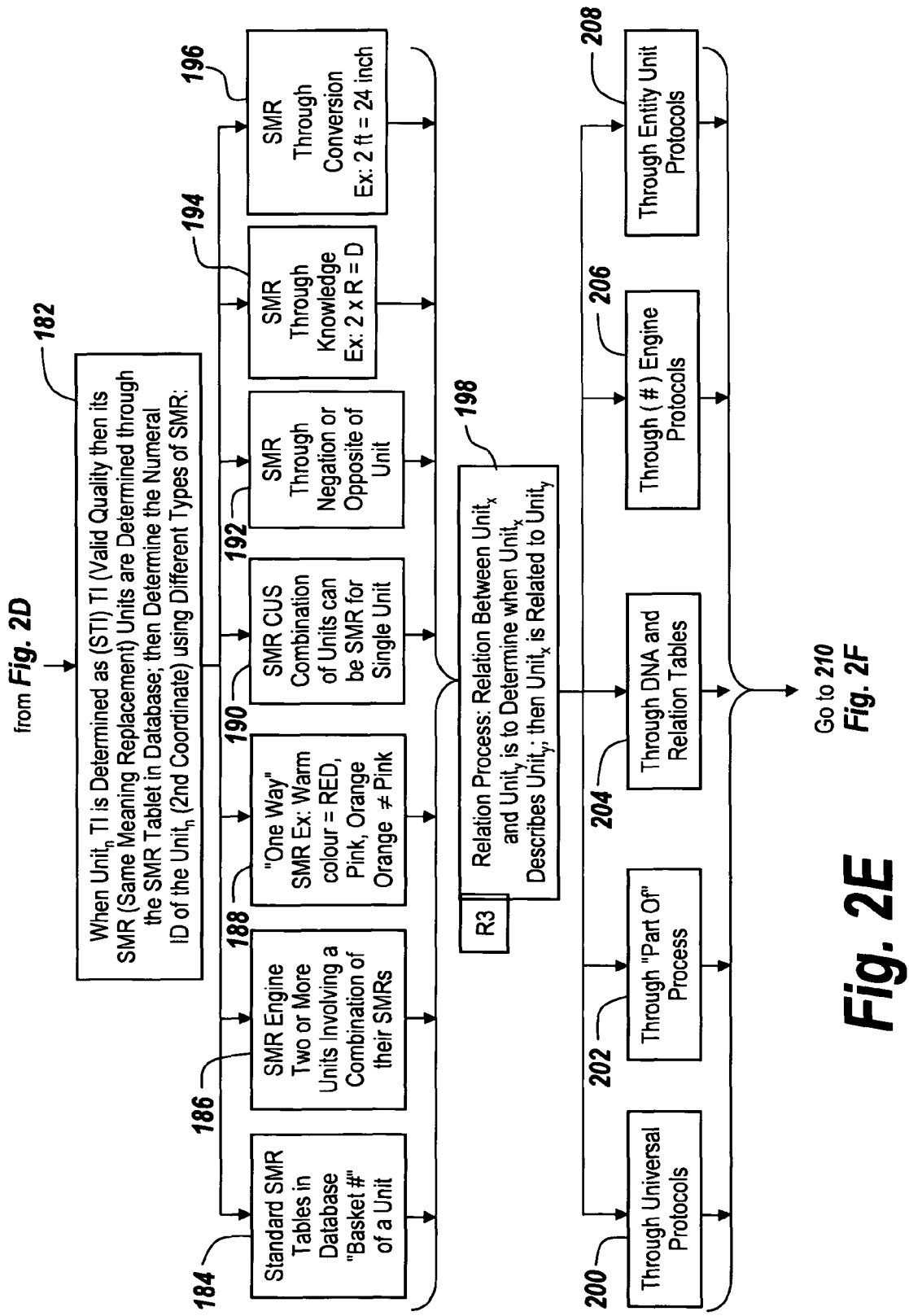

Referring to FIG. 2E, as illustrated at 182 when a unit TI is designated as a STI/MTI valid duality, then its same meaning replacement units are determined through same meaning replacement tables in a database. This determines the numeral identification of the same meaning unit which is the second coordinate in populating the matrix.

More specifically, the same meaning replacement functions have a standard same meaning database basket number 184 which places the same meaning replacements in a database basket for a particular unit.

As illustrated at 186 there is a same meaning replacement engine where there are two or more units capable of combination in terms of their same meaning replacement values.

As illustrated at 188 there is a one way same meaning replacement process meaning that there is only one direction in which one can replace one unit with another unit. This means that a unit may be replaced by another unit, but the other unit cannot be used to replace the first unit.

As shown at 190 the same meaning replacement CUS or combined unit structure involves a combination of units that can be the same meaning replacement for a single unit.

As illustrated at 192 the same meaning replacement can be through a negative or opposite of the unit.

As illustrated at 194 the same meaning replacement can be through a knowledge database, whereas as illustrated at 196 the same meaning replacement may be through a conversion table, especially useful for units of measure.

Having been able to determine the same meaning replacement for a unit as illustrated at 198 a relation process is invoked to establish the relation between one unit and another unit which is determined when a first unit is the same as the second unit. In this process a unit which is determined to be equal to another unit is said to relate to the other unit, thus supplying the relationship.

This relationship process is done through a number of protocols and engines, the first of which is through universal protocols 200, through a "part of" process 202, through a DNA and Relation Tables process 204, through a number engine protocol process 206 or through an Entity Unit protocol 208.

Figure 2F:
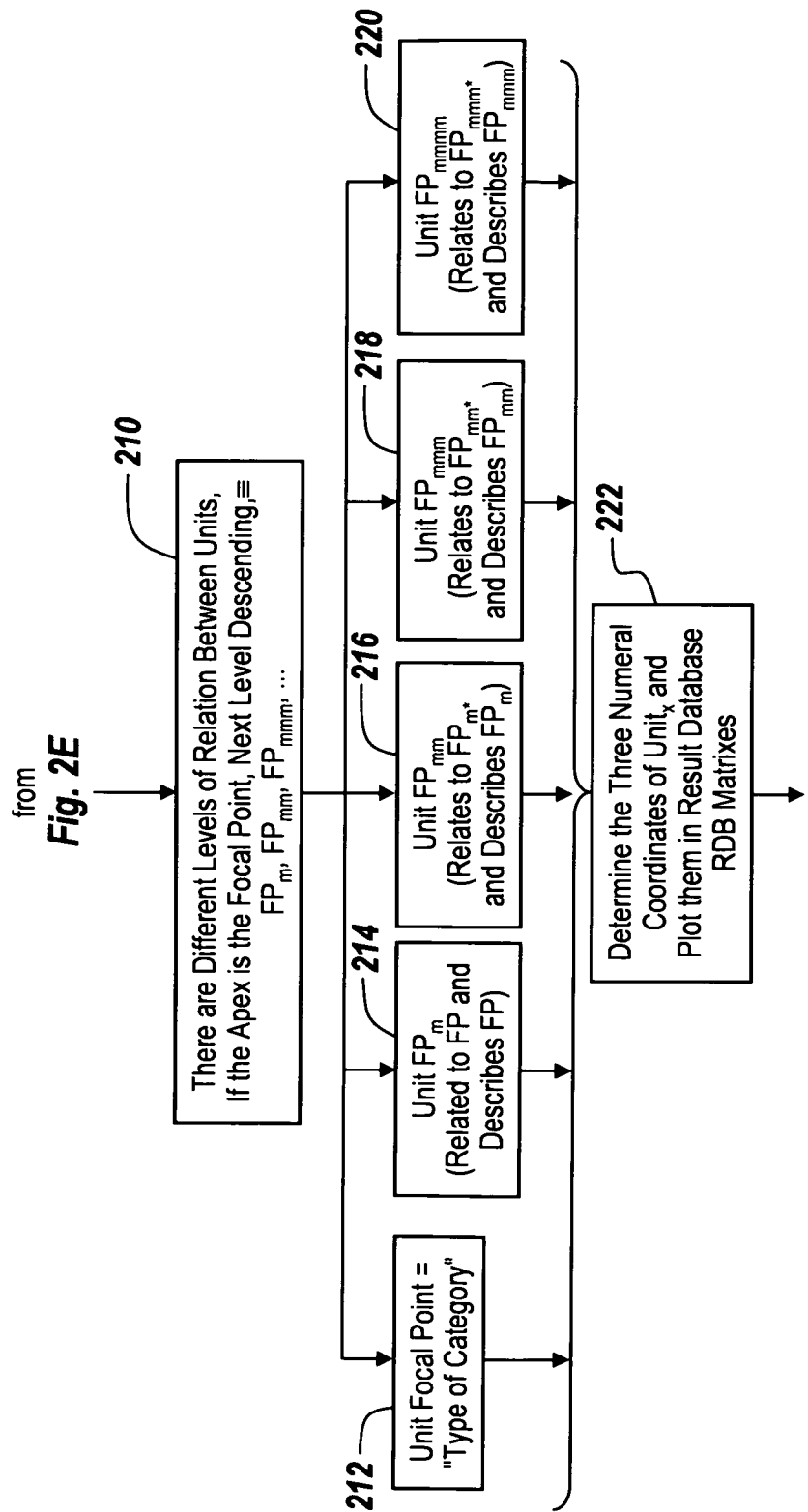

Referring to FIG. 2F, when there are different levels of relations between the units, if an apex can be determined as being a focal point, then one can describe next descending levels of relationship, meaning focal point m, focal point mm, focal point mmm, etc. as illustrated at 210.

The process of determining focal points is illustrated first by a Unit Focal Point, namely a type of category at 212, a Unit Point related to a focal point and its description as illustrated at 214, a Unit Focal Point which relates to a subsidiary focal point as illustrated at 216, a Unit Focal Point mmm that relates to Focal Point mm as illustrated at 218 where the focal point is. Finally, as illustrated at 220 the Unit Focal Point mmmm relationship to Focal Point mmm is established.

As illustrated at 222 from all of the above one can determine three numerical coordinates of Unit X and plot them in a result database matrix which will be described in FIG. 2G.

Figure 2G:
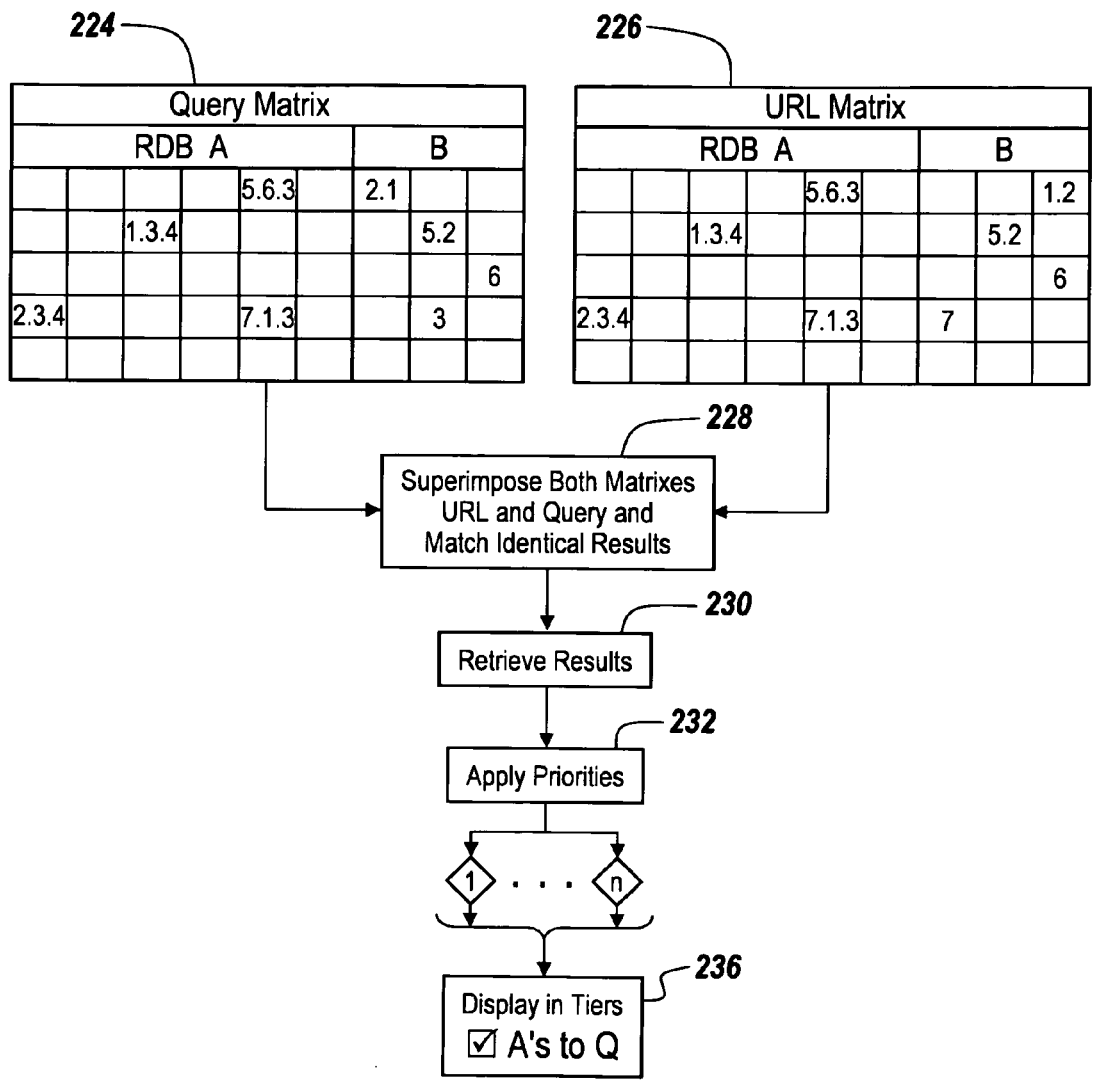

In FIG. 2G it can be seen that one has a query matrix 224 and a URL or result matrix 226. In each of these matrices there are data points having 3 components namelly the read, relation and recognition components. There would in any case be 2 different subsets in each matrix, one in which there is a match between the data points in the matrices and one in which there is not. As illustrated at 228 the system superimposes both matrices and establishes a match of identical results which is then retrieved at 230. After priorities 232 are applied the answer to a query is displayed as illustrated at 236.

As described above and hereinafter there need not be an exact match in order to return a result. If there is a partial match then techniques to be described result in the display of a result which has a higher or lower probability of being the answer to a query.

More specifically, in order to return an answer for a query there has to be a mapping or correlation between the query matrix and the answer matrix such that if the 3D coordinates in each of the points of each of the matrices correspond there is an exact match so that what is returned uniquely corresponds to the query. The level of correspondence can be thought of in terms of the number of correspondences that are "passed" in the answer matrix and the "passed" indications in the query matrix as illustrated by Group A. These matches in the query matrix and the answer matrix establish a correspondence in terms of the meaning between the query and the results. Also as can be seen in Group B there are a series of coordinates which do not pass the 3R test. The three coordinates are shown for the answer and query matrixes.

The correlation or matching process is one in which the matrices are superimposed on each other and are said to converge into identical results when there are sufficient number of exact matches; but also diverge to contain all the results that fall into the range of understanding of the input query or results.

The display of those results which converge provides an understanding of the query. If there is no match there will nonetheless be at least always a match of words and these matches can be returned in the same way as word search matching.

It is also possible for those results which are not exact matches to display a tier of priorities of matchings so that assuming that there is no exact match between the query matrix and the URL matrix one can nonetheless ascertain meaning from word search perspective.

Once one has superimposed the matrices and ascertained the level of matching one can understand not only the query sentence but also the results sentence so that without utilizing natural language one can have a result returned without natural language but rather with a system in which meaning is provided by the three values for a point in a matrix. Note it is Unit 1D number matching which is used in the super positioning and matching between the query matrix and the URL matrix.

Figure 3:
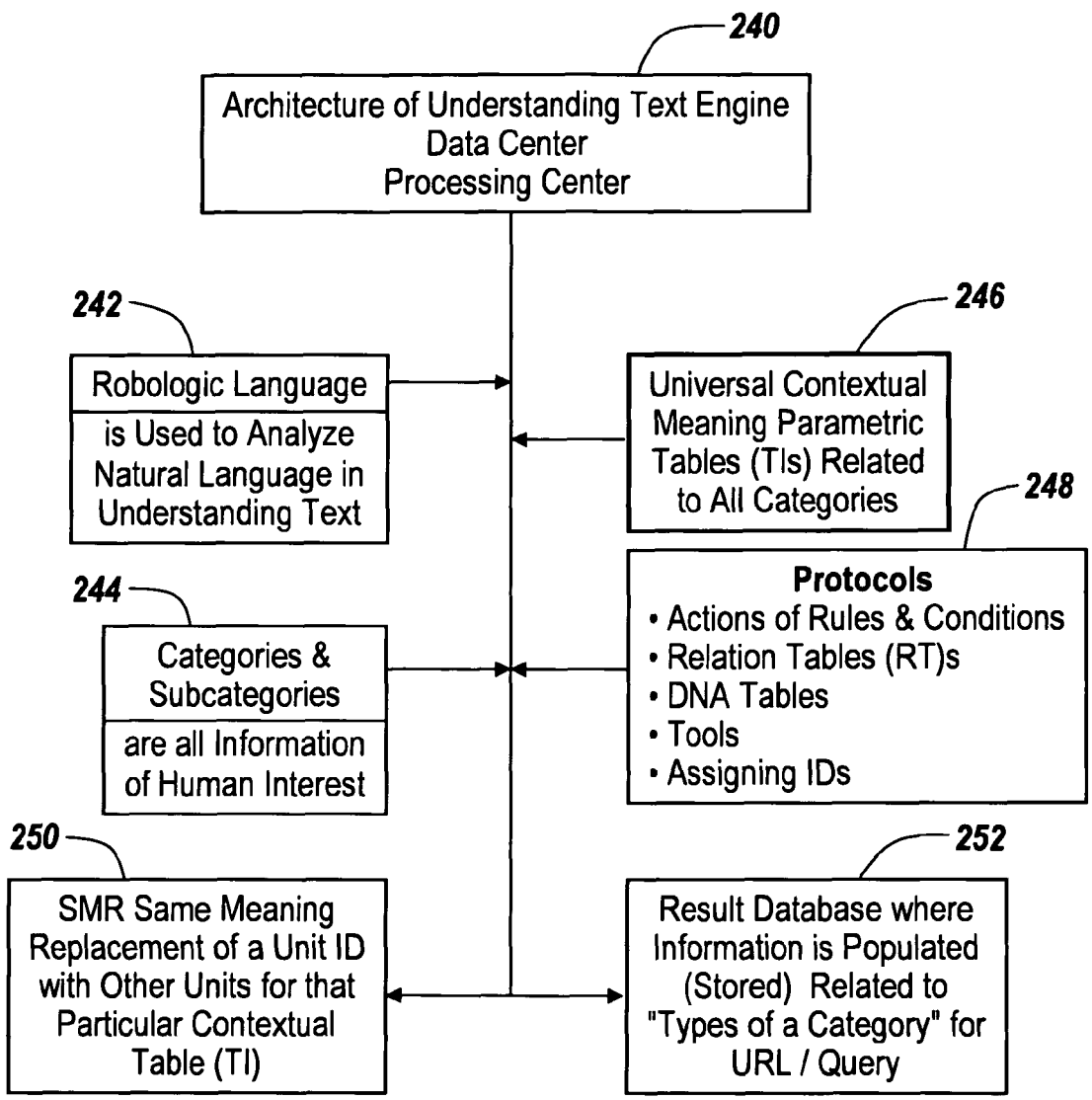
FIG. 3 is a block diagram of the architecture of the data processing center which is utilized in the system of FIGS. 1A and 1B.

Referring now to FIG. 3, the architecture of the engine for understanding text namely architecture 240 includes a data center and processing center.

The first element in the architecture for understanding text is the Robologic language 242. This is used to analyze natural language to understand the text. The technique is the use of categories and subcategories of the units in the text as shown at 244. These categories and subcategories describe all types of information of human interest and can be as simple as food and as complicated as "yellow cabbage".

The next portion of the architecture is illustrated at 246 to be a universal contextual meaning parametric set of tables related to all of the aforementioned categories. These contextual parametric tables are used to understand units in the text as will be described.

Finally, as illustrated at 248 are the protocols that are utilized in the text understanding that include actions of rules and conditions, relation tables, DNA tables, tools and also assign identification numbers to the units themselves.

Additionally and importantly as illustrated at 250 is the same meaning replacement process such that if the system returns one set of meanings for one set of units one can establish that same meaning replacement value for that set of units.

Finally, as illustrated at 252 there is a result database where information is populated from all of the above that creates a complete understanding of the text under analysis. This result database relates to types of a category for each URL or query. Thus, it will be appreciated that all the results that are generated are related to a type of category which may be a focal point.

Figure 4:
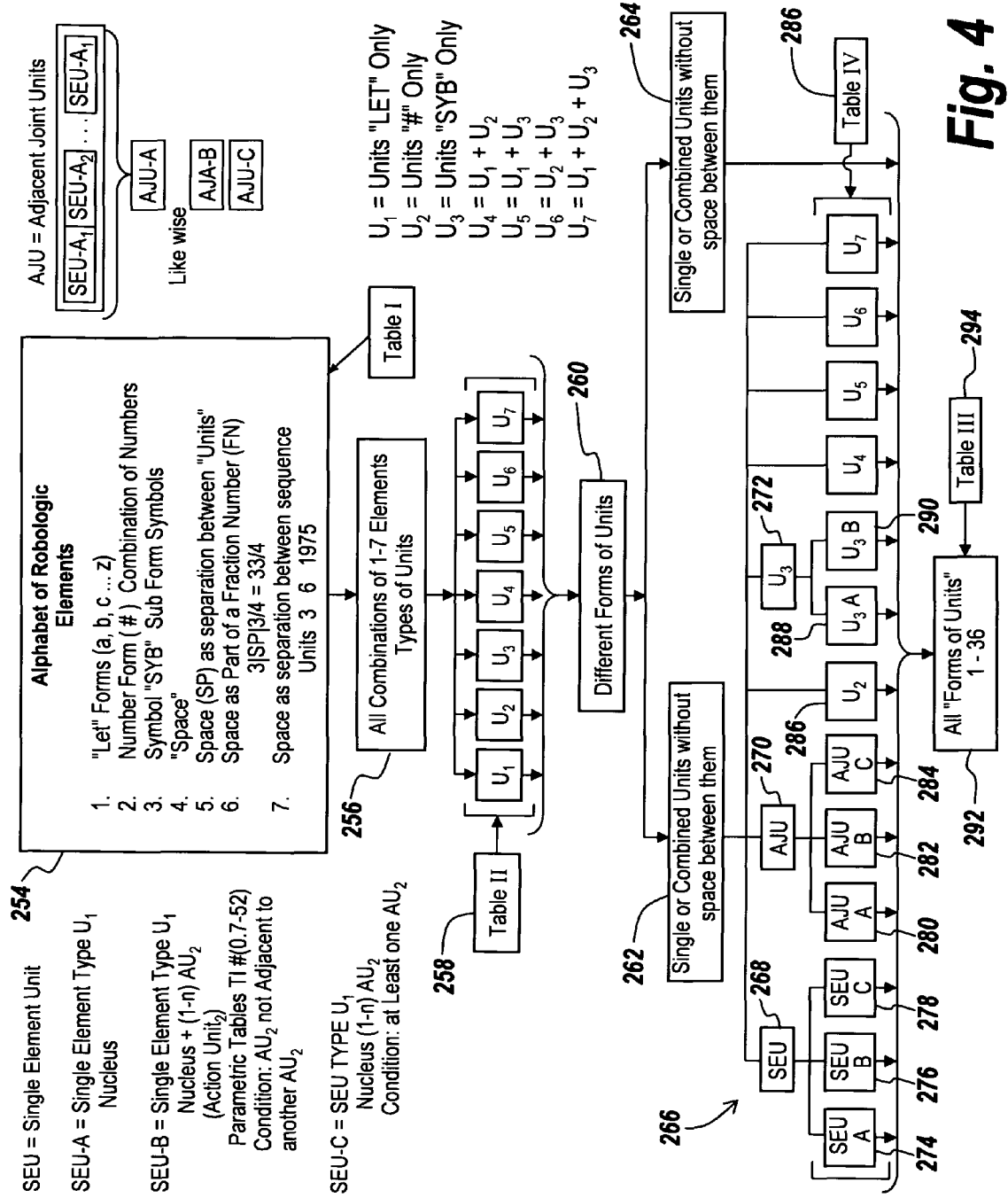
FIG. 4 is a diagrammatic illustration of the Robologic elements including the use of single element units and adjacent joint units to provide all of the possible units that can be generated.

Referring now to FIG. 4, what is now described is the Robologic elements of the Robologic language.

In order to understand text the text is converted into units and the single most important unit is the single element unit which exists by itself. This is labeled SEU. However, there can be Single Element Type U1 nucleus, and this is labeled SEU-A. Moreover, there can be Single Element Type U 1 nucleus, plus a number of action unit parametric tables and combinations which are designated SEU-B on the condition that the action units are not adjacent to other action units. Finally, there is SEU-C which is an SEU type U1 nucleus that has at least one action unit adjacent to another action unit.

Thus, as can be seen units can exist by themselves or in combinations with other units and other contexts and meanings.

Referring now to the alphabet of the Robologic elements as illustrated at 254 the elements of the Robologic language are 4 in number. The first are letters, A, B, C, etc. The second are numbers, namely #. The third are symbols such as for instance dashes, commas, etc. and the fourth are spaces which are useful in determining what words and units relate to other words. For instance a space can be a separation between units; a space can be part of a fraction number, and a space can be a separation between a sequence of units.

Thus, the system of FIGS. 1A and 1B first breaks down the text into the Robologic language as set forth above.

From the above, there are 7 types of elements as illustrated at 256. Table II, here shown at 258 categorizes these types of units as U1, U2 . . . U7 from which are derived the "forms of units" as illustrated at 260. The forms of units relate to either single or combined units without a space between them as illustrated at 262 or combinations with space between them as illustrated at 264. Thereafter as illustrated at 266 one has either a single element unit 268 or an adjacent joint unit 270; or units which are only symbols here illustrated by U3 and 272.

The single element units of 268 can be further subdivided into SEU-A at 274, SEU-B at 276 and SEU-C at 278, whereas the adjacent joint units at 270 may be further subdivided into AJU-A at 280, AJU-B at 282 and AJU-C at 284. Note that there are other units U2-U7 described in Table IV as illustrated at 286, with the units at $U_3$ being subdivided into $U_3A$ and $U_3B$ as illustrated at 288 and 290.

Having been able to characterize all of the units in terms of different forms of units then these units are further characterized an All Forms of Units process 292 to further characterize these forms of units into 1-36 forms of units in accordance with Table III, here listed at 294. It will be appreciated that all text will fall into one of the 36 different forms of units.

Figure 5:
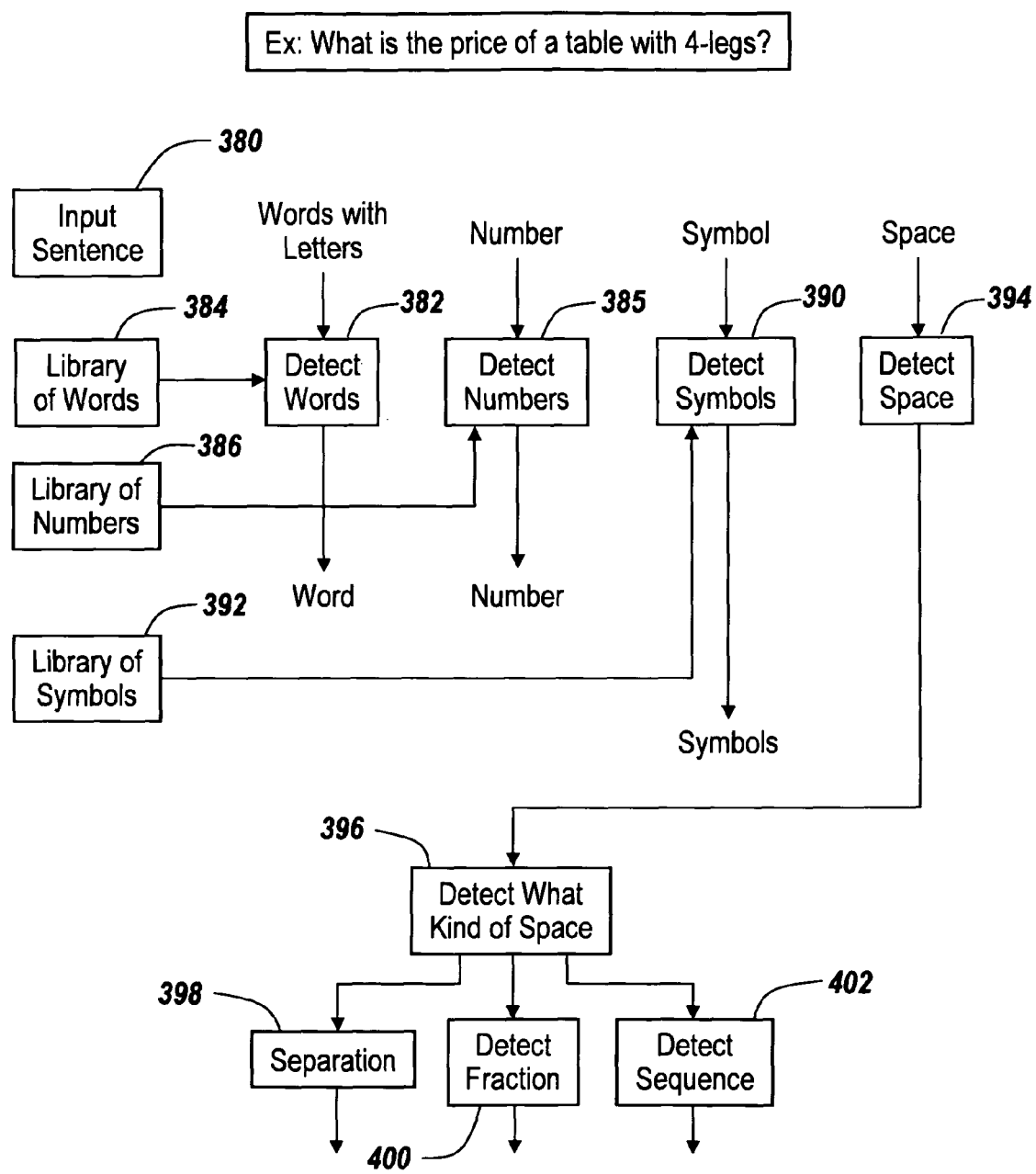
FIG. 5 is a diagrammatic illustration of the detection of words, numbers, symbols and spaces for purposes of analyzing text, also indicating the type of spaces including separations, fractions and sequences.

Referring now to FIG. 5, what is shown is how an input sentence, be it a query sentence or a sentence in a URL is analyzed. For each of the words, numbers, symbols or spaces in an input sentence here shown at 380, words are detected at 382 if they match words in a library of words 384. Numbers are detected insofar as the input sentence has numbers that are identical with a library of numbers 386, whereas symbols are detected at 390 through the use of a library of symbols 392.

Finally, spaces between the words are detected at 394, with the type of space being detected at 396 to be one of a separation between words 398, a fraction as illustrated at 400 or a sequence as illustrated at 402.

Figure 6:
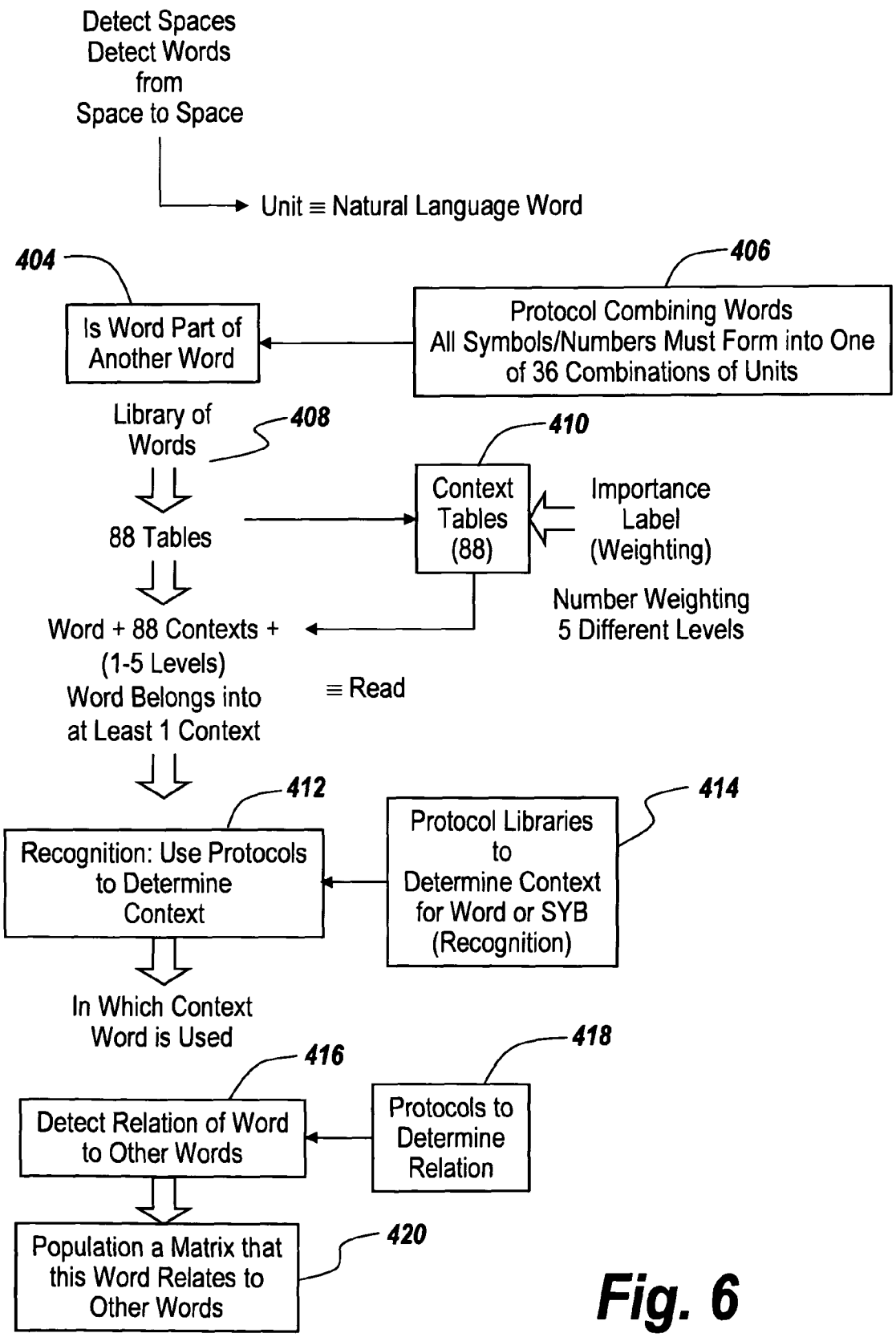
FIG. 6 is a diagrammatic illustration of the processes for combining words, symbols and numbers and the use of protocols to determine context by filtration in a recognition process, followed by a relationship process for determining the relation of words to other words, and the final population of a matrix with the results.

Referring now to FIG. 6, having been able to detect words, numbers, symbols and spaces the system constructs what is called a unit. A unit is a natural language word and is the result of having parsed the incoming sentence into the four different types of components that the word can be.

Having the output of FIG. 5 and referring to FIG. 6 one then as illustrated at 404 finds whether or not a word is a part of another word. This is accomplished through the utilization of a protocol 406 which is a combining words protocol in which all words must form into one of 36 combinations of units. If they can be classified in terms of 36 combinations of units then they themselves form a library of words 408 which is analyzed in terms of 88 possible contexts. This is done through the utilization of context tables 410 in which the words from the library of words are analyzed as to the various contexts that the words can take on.

As will be described later, each of the contexts may be weighted with a weighting label, in one embodiment with weighting corresponding to 5 different levels of corresponding to the strength of the contextual meaning.

The result is that a word with it 88 possible contexts, with the correspondence levels being 1 to 5 such that each word belongs to at least one context and oftentimes more. Having decided that a word has a certain context or contexts this corresponds to the read component of the 3R coding structure.

Having established the read component as illustrated at 412 one passes to the recognition component process which uses protocols as filters to determine in which context a word is used. The recognition protocols involve protocol libraries 414 to determine the context for a word. Once having decided what context a word is used in as illustrated at 416 one detects the relationship of the word in that context to other words. The relationship of the word to other words is performed through protocols 418 to determine the relationship between the words. All of this is followed by a population of a matrix as illustrated at 420 to provide a matrix that reflects what the word is and what the word relates to in terms of other words.

Figure 7:
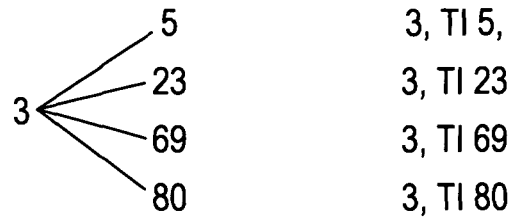
FIG. 7 is a diagrammatic illustration of the numbering of the units so as to establish context, recognition filter numbers and relation numbers for placing a unit as a data point in a matrix in accordance with the corresponding read, recognition and relationship values.

As mentioned hereinbefore and referring now to FIG. 7, the points in a matrix are coded numerically such that for each of the words each word has a unique ID associated with it. This applies not only to words but also to combinations of words, such that a given combination of words will have a unique ID.

Once having established a number that corresponds to a given word or combination of words, one assigns 1 of 88 contexts to a word. In the illustrated embodiment the word or combination of words in question is given ID number 3. This word or combination of words can have four different contexts for the use of this word and these are labeled for instance 5, 23, 69 and 80. The numerical coding is shown to the right in which word 3 is associated with context 5, context 23, context 69 and context 80 meaning that the word 3 can be viewed as having four contexts which are defined by the associated TI contextual parametric tables.

After having assigned contexts to a given word, the word is passed through a recognition filter which has its own protocols. The recognition filter filters out which of for instance the four contexts the word makes more sense as having for a particular location in the sentence. Here the word and context is associated with context 23. The numerical value for this recognition is therefore 3, TI 23.

Having filtered down the different contexts of the words through the recognition filter one then passes this word through a relation step such that for instance the word 3 associated with context table 23 has a relationship to other words, in this case relationship 1200 related to word 27TI77. Thus 3TI23 is related to word 27 having a TI77 relationship.

It is only necessary to note that as shown in matrix 422 a given point of this matrix has the values 3, 23, 1200 which are the 3D read, recognition and relation coordinates.

Figure 8:
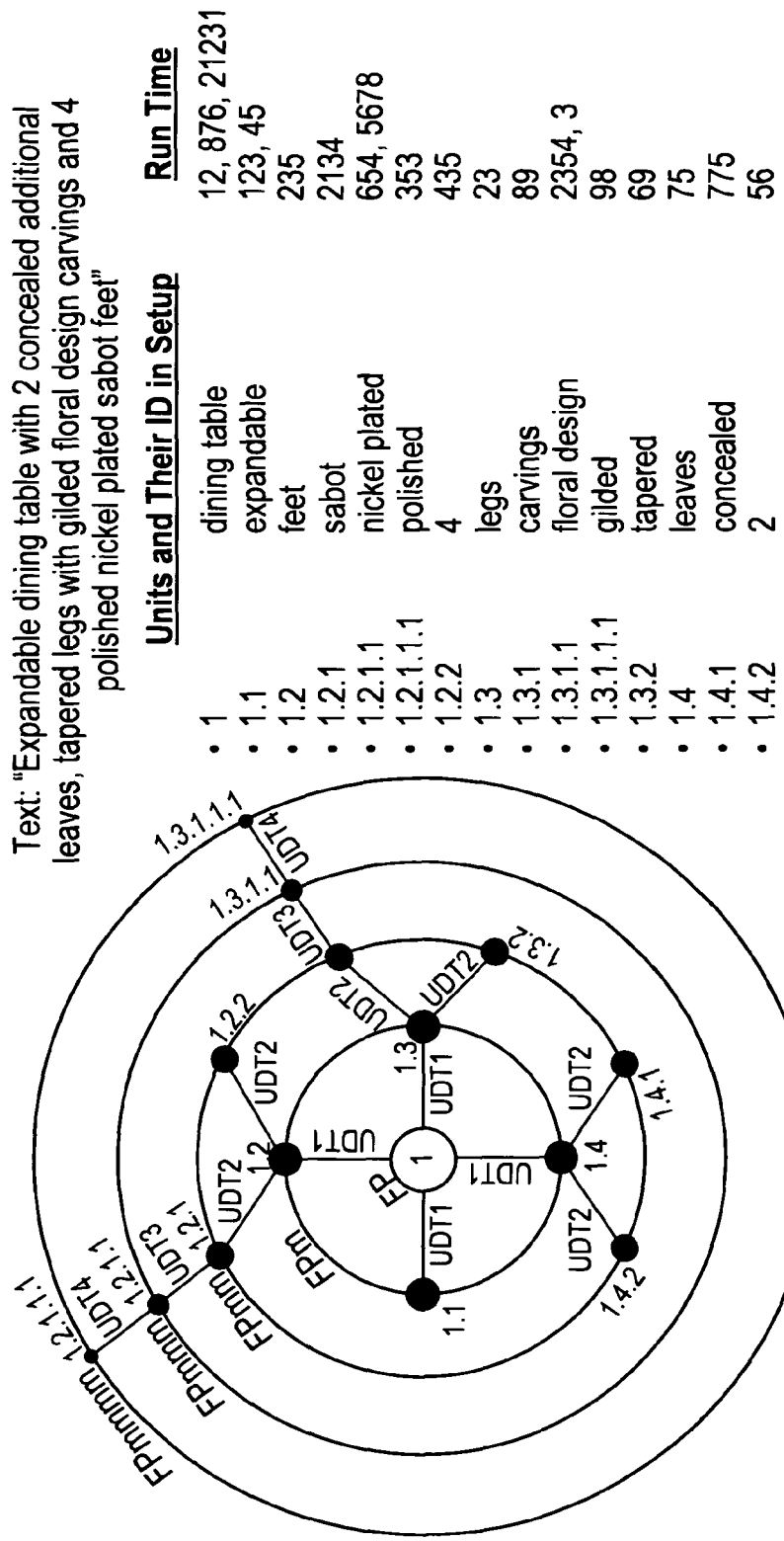
FIG. 8 is a diagrammatic illustration of the branching structure that describes the relationship between units from the focal point out to various levels, also illustrating a numbering system which describes the units and their relationships, also showing the unit description ties which tie one focal point to another at a different level for describing the levels of relation in a query or a URL.

Referring now to FIG. 8 and one possible numbering system, assuming the text is "expandable dining table with two concealed additional leaves, tapered legs with gilded floral design carvings and four polished nickel plated sabot feet", this text is analyzed by the subject system by providing first and foremost a focal point. The focal point in this case is a dining table which is given a numerical value 1.

The second attribute of the dining table is that it be expandable. The expandable dining table is therefore given a numerical value 1.1. The relationship of the expandable portion to the dining table is defined as the "unit description tie" level of relation line udt1.

Secondly, the dining table is to have feet. Feet are described by the numerical value 1.2. 1.2 has a relationship to the dining table again shown by line udt 1. The sabot is designated as 1.2.1. Sabot 1.2.1 has a relationship to feet 1.2 as illustrated by one of the volt2s.

The next item in the text is that the sabot must be nickel plated. Nickel plating is given a number 1.2.1.1. The relationship to a sabot is defined by udt 3.

Next it is important that the nickel plated sabot must be polished and this is given a reference number 1.2.1.1.1 and has a relationship denoted by udt 4.

This is how all of the key words in the text are related. The same is true for the fact that there are to be four sabots for the feet of the table, and this relationship is illustrated by udt 2 and 1.2.2, whereas the legs of the table are given a numerical value of 1.3 which is related to the dining table 1 through udt 1.

The same can seen for leg carvings having a floral design which are gilded in which the legs are tapered. Also contained in the analysis of the words of the text are the fact that there are leaves to the table that they are concealed and that there are two leaves.

What can be seen is that text can be analyzed or encoded with a numerical scheme that indicates not only the words themselves but also their connections to a focal point and other word elements in the text. As a result, through the numerical encoding of the text one codifies the understanding of the text.

Units and their ID at set up, and examples of run time ID are as illustrated.

As can be seen from the chart at the bottom of FIG. 8 the built-up code for a given word is shown. Each focal point unit ID at run time is given the number 1. For instance from the above if one is interested in the word "gilded" we can see that the runtime unit ID is #x.1=16, whereas during set up time it is #x.2=98 and during the read process #x.3=19.1. This same word during the recognition process is designated TI#.y=18, whereas in the relationship process its relationship to its other words is designated RE#z=1.[(14.15).(2354,3)TI17]. Finally the level of the relationship of the relationship designated by the relationship process is designated #x:1-5=5.

Specifically, the unit ID runtime #16 for the word gilded is as designated before, whereas the unit ID at set up time is designated 98 is as illustrated above; and wherein the unit ID at the read process is 98.1, where the 1 is the nucleus, The unit ID at the recognition process is TI8, with 8 being the parametric table 8. The unit ID of the relationship process is given by run time #14 and #15 which relates to floral design. Note that in unit ID and relationship process the 14 and 15 the word floral design carries a 14 and design a 15 for the two words which are related to the word gilded which at setup time is 2354,3. Note also that TI7 is the recognition parametric table for 2354,3, namely floral design. The relationship level in this case is designated 5, with the resulting relation code being 1.3.1.1.1.

Finally, on the bottom of this chart, and as described above, the word floral design has a run time unit ID of 14-15 and a set up time ID of 2354,31 with a read process ID of 2354.1, with a nucleus of 3.1, that being associated with design. In this case the unit ID for the recognition process is TI7 and its relationship process to gilded is: [16.(98.1).TI8] with a relationship level of 4 and a relationship code of 1.3.1.1.

From this table one can see the numbering system utilized in specifying the read process, the recognition process and the relationship process which form the 3D values for a matrix point.

As can be seen the meaning of text can be codified or encoded into numbers, with numbers forming the values used to populate a matrix which has as each coordinate 3 components to provide for a combined number at a coordinate of a matrix.

In summary, what is shown is a system for extracting non-natural language contextual meaning from text, in which the subject system utilizes a synthetic numbering system that encodes the words in the text, with a matching of matrices providing an exceedingly robust system for understanding input text.

Architecture

To reiterate, in order to set up the subject search engine the first and foremost portion of the architecture involves the structure of the Robologic library which is found in a database. The Robologic library establishes categories, contextual meaning parametric tables or TIs, and the DNA types of a category.

Categories, the contextual meaning parametric tables and the DNA types of the category are described hereinafter.

However, it is important in the creation of the architecture that one create a Robologic language. The Robologic language includes a Robologic alphabet which corresponds to elements of a unit or word. There are also types of units involved as well as combinations or forms of units and furthermore there are input units as well as fragmentation of units. All of these when created form the Robologic language that is utilized to analyze a text sentence. Finally, there is the assigning of identification numbers or IDs which corresponds to a numerical language where the IDs are assigned to units.

After having assigned identification numbers the contextual meaning of a sentence can be understood in terms of the series of numbers associated with the text.

Figure 9:
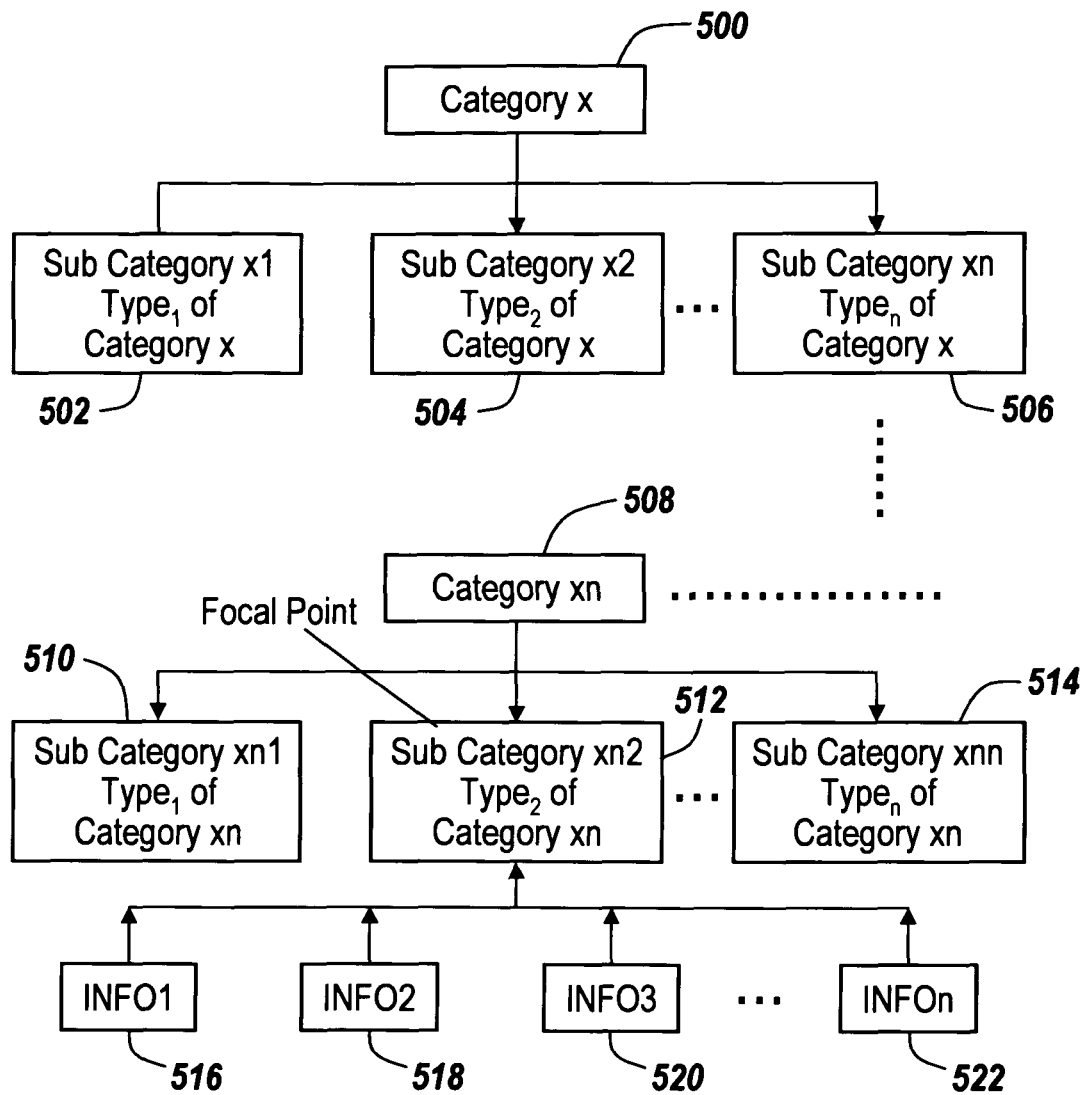
FIG. 9 is a diagrammatic illustration showing that categories used in the subject invention may include sub categories also showing that a focal point for a sub category may be the focal point of different types of information.

Referring now to FIG. 9, there are different types of categories. It is noted that different subjects of human interest can be categorized or grouped under a single name. When that is done the topic is said to be a category.

Having defined a category is this category can be subdivided into sub categories or further divisions that relate to the main category or to its subcategory.

Having defined what a category and subcategory is, being the most naked version of the category, it is possible that different units of information are related to a specific type of a category. When there is such a relation they are called focal point or focal points of a textual input.

To make this clear if one has a category x such as shown at 500 then there can be a subcategory of a certain type of category as illustrated at 502, whereas another subcategory can be a different type of category as illustrated at 504 or for instance there can be any number n of subcategories of the category as illustrated at 506. Assuming that we take as a category the nth category as shown at 508 then it is possible that there can be a subcategory of category n as illustrated at 510, whereas there can be another subcategory of category n as illustrated at 512 and yet a third category of category n as illustrated at 514. Here, subcategory 512 is the focal point as derived from units 516-522 which together define a focal point The result of this is that one can establish a hierarchy of categories. When trying to understand what category certain text corresponds to the information can be mapped to a particular focal point subcategory, in this case subcategory 512 such that information 1, 516, information 2, 518, information 3, 520 and information n 522 can be established as belonging only to a particular subcategory.

When this is accomplished then one can understand the input information in terms of a particular category. Thus for instance if for category 500 we have a number of subcategories and that is the only set of subcategories that exist for a particular input then one can establish that particular subcategory as a type of category. If however the particular category such as shown at 508 has a number of other subcategories, then if the input word or sentence corresponds to only one of those subcategories then that is the focal point of the query sentence or the results sentence.

It will be noted that if all of the input information on the URL or the query sentence relates to a single subcategory or any other category, then that category becomes the focal point of the query or the result.

As to the contextual meaning parametric tables or TIs, the parametric contextual meaning tables refer to selected contextual meanings that through them one can describe all information related to all categories.

Referring to FIGS. 10A and 10B what is shown is the contextual meaning parametric tables labeled from 1-88 which serve as the universal contextual meaning parametric tables for all types of human discourse. The purpose of the contextual meaning parametric tables is to associate a particular contextual meaning with a particular unit.

It will be seen that the contextual meaning parametric tables under GETEX refers to general contextual meaning for general text, whereas the contextual meaning parametric tables under PATEX are the contextual meanings for particular text, followed by auxiliary contextual meaning parametric tables AU1, AU2, AU3, AU4, AU5 and AU6. In addition there are contextual meaning parametric tables to refer to characteristics such characteristics 59-87, whereas there are contextual meaning parametric table to establish whether or not an input word is a proper noun or not.

It has been found that all information that is useful falls into one or more of these 88 contextual meaning parametric table categories.

It is a finding of the subject invention that all the information in the world can be categorized or described by one or more of the contextual meaning parametric tables.

With respect to the DNA of the types of a category, these types of categories are contextual tables for a type of category. What is meant by the DNA of the types of a category is as follows. By way of definition the DNA of a type of a category is all the information, both general and specific, in the form of units that describe or are related to a specific type of a category. The DNA of types of categories is collected and entered into the tables of contextual parametric tables based on human experience. Note in FIG. 15 all of the contextual meaning parametric tables define the DNA of Unitx which is a type of category.

It could be said that the DNA is the measuring tape to equate information to a specific type of a category. Moreover, DNAs for a particular type of category can be classified or sorted according to various levels such as "extremely important", "very important", "important" and "optional".

In order to do this units are classified as "signature" units where they are very important and must be associated with a particular type of category. Units are classified as "essential" if they are very important; with units classified as "rank 1" being important and units classified as "rank 2" being optional.

Thus it will be seen that not only can the DNA of a type of category be ascertained, the units are associated with this DNA can be further classified in terms of importance as related to a type of category. When one has established a particular type of category one can rank the type of units associated with that category as being extremely important, very important, important or optional by labeling it in the above fashion.

It will be appreciated that the DNA of a type of category establishes the relation tables that are used in protocols to generate the Robologic language.

The next step in creating the architecture of the search engine is the creation of the Robologic itself. As mentioned hereinbefore the Robologic language involves alphabetic letters, number, symbols and spaces. Also as described above spaces can take on a number of different meanings. For instance one meaning of the word space is that it defines a symbol for a fraction. Moreover a space can be used as a separation and binding factor for whatever sequences that are presented in terms of a query or an answer. Finally, space is used to define the boundary of a unit that indicates for instance the end of a unit and also the beginning of a unit.

Having been able to convert the input text into the Robologic language in terms of letters, numbers, symbols and spaces one can create the aforementioned 7 types of units which are combinations of units as illustrated in the table of FIG. 11. Here the first unit, U1, is a combination of letters only, whereas U2 is a combination of only numbers and whereas U3 is a combination of only symbols. U4 is combinations of U1 and U2 without a space, whereas U5 is a combination of U1+U3 without a space, U6 being a combination of U2+U3 without a space and U7 being a combination of U1+U2+U3 without a space. Finally, the last types of elements is a combination of U1 . . . U7 with a space.

Referring to FIGS. 12A-12F there are the aforementioned 36 possibilities of units that can elaborate on the types of units, such that for the 36 different combinations there are 36 different forms of units that all written text can be composed of.

It will be appreciated that the tables of FIGS. 12A-12F define the 36 different forms or combinations of units. The definitions of each of these units are self-explanatory. For instance, unit 1 relates to a unit composed of all letters. Unit U-2 are words that are units plus action words. It will be appreciated that the second form of units is different form the first form of units because it is not SEU-A but rather SEU in which it is a special type of unit that are not nucleuses. For instance, the letters ED could be associated with a suffix but the subject system does not utilize natural language grammar in order to establish meaning. Therefore such things as E, ED, IZE, AITI, etc. are classified as special units which cannot be built on.

It will be noted that when there are different types of units and they are combined together to play as one whole unit the forms of units can either result in the same or different contextual meanings.

At this point it is noted that one can introduce a unique form of unit named a "nucleus". In terms of forms of units and FIG. 12A U1 is a nucleus. A nucleus is when a unit is reduced its size by taking out letters and still retains its original contextual meaning. This then the smallest size of it is the nucleus (NUC) of the unit. This nucleus is designated in the Robologic language as SEU-A meaning single element unit type A. Around the nucleus may be certain types of units called action units or AU, such that action units are connected to give a different form of units.

In terms of forms of units, Table II, when connected to one or more AU units which are not adjacent to each other, then they are designated as SEU-B, and when any one of the units in AU2 are adjacent to each other other than when they are SEU-C then this means that each word is devolved into its Robologic equivalent.

It will be appreciated that when a unit has two or more nucleuses adjacent to each other, then they are designated as adjacent joint unit or AJU-A, AJU-B, AJU-C, etc. Thus a unit that has more nucleuses may actually be classified as adjacent joint unit of a certain type. It will be appreciated that the use of adjacent joint units of a certain type enables one to provide equivalences of meaning for various nucleuses.

As to Form of Units 3, and FIG. 12B one has a combination of a nucleus plus an AU2 with the condition that none of the AU2s are adjacent to each other. It is noted that in the parametric tables one has a list of AU2s. When there is a combination of nucleuses plus AUs that are adjacent to each other and at least two are adjacent, one has Form of Units 4 and is labeled SEU-C.

As can be seen for the Form of Units if one has an attached joint unit nucleus and one can have a number of nucleuses. This is labeled AJU-A, whereas for the Forms of Units when one has a number of nucleuses plus an action word it is labeled AJU-B etc.

Thus what can be seen is that there are 36 different combinations of permutations that are identifiable in the input text. The point of this exercise is that all units, be they letters, numbers, spaces or words can be categorized in terms of the 36 forms or combinations of units. Now that one has 36 different forms of units or combinations of units one can analyze all written text and convert it into the Robologic language.

In the creation of the Robologic language there is also the notion of an input unit. This is shown in FIG. 13. When there is a single unit or multiple units adjacent to each other which are considered as a single unit they are used as input units for the "part of" process which is to determine if a unit is part of a larger unit. This is done by combining its adjacent units, so as to form one of the forms of units, namely one of the forms of units 1-36. The input units are part of other units which are going to form combined units designated the forms of units. It will be appreciated that all types of text are made of single units.

It will also be appreciated that the combinations or forms of units are 36 in number. However inside the 36 units are parts of units which are designated 1-13 in FIG. 13. The purpose of the parts of units processing is to determine which if units are supposed to be or can be part of a larger unit. These are called input units.

Thus all larger units are made of the 13 input units.

One portion of the creation of the Robologic language has to do with fragmentation. Skipping ahead, fragmentation is shown in FIGS. 17A and 17B fragmentation is a process or breaking down or separating into different forms of units those units that are composed of two or more units to yield SEU single element unit units. It will be appreciated that fragmentation is utilized to ascertain equivalences when one can equate fragments or parts of units. In order to be able to understand that there is an equality or correspondence between various parts of the units the process one breaks or separates different forms of units that are composed of two or more units to yield a single element unit.

In short, by fragmenting the units so that the fragments can be analyzed in terms of context if a unit has a multiple context and one fragments it one can inspect individually each of the fragments with respect to the context to see if it is the proper context. This enables matching to combined units. For instance, if one has written the unit "anti-corrosion" then one has to understand in matching that one has anti-corrosion in which "anti" is one fragment of a unit and "corrosion" is the other fragment of the unit. Then by fragmenting the unit one can match each of the fragments to a unit.

In summary fragmentation establishes fragments of a unit and the equivalences of each of the fragments to other fragmented units. Thus for instance if one is searching for anti-corrosion materials one can also search for anti-rusting materials since rusting and corrosion are equal meaning fragments. In short, the fragmentation of units allows one to establish equivalences because the units can be subdivided into fragments and the fragments themselves can have equivalences such that if a unit has a fragment 1 which is equivalent to another unit that has a fragment 1 then when compared they will result in the same result. What is now described is the number assignment engine for assigning IDs to the units.

Assignment of IDs

Referring to FIGS. 14A and 14B, a scheme is described to assign IDs to units.

As can be seen in FIG. 14A, for the first identification number there are 8 set up time numbers. Set up time number 1 is a unique ID in the database, whereas set up time number 2 is a category type, set up time number 3 is a form of unit, set up time number 4 is a fragmented unit, set up time number 5 is a nucleus unit, set up time number 6 is a DNA of a type of category, set up time number 7 is a same meaning replacement value basket and set up time number 8 is a parametric contextual table number.

Moving to the right one has for a second ID taking for instance set up number 1 which is the unique identification in the database ID number 2 is the specific word in the database that uniquely identifies the unit. Thus for SUT1 one has SUT1, #x. This identifies the word in the database that is unique for the unit.

With respect to SUT2 which is a category type there can be n type of different categories described as ID2 such that the category type will be SUT2, #1, #2 . . . #n whatever the category is for the unit.

With respect to the SUT3 the form of unit can be 1 of 36 forms or combinations of units which number is derived from the aforementioned table such that for the forms of units one has SUT3, 1-36 relating to the SUT1 word so the SUT1 word has a form of units designation to it.

SUT4 relates to fragmented units which can be from 1-10 which is composed of the forms of unit 1-36 such that for instance SUT4 can be 1 of 10 fragmented units and 1-36 combinations or forms of units for the SUT1 word or unit.

SUT5 is the nucleus unit which is defined by a certain number such that SUT5 is a nucleus that is associated with the unit of word of SUT1.

SUT6 which is the DNA type of a category can be any one of n DNAs or types of categories that can be applied to the DNA of 1-n types of units.

It will be appreciated that there are subcategories for the DNA which are essentially levels of DNA such that 6.1 is a signature level, 6.2 is an essential level, 6.3 is a rank1 level and 6.4 is a rank 2 level all of which can be added to the SUT6 string to provide the type of level of DNA.

SUT7 is the same meaning replacement basket number which can be 1 to n such that as can be seen to the right SUT7 can have a replacement number 1-n.

It will be appreciated also that SUT7 can be subdivided into regular same meaning replacement values or those associated with a protocol such as shown in 7.2.

Finally, SUT8 refers to the parametric contextual tables or TIs that are utilized in the generation of the Robologic language system. Here for instance SUT8.1 refers to the title of the unit, whereas SUT8.2 relates the implication of the title, whereas SUT8.3 refers to a strong or active parametric contextual table, whereas SUT8.4 refers to a passive or not so strong parametric contextual table, whereas SUT8.5 refers to a parametric contextual table which serves as a background function and finally SUT 8.6 refers to an implied parametric contextual table.

Having defined the setup time assigning of IDs, one goes to the run time or temporary assignment IDs.

Referring to FIG. 14B what is shown is the assignment of IDs in run time.

In the run time scenario RUT1 assigns segments to the text which is split up into segments. The location RUT1 refers to the location of the unit with respect to the location of a segment.

RUT2 relates to the location of the unit in the segment, with RUT1 being the beginning of the segment, RUT2 being an intermediary portion of the segment and RUT3 being the end of the segment.

RUT3 relates to the form units which is the form or a combination of units which can be 1 of 36 different combinations or forms of units.

RUT5 is important because it establishes that there is no database entry for a given unit. Thus this establishes that the database cannot read a particular unit.

RUT6 establishes which of the protocols is to be utilized in the understanding of the text and it is based on the sequential number of the protocol.

RUT7 is the same meaning replacement basket value, whereas RUT8 refers to the relationship table and more particularly to the particular relationship table invoked.

RUT10 relates to the relation table to relate to other units based on the level of relation so that if there is a relation of one unit to another unit, unit 1, unit 2, etc. the relation between the units can be established.

RUT11 refers to whether or not a unit is an inquiry, whereas RUT12 establishes whether a unit is in an answer or URL.

Finally RUT13 establishes whether the unit is in the title of the URL or answer.

Thus in runtime all of the above are numerical indicators to indicate during runtime the contextual meaning of the input text and to facilitate the return of an answer to a query, basically giving identities to the units during runtime.

Read Processes

Figure 16:
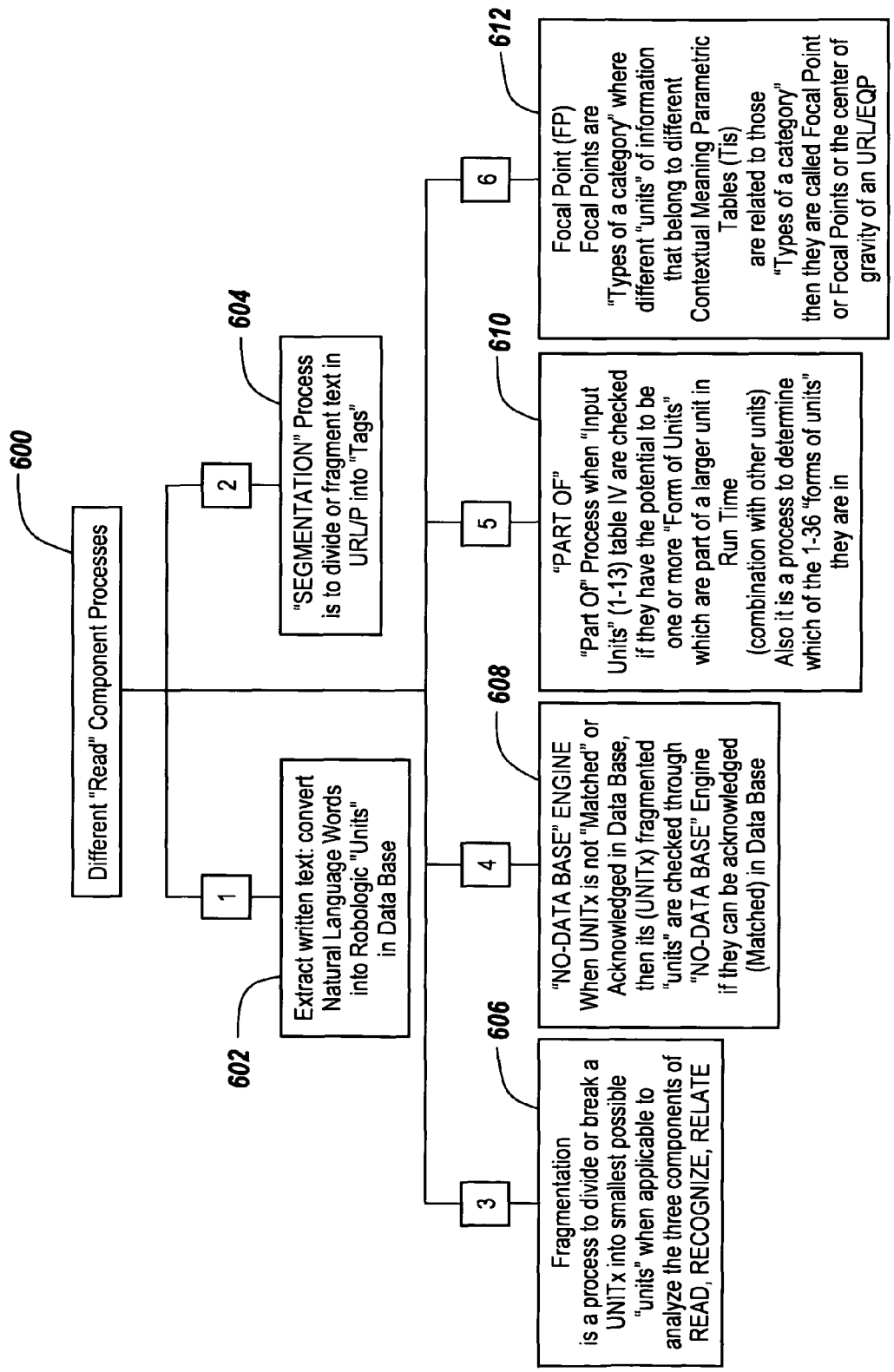
FIG. 16 is a flow chart showing the different read processes including the extraction of text which is converted into Robologic units in a database as well as a process of segmentation to divide up or fragment the text, also illustrating the fragmentation processes, a no database engine to indicate when units are not matched in a database, a "part of" process where input units are checked to see if they have the potential to be in one or more forms of units which are part of a larger unit and a focal point determining process in which types of categories are established as focal points.

Having described the architecture in terms of the actual performance to return answers to queries what is now described is the read process. Referring to FIG. 16 here it can be seen that there are different processes for implementing the read component shown at 600.

Specifically, as shown at 602 one extracts the written text and converts natural language words into Robologic units. In so doing the units returned are matched in a database. After having matched the units to the database a segmentation process shown in 604 is performed to divide up or fragment the text in an input sentence such as in a URL into tags. By tags is meant the tags referred to herein are source code tags that define the beginning and end of the information in the text. The text is segmented in order to be able to locate where one piece of information related to other pieces of information.

The process as illustrated at 606 is a fragmentation process. The fragmentation process is a process to divide or break unit into its smallest possible units so as to be able to use the smallest possible units and analyzing the three components of the Robologic language namely the read, recognize and relate components. The purpose of the fragmentation in general is to get at the nucleuses or the focal point of the words and in order to do this there are ten different types of fragmentation depending on the form or combination of units 1-36 of FIGS. 12A-12G. In short, the purpose of the fragmentation is to break up a unit which is 1 of the 36 forms of units into smaller units. In terms of the read component it is the purpose of the fragmentation to acknowledge a Unit X when Unit X does not match in a database. By fragmenting the units into subunits one can get at the root or the meaning of the particular fragment so that during the read Oprocess one can relate the contextual meaning to a fragment as opposed to a whole unit.

For the recognition component the purpose is to determine the contextual meaning of the Unit X in the parametric tables during run time.

Referring to process 610 this is the "part of" process. When input units namely units 1-13 in Table IV are checked if they have the potential to be 1 or more forms of units which are part of a larger unit in run time then they may be combined with the other units. There is also a process to determine which of the 1-36 forms of units the part of units are part of. The whole purpose of the "part of" process is to see if one unit is part of a bigger unit. This makes the analysis of the query or the text more simple because one only has to analyze the larger part of unit in order to obtain meaning.

Finally, the focal point processing is shown at 612. The focal point is the unit that is associated with the type of information one is ultimately searching for. It is the point by which one seeks to search text. The focal point in essence a type of a category where different units of information that belong to different contextual meaning parametric tables are related to one type of a category. The focal point is therefore the center of gravity of a query as well as the center of gravity of the response or URL.

Note that in a URL there may be 1, 2, 3, 4, 5 types of categories. There may be information in the query or the URL which is related to one or two of the types of a categories.

Note also that after defining a category this defined category has a number of different types of categories.

Thus it will be appreciated that while there may be many types of a category for a given query or URL it is important to be able to isolate what the focal point of the query or the URL is from many types of a category and to do so one utilizes a number of different protocols to be able to ascertain the focal point of the query or the URL. Thus by ascertaining the focal point one can filter out all of the non-response correlations between queries and answers while honing in on the most logical and most strong correlation between a query and an answer. In order to be able to understand a query and to understand a URL the focal point of the query or the URL must be established. One of the ways to establish the focal point of for instance a URL is to look at the title and the title will give some indication of what the URL is supposed to be about. The second way is to analyze a URL in terms of the number of times a particular unit has been discussed. If the particular unit is being discussed a number of times it is very likely that this unit is the focal point of the URL. Thirdly, if there are specific attributes of the unit which are mentioned more than one time or have a certain significance such as price of an element of some sort or other one knows that one is shopping. One knows what one is shopping for because of the title of the URL and one can ascertain further what one is shopping for not only from the title and the price but also the number of times in a URL that an item is mentioned.

Fragmentation

More specifically with respect to fragmentation, in terms of the recognition component of the Robologic language the fragmentation allows same meaning replacement by fragmenting Unit X. By fragmenting Unit X one can ascertain the combination of each same meaning replacement and generate all possible same meaning replacements for Unit X.

Finally, as to the relate component the purpose of fragmentation is determine the relationship of Unit X to other units in run time.

Referring to FIGS. 17A and 17B there are in essence 10 different types of fragmentation where the first type of fragmentation is the mixed entity fragmentation. Note that entity is 1 of the 36 forms of units.

The second fragmentation or the B fragmentation is the mix CUS which is one of the combined forms of units.

As to C there is a mix/U7 CJU. This relates to the combined units.

As to D one has a unit U1 and a unit U3 and an AUJ which is 1 of the 36 forms of units with the fragmentation being between nucleuses or symbols.

Without going through the remainder types of fragmentation it will be understood that the types of fragmentation derive from the forms of units and the combinations listed relate to these forms of units and how they are combined.

No Database Engine

Having discussed fragmentation there is no database engine function illustrated. This no database engine function is important because oftentimes a unit is not matched or acknowledged in a database. Once this has occurred then the unit is fragmented into subunits that are checked through the no database engine. If the units cannot be found in the database they are fragmented at which point they will be matched to at least some of the fragments in the database so that in the reprocess whether or not Unit X is itself in the database its fragments will be and therefore it can be analyzed by substitution. What this says is that in the case where there is no database match the read process can still continue because of the fragmentation for which there will always be components in the database. It will be noted that if the fragments are matched the unit will be matched therefore a recognition in the read process has been accomplished.

Run Time Example

Figure 18A:
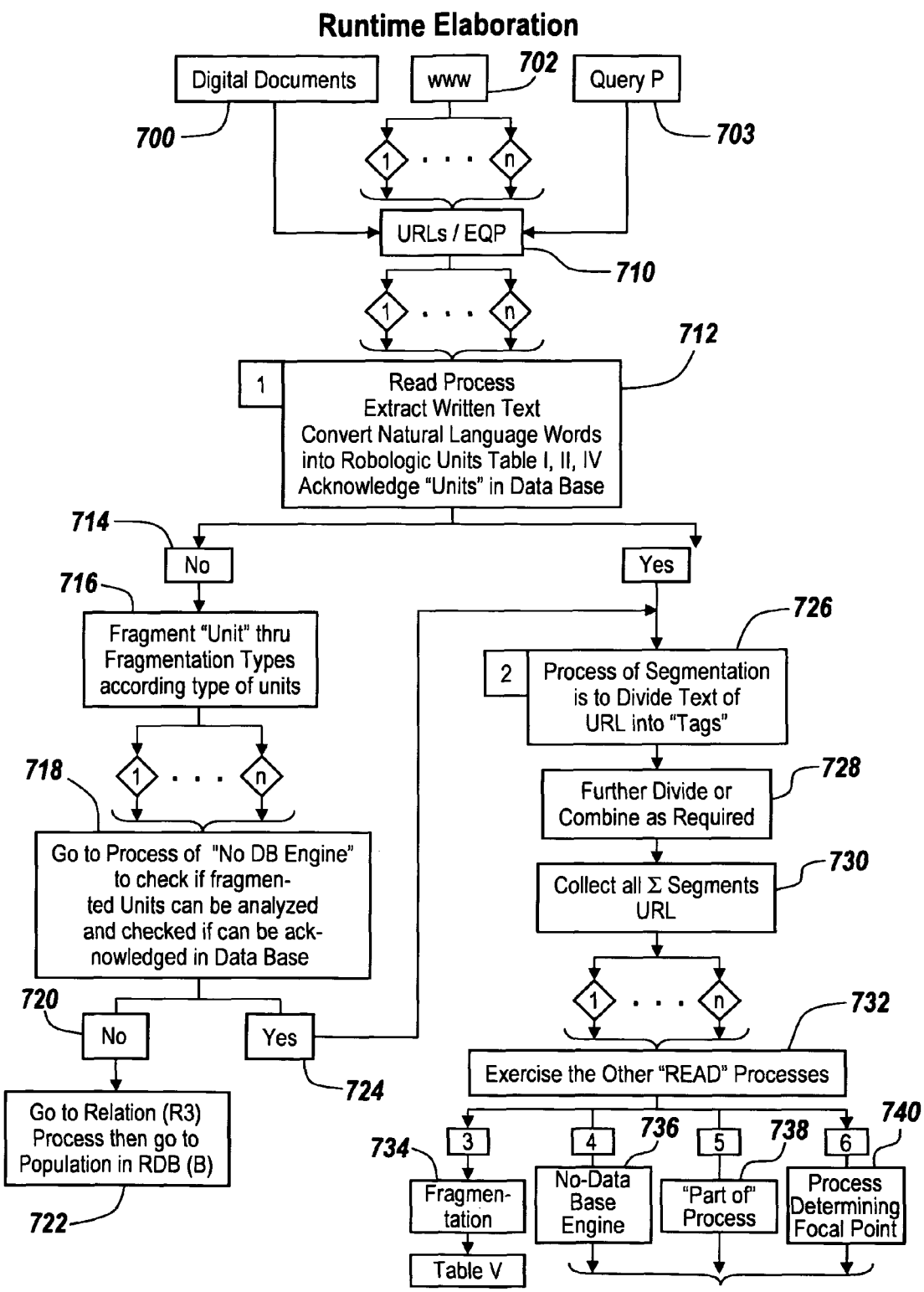
FIG. 18A is a diagrammatic illustration of the read process, illustrating a run time elaboration that ends up with either unfragmented units or units that are either fragmented or are not found in a database using a no database engine, are part of the "part of" process, or part of the focal point.

Referring now to FIG. 18A, assuming that one has digital document 700 the Worldwide Web 702 and a query 703 the digital documents and the Worldwide Web as well as a query are inputted into a numbering engine 710 which numbers the units associated with the digital documents, the Worldwide Web and the query. Having numbered the units the read process as illustrated at 712 extracts the written text to convert the natural language words into the Robologic units associated with tables I, II and IV in which one seeks to acknowledge whether or not the units are in the large database. If the units are not in the large database as illustrated at 714 the units are fragmented as illustrated at 716 according to the fragmentation types and according to the types of units that are involved. As illustrated at 718 the fragments go to a no database engine to check if the fragments can be analyzed and if they can be analyzed they can be acknowledged as being within the database. If they are not able to be acknowledged within the database then as illustrated at 720 they are passed to a relation process 722 and are then populated into database B indicating neither the write nor the relationship nor the read components have been found at any database. The result of not having passed is the placement of these units in a no result database, in this case database B. On the other hand if the units or their fragments are found in a database this is acknowledged at 724 and is then passed to a segmentation process 726 to divide the text of the URL into tags as mentioned before. Thereafter the result is further divided or combined as required as illustrated at 728.

After the combining and as illustrated at 730 all segments of URLs and queries are collected after which point as illustrated at 732 other processes are exercised. These processes include the fragmentation process 734, the no database engine 736, the part of process 738 the output of which is that passed to the process shown in FIG. 19 and the focal point determining process 740.

Figure 18B:
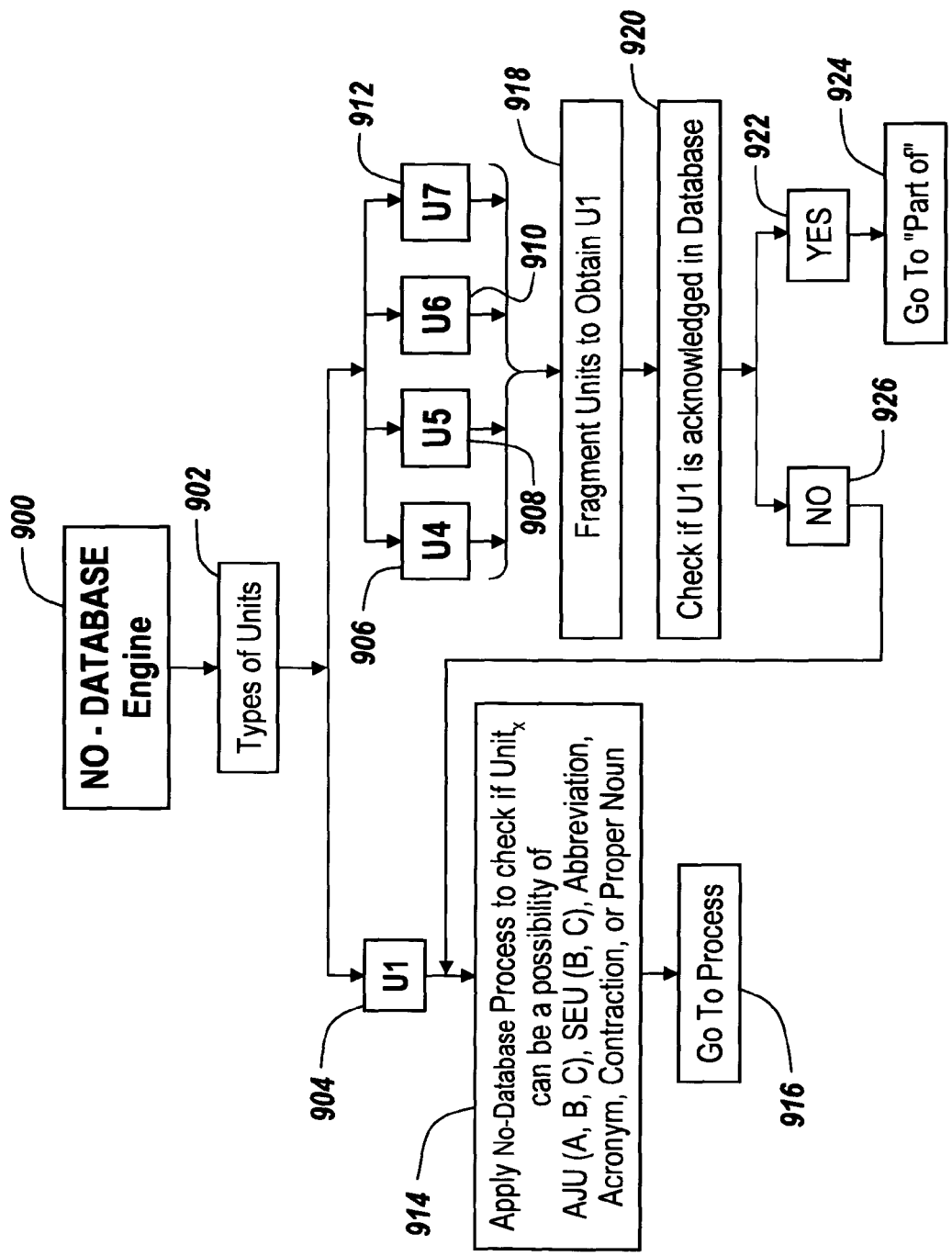
FIGS. 18B-18D are diagrammatic illustrations of the no database engine for use in the system of FIGS. 1A and 1B.
Figure 18C:
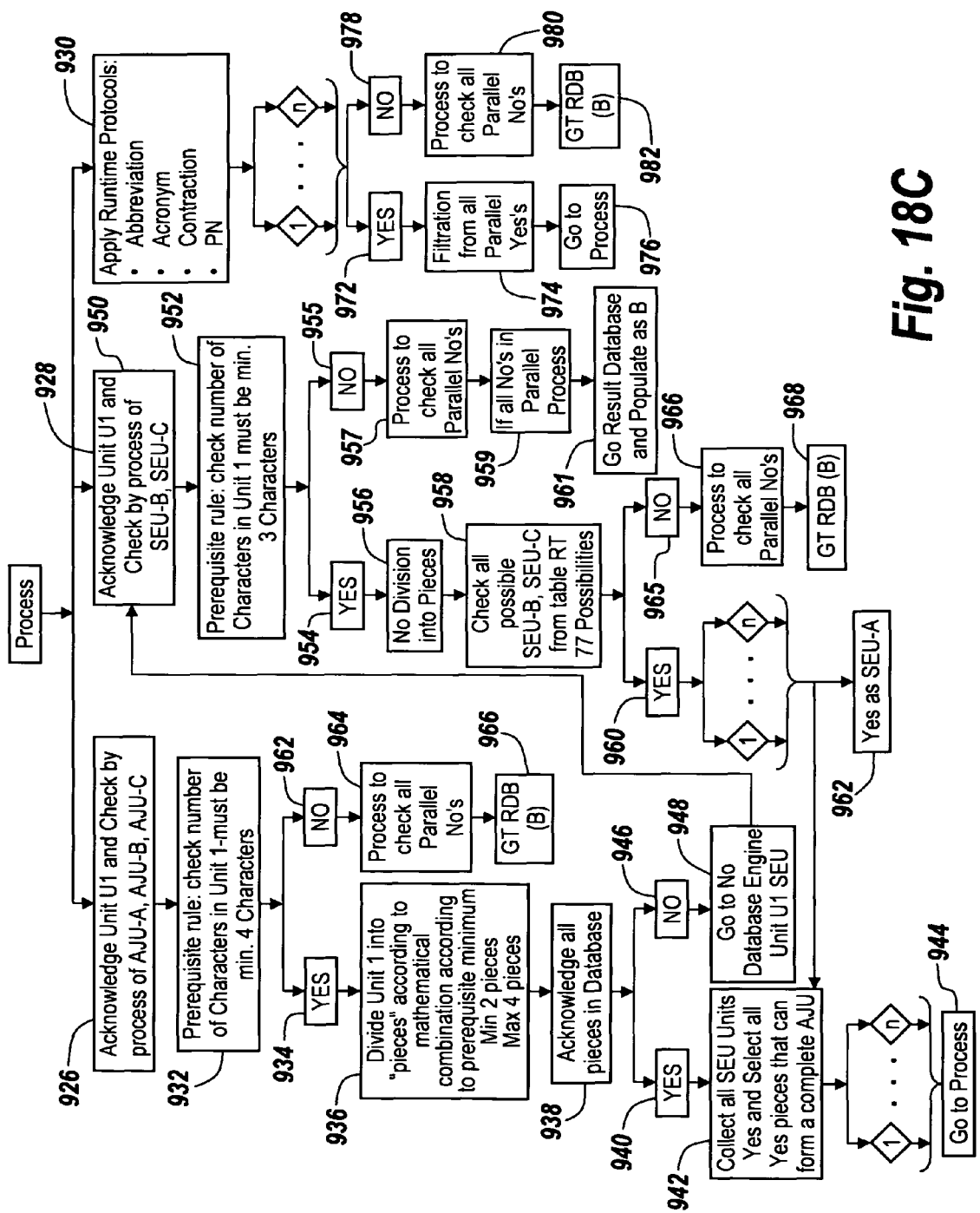

Referring now to FIG. 18B, what is now described is the operation of no database engine 736 in FIG. 18A and the process of determining a focal point 740 in FIG. 18A.

With respect to the no database engine, as illustrated at 900 the purpose of this engine is to determine whether or not a unit or any other process is within a database or is not within a database. Taking for instance types of units as illustrated at 902, what are illustrated is units U1 at 904, U4 at 906, U5 at 908, U6 at 910 and U7 at 912. As for unit U1 as illustrated at 914 one applies the no database process to check if Unit X can possibly be of AJU (A, B, C), SEU (B, C), an abbreviation, an acronym, a contraction, or proper noun. The definition of AJU can be found in FIGS. 12B and 12C to be numbers 5, 6 and 7 in terms of the types of units. The SEU is number 3 and number 4 on this listing whereas abbreviations, acronyms, contraction or proper nouns are self-explanatory. The purpose of this application is to decide how to recognize units not found in the database by breaking them apart into adjacent units or other types of units so that they can be processed separately in the database. It will be appreciated that if the database engine returns the fact that the unit is not in the database it can only be one of AJU, A, B, C or SEU B or C or abbreviations, acronyms, contractions or proper nouns. Thus, the process in 914 basically specifies in which of the categories the unit which is not found in a database.

It will be appreciated that U1 is all letter units, whereas U4 are letters and numbers, U5 are letters and symbols, U6 are symbols and numbers and U7 are numbers, symbols and letters. These are all the possibilities for a unit that cannot be found in the database. In order to further process any of the U4, U5, U6 or U7 units one fragments the units to obtain U1 as illustrated at 918. One then checks to see if U1 is acknowledged in the database as illustrated at 920 and if yes as illustrated at 922 it is returned to the part of processing as illustrated at 924. If however U 1 cannot be acknowledged in the database as illustrated at 926 it then goes to the process 914 to again try to determine whether it is part of an AJU, and SEU, an abbreviation, an acronym, a contraction or a proper noun.

Referring to 18C what is now described is how to check for the unit that did not pass in the AJU process, the SEU process or any of the run time protocol processes. These are now referred to as processes 926 for the AJU processes, 928 for the SEU processes and 930 for the protocol processes for abbreviation, acronym, contraction, and proper nouns.

Referring to the AJU processes, one applies a prerequisite rule check number of characters in Unit 1 which must be a minimum of 4 characters. This is shown at 932. If there are a minimum of 4 characters as illustrated at 934 a process 936 divides Unit 1 into pieces according to a mathematical combination according to prerequisite minimum number of 2 pieces and a maximum number of 4 pieces. After having divided Unit 1 into these fragments one acknowledges the pieces in the database as illustrated at 938. If they are acknowledged in the database as illustrated at 940 the system collects all units SEU yes and selects all pieces that can form a complete AJU as illustrated at 942. Thereafter one proceeds with the process as illustrated at 944.

If on the other hand it is impossible to acknowledge all pieces in the database as illustrated at 946 then one goes to the no database engine Unit 1 SEU section as illustrated at 948.

The SEU portion of the processing first starts with acknowledging whether Unit U1 can be acknowledged and this is checked by the process SEU-B and SEU-C as illustrated at 950. Thereafter the prerequisite rule check number of characters in Unit 1 must be a minimum of 3 characters as illustrated at 952. If so as illustrated at 954 then there are no division into pieces as illustrated at 956, whereupon a check is made of all possible SEU-B, SEU-C possibilities from table RT from the recognition table 77 possibilities as illustrated at 958. If they register with the 77 possibilities they are acknowledged at 960 as recognized by a "yes" SEU-A as illustrated at 962. If however it does not pass the checking of 958 as illustrated at 965 then the system processes "no" results as for instance at 946 and 964. The result is then stored at GT RDB result database at 968.

The other leg of the SEU checking is a result of an output from the prerequisite rule check function 952 which if it does not satisfy this rule check "no" is returned at 955. If it does not have these 3 characters minimum then as illustrated at 957 the process checks all parallel "no's" such as described above. If all "no's" exist as illustrated at 959 one goes to the result database and populates as B as illustrated at 961.

It will be appreciated that with respect to the AJU checking if there is a "no" as illustrated at 962 that particular process checks all parallel "no's" at 964 at which point the results database B is populated at 966.

This leaves the run time protocol portion of the no database engine. Protocols that are applied here are the abbreviation acronym, contraction and proper noun protocols, which if passed as illustrated at 972 goes to a filtration process for all parallel yeses at 974 at which point it is further processed at 976. On the other hand if after run time protocol processing there is a "no" at 978 then the system processes to check all parallel "no's" at 980 after which one goes to the result database B 982.

Figure 18D:
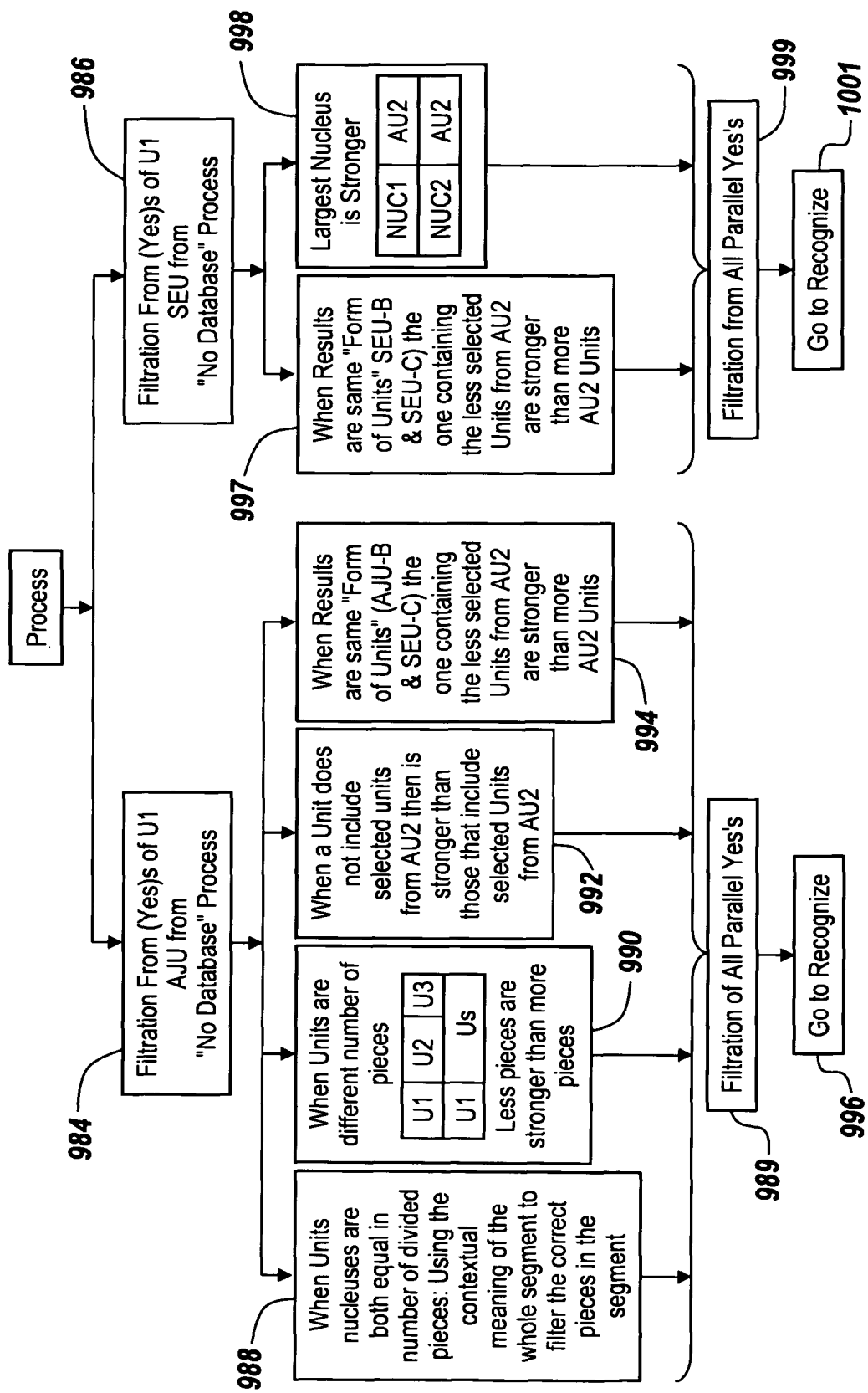

Referring now to FIG. 18D one is now filtering the "yes" results from the AJU and the "yes" results from the SEU. The filtration from the AJU results is shown at 984 whereas the filtration of the "yes" results from the SEU is shown at 986.

Taking the filtration of the "yes" results from the AJU, as illustrated at 988 when unit nucleuses are both equal in number to the divided pieces using the contextual meaning of the whole segment to filter the corrected pieces in the segment, then this "yes" result is passed to the filtration of all parallel "yeses" as illustrated at 968.

When the units have different numbers of pieces it will be appreciated less pieces are stronger than more pieces and this level of filtering filters through the piece that is less. In short, one takes the combination which is less. This is shown at 990.

As shown at 992 assuming that there are two units that are combined and assuming also that there is a unit that is combined with an action unit for instance the question is which unit to select. That which is selected is the one without any action units. Thus, when a unit does not include selecting units from AU 2 then it is stronger than those that do in fact include selecting units from AU 2.

As illustrated at 994 when the results are the same "form of units" namely AJU B and AJU C, the one containing the less selected units from AU 2 is the stronger as opposed to the one that has more AU 2 units.

The results of this filtration of the "yeses" from the AJUs is as reported above outputted to the filtration of all parallel "yeses" and there is a Go to Recognize step 996 for the process of recognition.

With respect to the filtration of the "yes" SEUs as illustrated at 997 when results are the same "form of units", namely SEU B and SEU C, the one containing the less selected units from AU 2 is stronger than the one containing more AU 2 units. As illustrated at 998 the larger nucleus is stronger which completes the filtration of the parallel yes units as illustrated at 999 and then goes to the recognize process at 1001.

Figure 18E:
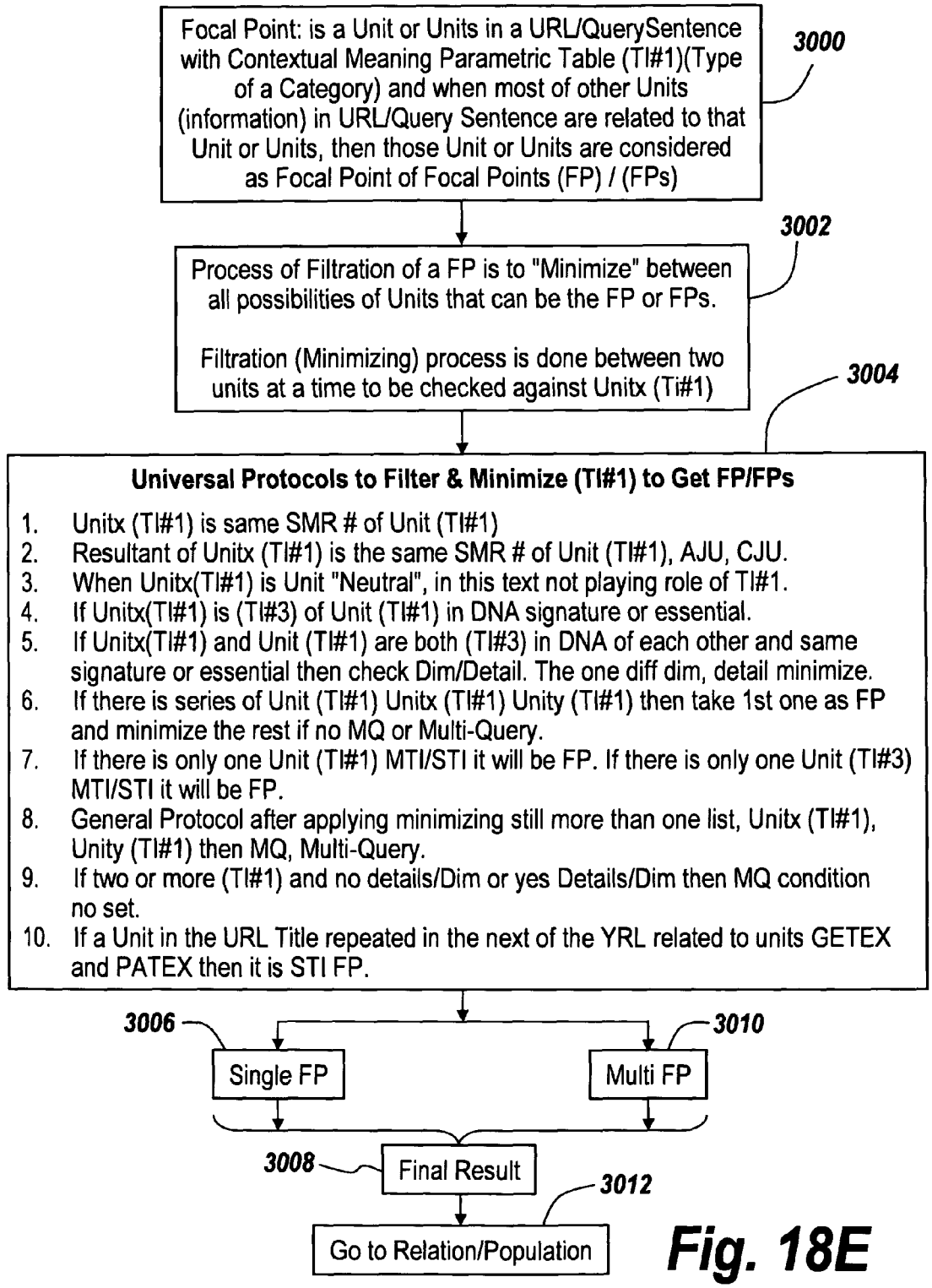
FIG. 18E is a diagrammatic illustration of universal protocols to determine the focal point of a query or URL.

What is now discussed in FIG. 18E is the focal point calculation process. This is the process for determining the focal point namely process 740 in FIG. 18A. As seen at 3000 the focal point is a unit or units in a URL/query sentence with contextual meaning parametric table TI#1 (type of category). In most of the other units or information in the URL query sentence are related to that unit or units. In such a case those unit or units are considered as the focal point or focal points of the inquiry.

As illustrated at 3002 the process of filtration of a focal point is to minimize between all possibilities of units between the focal point or focal points. The filtration or minimizing process is done between two units in the TI#1 of which there can be many types of a category unit. The purpose of this is to minimize which one of the categories does in fact capture the focal point. This means that for all the possible categories that a URL or piece of text can occupy one has to check which of the many, many types of categories is the correct focal point. In order to do this one decides which of the two can be a focal point. In short, one takes Unit (TI#1) and checks it against Unitx (TI#1). As seen in 3004 one has a list of 10 protocols to filter and minimize the TI#1s to get the focal point or focal points. Note that protocol #1 establishes whether Unitx is the same SMR as Unit (TI#1), in other words whether or not they have the same meaning replacement. One therefore minimizes one of them. As can be seen by protocol #2 the resultant of Unitx (TI#1) being the same SMR as Unit (T1#1), AJU, CJU then it is possible to minimize between those two units.

When Unitx (TI#1) is Unit "Neutral" then one can again minimize on that basis.

One of the protocols to filter and minimize the units is protocol #5. If Unitx (TI#1) and Unit (TI#1) are both (TI#3), meaning it is part of a type of unit and in the DNA of each other and they are in the same level or signature one to the other, then one checks the dimension or details and the one with the different dimension and detail is minimized.

In short, in this process if the units or information is related more to one or the other in this dual mismatch process then one chooses not to minimize the one where there are more units that are related. Thereafter having applied the universal protocol to filter and minimize to get focal points if there is a single focal point as illustrated at 3006 this is returned as the final result at 3008. However, it may be there are multiple focal points and this is recognized at 3010, then the multiple focal points are populated into the final result. After having determined the focal points for the URL query sentence one then goes to the relation process and populates the appropriate database given the relation as illustrated at 3012.

Figure 19:
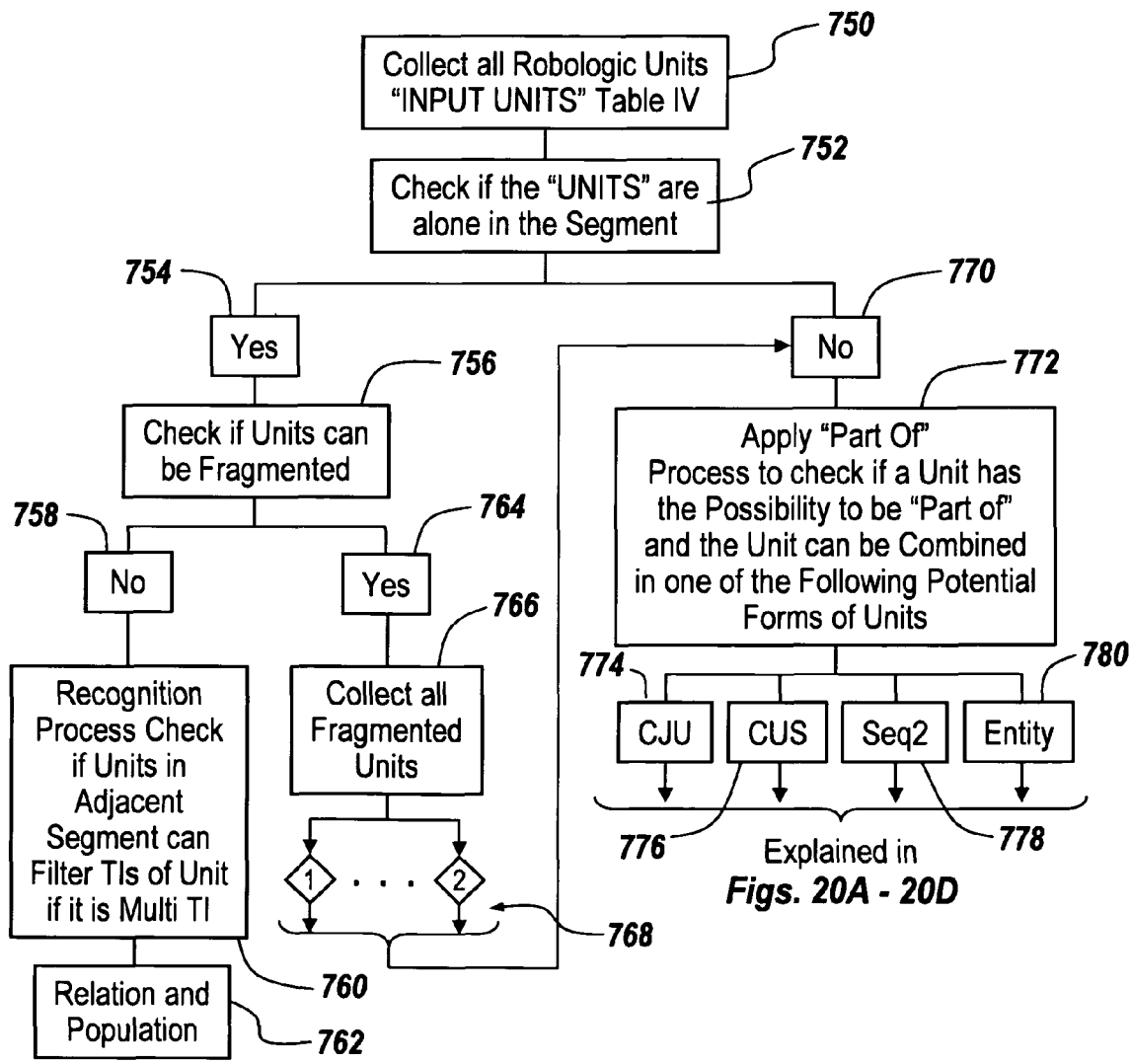
FIG. 19 is a flow chart illustrating the "part of" process for use in the system of FIGS. 1A and 1B.

Referring now to FIG. 19, what is shown is an elaboration of the "part of" process of FIG. 18, shown at 738 here the collection of all of the Robologic units are transformed into input units in Table IV as illustrated at 750. Thereafter as illustrated at 752 the units are checked to see if they are alone in a segment, or not. If they are alone in a segment as illustrated at 754 one checks the units to see if they can be fragmented as illustrated 756. If they cannot be fragmented, as illustrated at 758 they go to a recognition process 760 to check if the units in adjacent segments can be filtered by the parametric tables if it is a multi-parametric table. The result is then passed to a relation and population step 762.

On the other hand if the unit can be fragmented as illustrated at 764 all fragmented units are collected at 766 and are numbered at 768. The fragmented units that are collected and numbered may be used if for instance the units are not alone in a segment. If they are not alone in a segment as illustrated at 770 then one can apply the "part of" process as illustrated at 772 to check if the unit has the possibility to be part of another unit to combine in one of the following potential forms of units. These forms of units are illustrated at 774, 776, 778 and 780, where CJU refers to combined join units, CUS refers to combined unit structures, SEQ2 means Sequence Type 2 and entity means units related to contextual parameter table PATEX (#21-36) of FIG. 10A.

Figure 20A:
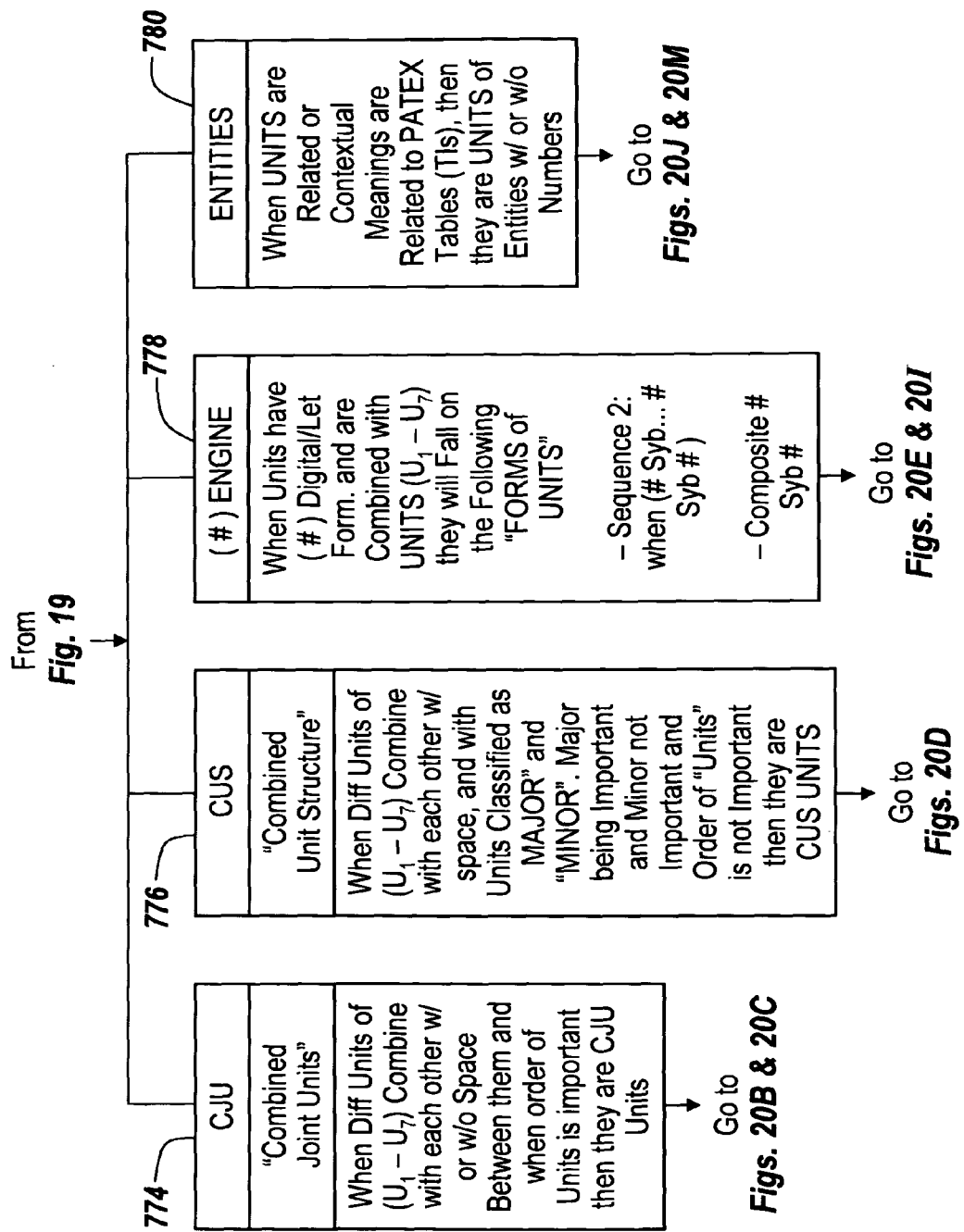
FIG. 20A is a diagrammatic illustration of the various processes used in the "part of" process of FIG. 19, illustrating combined joint units, combined unit structure, a numbers engine and a process for determining entities.

What is now described is the organization of the combined joint units protocols which are called out by reference character 774 in FIG. 20A.

Figure 20B:
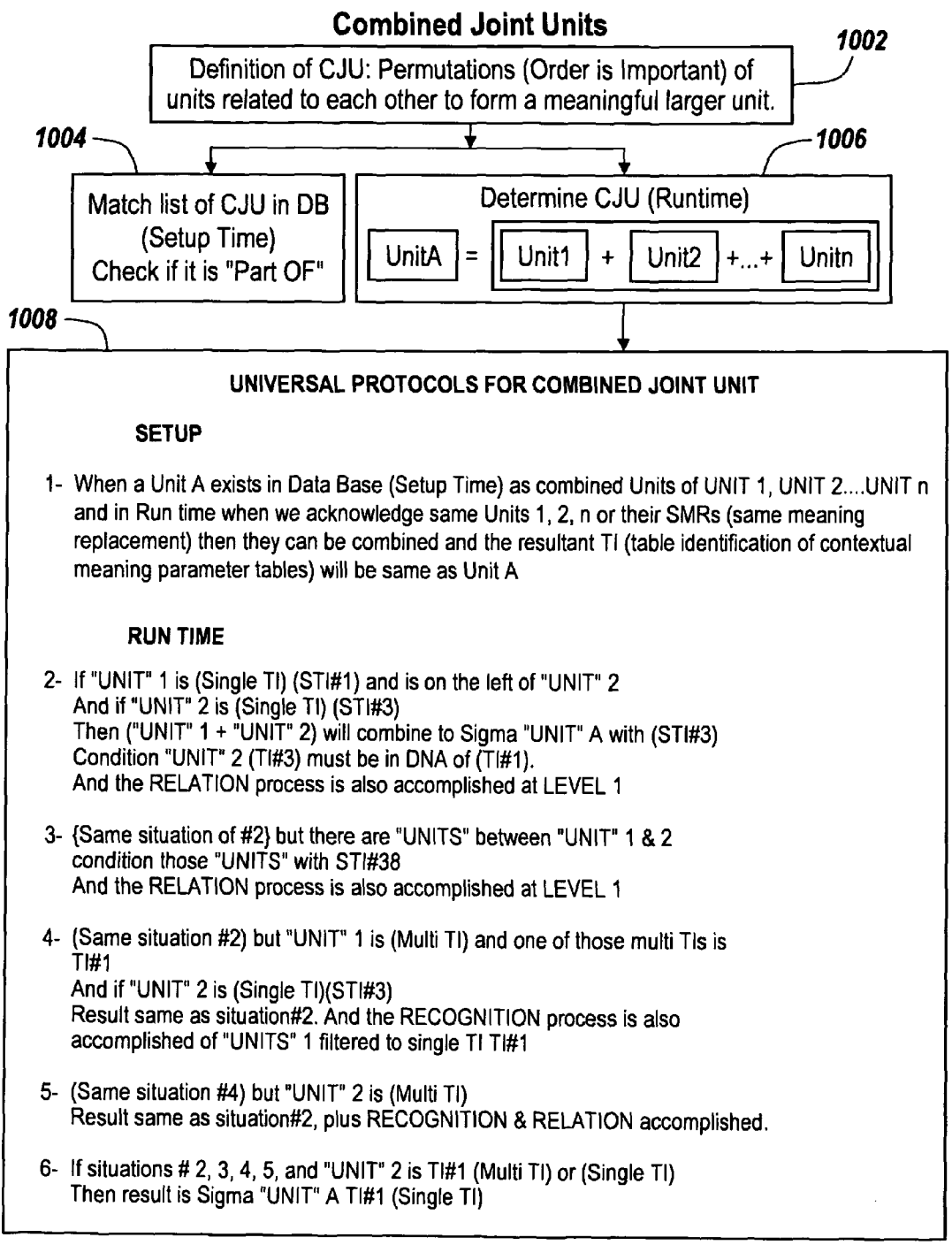

Referring now to FIG. 20B in the detection of combined joint units it is necessary to obtain the permutations or order of the units related to each other to form a meaningful larger unit. This is shown by reference character 1002. In order to do this during set up time one matches a list of combined joint units or CJUs in a database and checks if in the matching process it is part of another unit as shown at 1004.

During run time one determines the combined joint units as illustrated at 1006 insofar as that for instance Unit A is a combination of Unit 1+Unit 1+ . . . . Unit n.

What is listed in box 1008 are the universal protocols for the read process. Part of the read process is the aforementioned "part of" process and as part of the aforementioned "part of" process is the combined joint unit process, CJU. As listed in this box there are 12 different protocols of which 2-10 are run time protocols and in which one is a setup protocol.

Referring to the set up time protocol when a unit exists in a database during set up time as combined units Unit 1, Unit 2 . . . . Unit n. They can be combined and the resultant TI will be the same as Unit A. In the runtime the system acknowledges the same units 1, 2, n or their same meaning replacements when they can be combined and the resultant TI table will be the same as unit A.

Having set up the combined joint units during the set up time, in terms of the run time there are a number of different protocols to show that a given unit can be combined with other units. The situations in which units can be combined are described in protocols 2-12 and are in essence self-explanatory. For instance if the unit is Unit 1 and is a single TI, STI#1, and is on the left of for instance Unit 2; and if Unit 2 is a single TI, STI#3, then Unit 1+Unit 2 will combine to a combined unit or sigma unit A with STI as its contextual meaning parametric table. However there is a condition on the above ability to combine units and that is that for Unit 2, TI#3, this must be in the DNA of TI#1. Note that as described hereinabove DNA is the combined unit that describes a type of category, which is in this case TI#1.

Having been able to combine Unit 1 with Unit 2 there is nonetheless a relation process that is accomplished at a so-called level 1, the most important level. Since one has already determined that the units can be combined the relation is set and is 100% sure. For a more complicated case one can consider the case where there are brackets within the text and one wishes to establish all of the units within the brackets so that they can be combined as one sigma unit A. This then is merely a protocol that allows one to recognize when there are brackets and to ascertain what units are within the brackets.

Having performed the universal protocols 1008 there follows a filtration between valid CJU combinations of units. A number of combination units rule is employed such that if for instance there are combinations of two units and combinations of three units then the three unit combination rules. This is shown as 1010.

As shown at 1012 the final results are outputted and go to the relation/population part of the database as illustrated at 1014. Also after the filtration one can nonetheless check if the combination is part of another combination as illustrated at 1016.

Figure 20D:
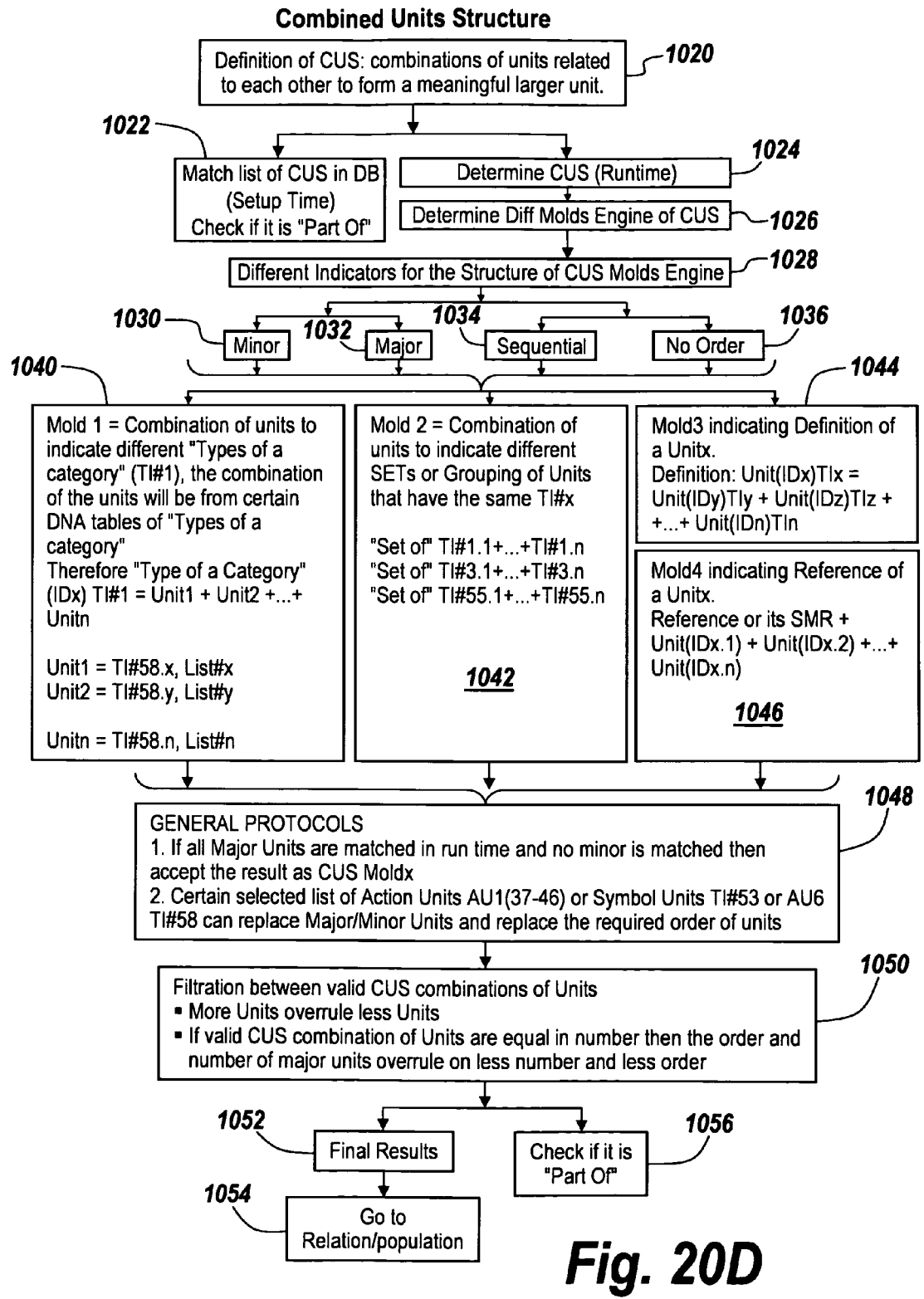
FIG. 20D is a diagrammatic illustration of the combined unit structure process for use in the system of FIGS. 1A and 1B in which different combined unit structure molds are generated, with the molds including minor, major, sequential or no order molds to be able to check whether units are associated with a mold so they can be combined.

Referring now to FIG. 20D what is now described is the Combined Unit Structure which is called out by reference character 776 in FIG. 20A. As illustrated at 1020 in the definition of CUS there are combined combinations of units related to each other to form a meaningful larger unit. As illustrated at 1022 one matches the list of CUS in the database during set up time and checks if it is part of another CUS, whereas during runtime as illustrated at 1024 the system determines if there are any combinations of units or CUSs and also determines the different mold engines of the Combined Unit's Structure as illustrated at 1026. It will be appreciated that when one comes up with a number of combined units they are said to be contained in a mold when each unit is designated as part of a mold and where one unit can be replaced by a list of other units.

Referring to reference character 1028 there are different indicators for the structure of the CUS molds engine. It will be appreciated that the CUS molds engine categorizes molds as having minor or unimportant units and major units with no order at all and sequential units. Thus as shown at 1030 one has a combination of minor units, at 1032, major units at 1034, sequential units and at 1036 no order whatsoever.

Having determined the minor, major, sequential or no order status of the molds one now looks at mold construction.

As illustrated at 1040 mold 1 corresponds to a combination of units to indicate different types of a category which are units that belong to TI#1 of contextual meaning parametric tables. The combination of those units that belong to certain DNA tables that correspond to a type of a category are involved in the mold. Therefore a unit of IDX and TI#1 equaling Unit 1+Unit 2+ . . . . Unit n results in Unit 1 being TI58.x, list of units #x and Unit 2 being TI#58.y, list of units #y, whereas Unit n is TI#58.n, list of units n. Here the number 58 relates to context meaning parametric table #58 which is an action unit #6 in this case.

With respect to mold 2, as shown at 1042 this is a combination of units to indicate different SETs or grouping of units that have the same TI #X. Thus the Mold 2 contains sets of units and the sets of units are as illustrated.

Referring to Mold 3 this is shown at 1044 as indicating the definition of a Unit X, i.e. the combination of selected units that explain Unit X. Thus for those units within Mold 3 the definition of these units is as specified in Mold 3.

Referring finally to Mold 4 as illustrated at 1046 the units in Mold 4 are those indicating a reference of Unit X. This reference may be a specified reference or may be a same meaning replacement reference such that for instance unit IDX.1 and unit IDX.2 . . . . Unit IDX.n have a unit reference or SMR plus Unit DX.1+Unit DX.2 etc. This is therefore a Mold 4 reference. Mold 4 is in fact an important mold because any Unit X where it has a reference and the word reference is there or a same meaning replacement is there, the units next to it, unit IDX.1+IDX.2 . . . IDX.n, make a reference mold.

As to general protocols illustrated at 1048 these general protocols are to filter which mold is the correct mold. If all major units are matched at run time and there are no minor units matched, then the results are accepted as a result of the CUS Mold X.

However when there is a certain selected list of action units, AU1(37-46) or symbol units TI#53 or AU6TI#58, then one can replace the Major and Minor units and replace the required order of units. The result therefore is accepted as a CUS mold.

As illustrated 1050 there is a filtration between valid CUS in combinations of units. It will be appreciated that more units overrule less units, and further that if the valid combinations of units are equal in number, then the order and the number of major units overrule the less number or less order.

The purpose therefore is to filter from the all possible combined unit structures utilizing the mold structure specified above which are the valid acceptable results. This is shown at reference character 1052 which then goes to populate the database as illustrated at 1054. Also the results of this combined unit structure analysis is handed off to the part of processing as illustrated at 1056.

Figure 20E:
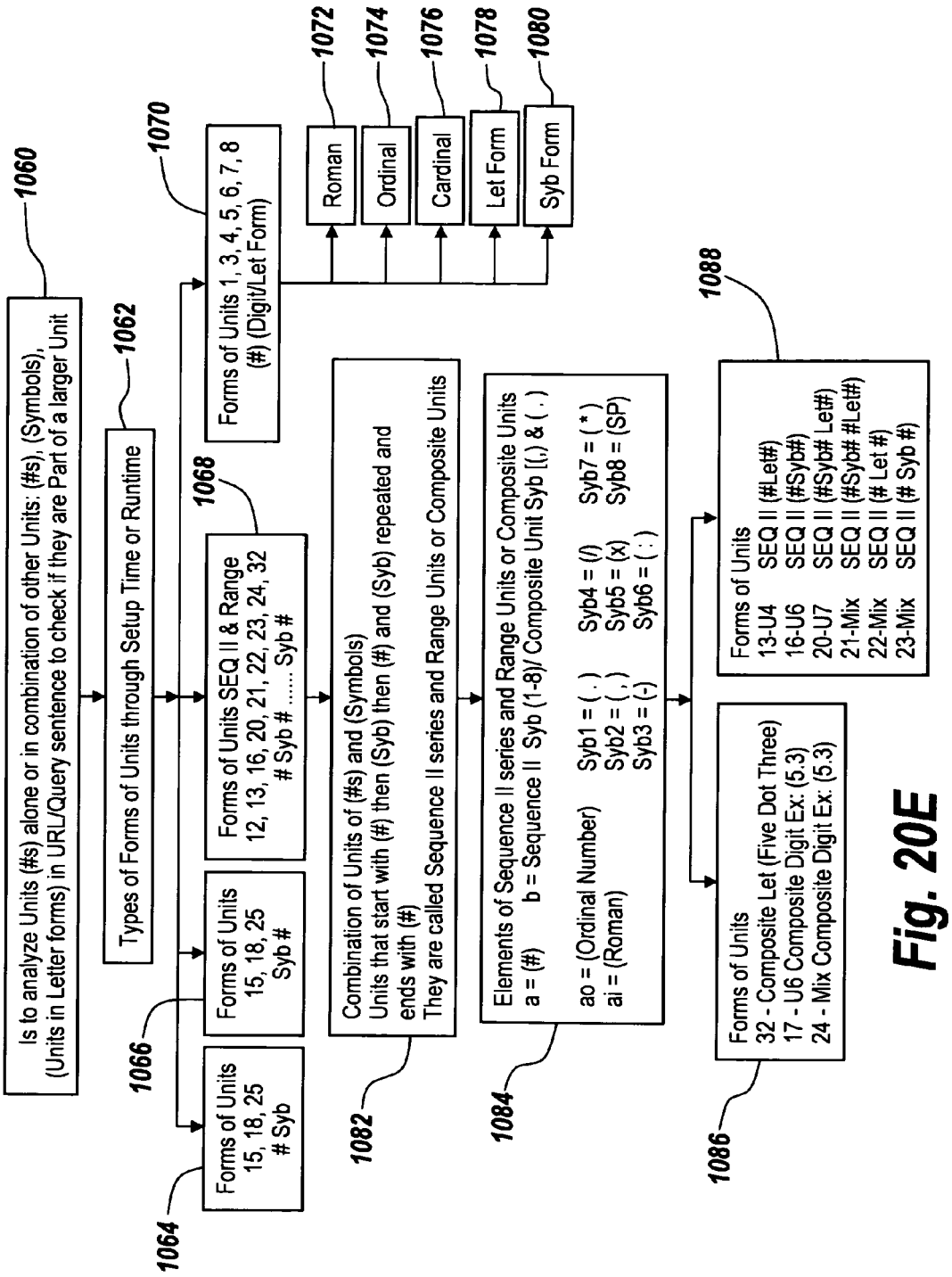
FIG. 20E is a diagrammatic illustration of the numbers engine used to analyze unit numbers, alone or in combination with other units, to check if they are part of a larger unit.

Referring no to FIG. 20E what is described is the number engine which is called out by reference character 778 in FIG. 20A. This number engine as illustrated at 1060 is to analyze the unit numbers alone or in combination with other unit numbers, symbols, units in letter forms or in URL or query sentences to check to see if they are part of a larger unit. As illustrated at 1062 the types of forms of units through set up time or run time is established such that all of the types of units in Table III are associated with numbers. Thus for instance one of the types of forms of units is illustrated at 1064, with another forms of units being illustrated at 1066 and with further forms of units SEQ II and range 12, 13, 16, 20, 21, 22, 23, 24, 32 and symbol units assembled as shown in 1068. Where the units are either in digital or letter form their numbers are assigned by the engine as illustrated at 1070.

In this particular instance the forms of units may either be Roman letters or numbers as illustrated at 1072, ordinal numbers as illustrated at 1074, cardinal numbers as illustrated at 1076, letter forms as illustrated at 1078 and of a symbol form as illustrated at 1080. Note that the forms of units 1068 refers to a sequence of numbers which start with a number sign and end with a number sign. These units start with a number, then a symbol, then a number, then a symbol, then a number. They are called Sequence 2 series and range units or composite units.

The combinations of numbers and symbols are shown at 1082.

Thereafter as illustrated at 1084 elements of the Sequence 2 series and the range units or composite units, (a) indicates a whole number. (b) indicates a Sequence II symbol, whereas (ao) indicates an ordinal number and (ai) indicates a Roman number. Note that the symbols are as illustrated at 1084 to be a period, comma, dash, slash, X, colon, *, and SP or space.

The numbers engine then provides forms of units as illustrated at 1086 to be #32 form of unit which is a composite letter, for instance "five dot three". It could for instance be a form of units #17 which is an active unit U6 composite with a digital example such as 5.3 or for instance the form of unit could be #24 which is a mixed composite of digits as illustrated at 5.3.

Moreover, as illustrated at 1088 the forms of units can also be sequences such that for instance forms of units #13-U4 is a Sequence 2 involving a number, letter, number, whereas forms of unit #16 which is U6 is a Sequence 2 number, symbol, number sequence. Forms of Units #20 which is U7 is a sequence of number, symbol, number, letter, number, whereas Forms of Units #21 is a mix of sequence, number, symbol, number, number, letter, number. Forms of Units #22 is a sequence of number, letter, number, whereas Forms of Units #23 is a sequence of number, symbol, number where there is space between number and symbol.

Figure 20F:
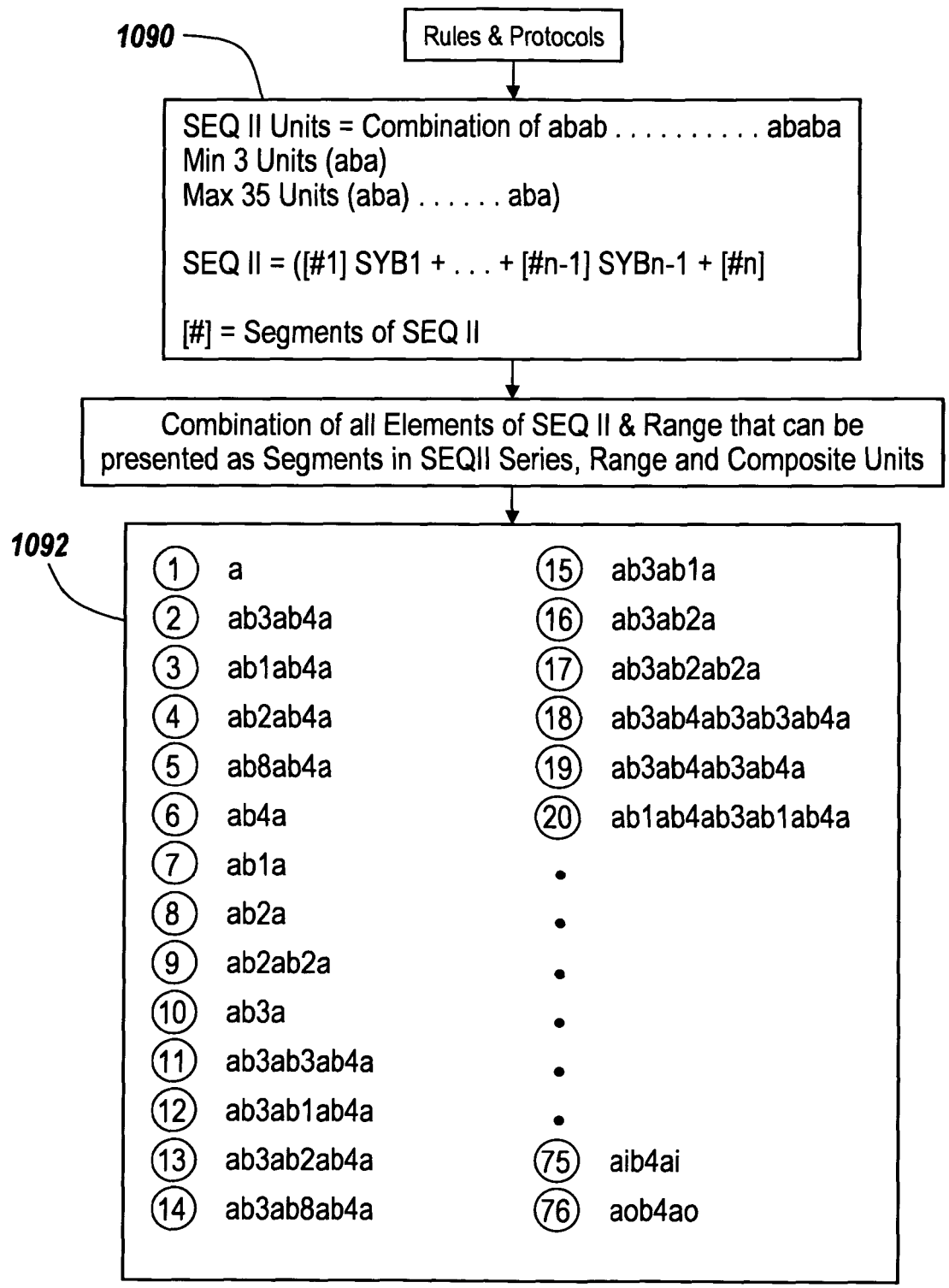
FIG. 20F is a diagrammatic illustration of the use of specialized protocols useful for determining whether a particular unit is part of a sequence or not.

Referring now to FIG. 20F what is shown are the rules and protocols for a combination of numbers or a combination of symbols. For instance as illustrated at 1090 Sequence 2 units may be a combination of abab . . . abab where "a" is a designation of a number and "b" is a designation for a symbol. In this case there is a minimum of three units, namely aba and a maximum in one embodiment of 35 units aba . . . aba.

This is elaborated below where Sequence 2 is shown to be a number followed by a symbol+ . . . [#n−1] followed by a symbol n−1+[#n] which then defines the sequence. As illustrated, the number sign denotes the segment of the sequence. Note that [#] can be any one of the segments listed at 1092. Thus, the [#] is a segment which can have the form illustrated in 1092 and may be composed of for instance a single number as illustrated at 1 or a sequence ab3ab4a as illustrated at 2 or a sequence ab1ab4a etc.

Figure 20G:
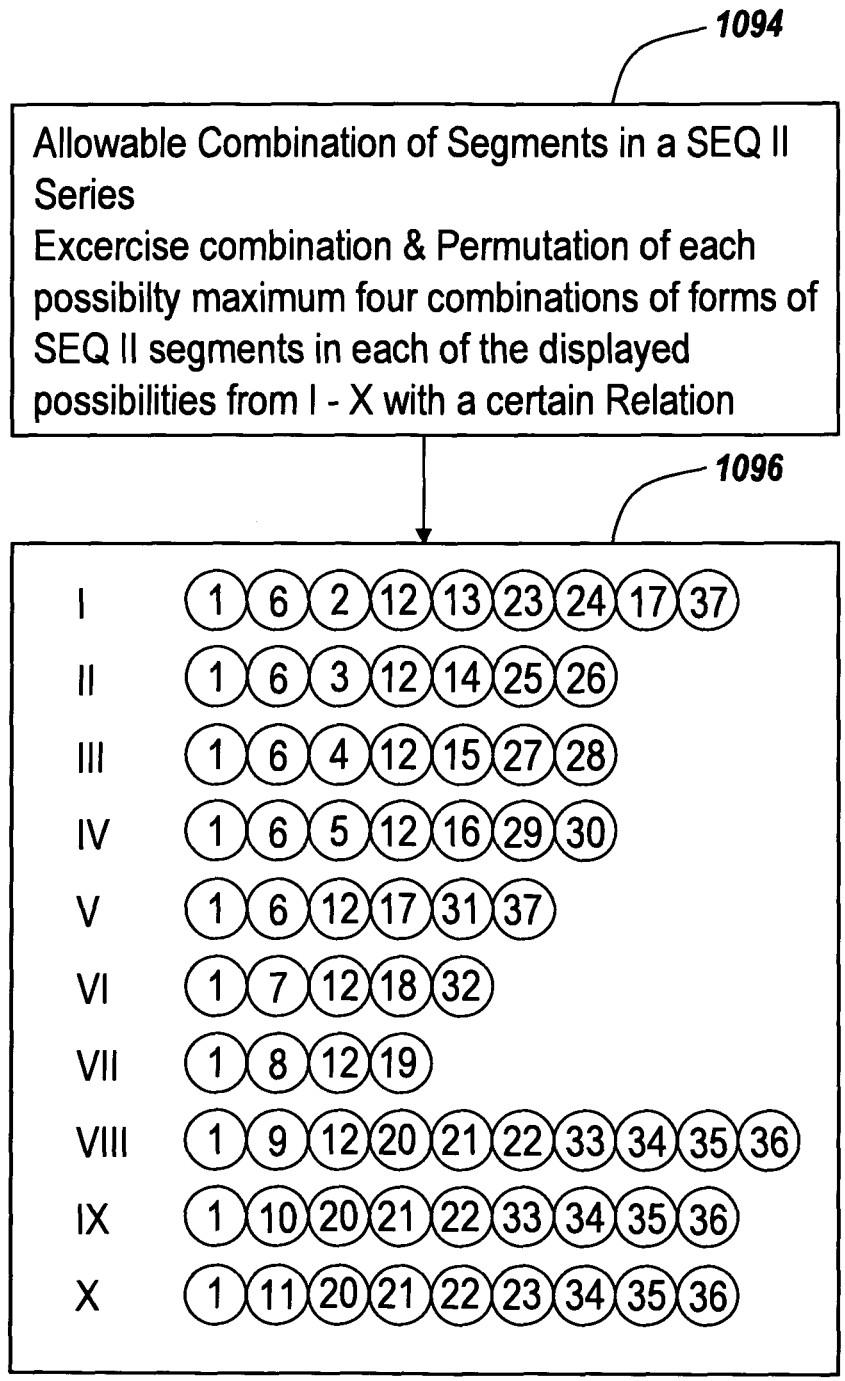
FIG. 20G is a diagrammatic illustration of a process for determining the allowable combination of segments in a series or sequence to for a sequence to the larger unit.

As illustrated in FIG. 20G having defined the sequences, the way the sequence segments can be combined is illustrated. Here the allowable combination of Sequence 2 segments is shown at 1094 of segments in a Sequence II series. In order to ascertain the allowability one exercises a combination and permutation of each possibility, with a maximum of 4 combinations of forms of Sequence II segments and each of the displayed possibilities from 1 to X of certain relations. This is shown for instance at 1096, as illustrated an allowable combination for 1 can be 1 6 2 12 13 23 24 17 37. It will be appreciated that the numbers in I are segments and that for purposes of the present invention one only analyzes four segments. Thus, for instance, for 1 one could analyze 1 2 12 and 17 or for instance any other 4 number combinations of those particular segments. As to Group II one has 1, 6, 12, 14, 25 and 26 and Group II relates to different type of segments of Sequence 2 as opposed to those listed in I.

Group III lists sequences 1, 6, 4, 12, 15, 27 and 28 which are again a different set of segments of Sequence II from the other groupings.

What is involved is the different contextual sequences. For instance the sequence can be date, can be time, can be dimensions, can be proportions; and these are determined to be the allowable combinations of segments in the sequence. Each row indicates a number of possible sequences such that for instance going back to Group #1, one has a segment having a single segment that being "a". As to the second segment in I, this labeled segment 6, referring to ab4a, whereas Segment 2 relates to a segment ab3ab4a (#-#/#) which can be range, function, range and sequence together, with four segments in each group being able to be combined.

Figure 20H:
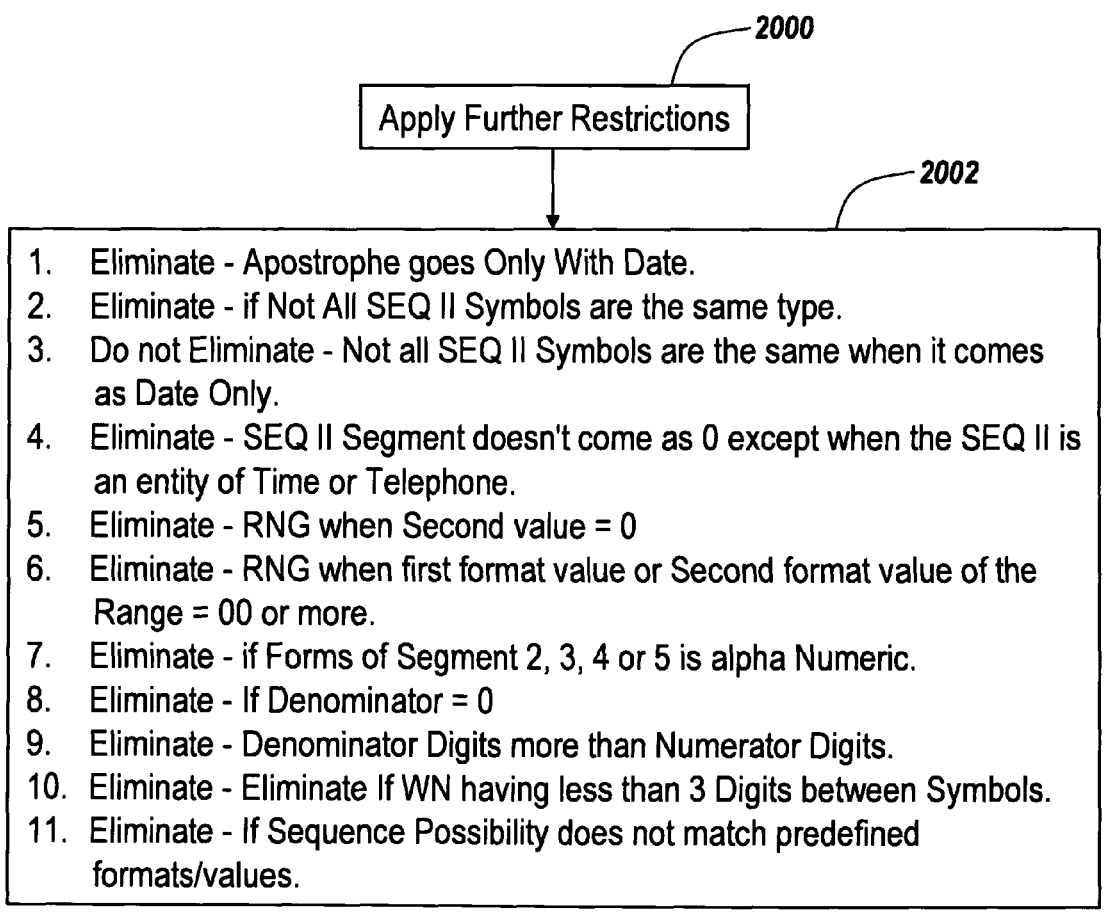
FIG. 20H illustrates the application of further restrictions to eliminate nonapplicable sequences and numbers.

Referring now to FIG. 20H, one applies further restrictions as illustrated at 2000. After the combinations are completed one applies the restrictions illustrated in 2002 to eliminate for instance when apostrophes go with only a date to eliminate for instance selected Sequence II symbols of the same type but do not eliminate all Sequence II symbols that are the same when it comes to being a date only. One can also eliminate Sequence II segments that don't come as 0 except when Sequence II is an entity of time or telephone number. Also, as illustrated, the system can eliminate range when the second value is 0. These restrictions are ad hoc restrictions that can be applied to eliminate returned results which are not proper.

Figure 20I:
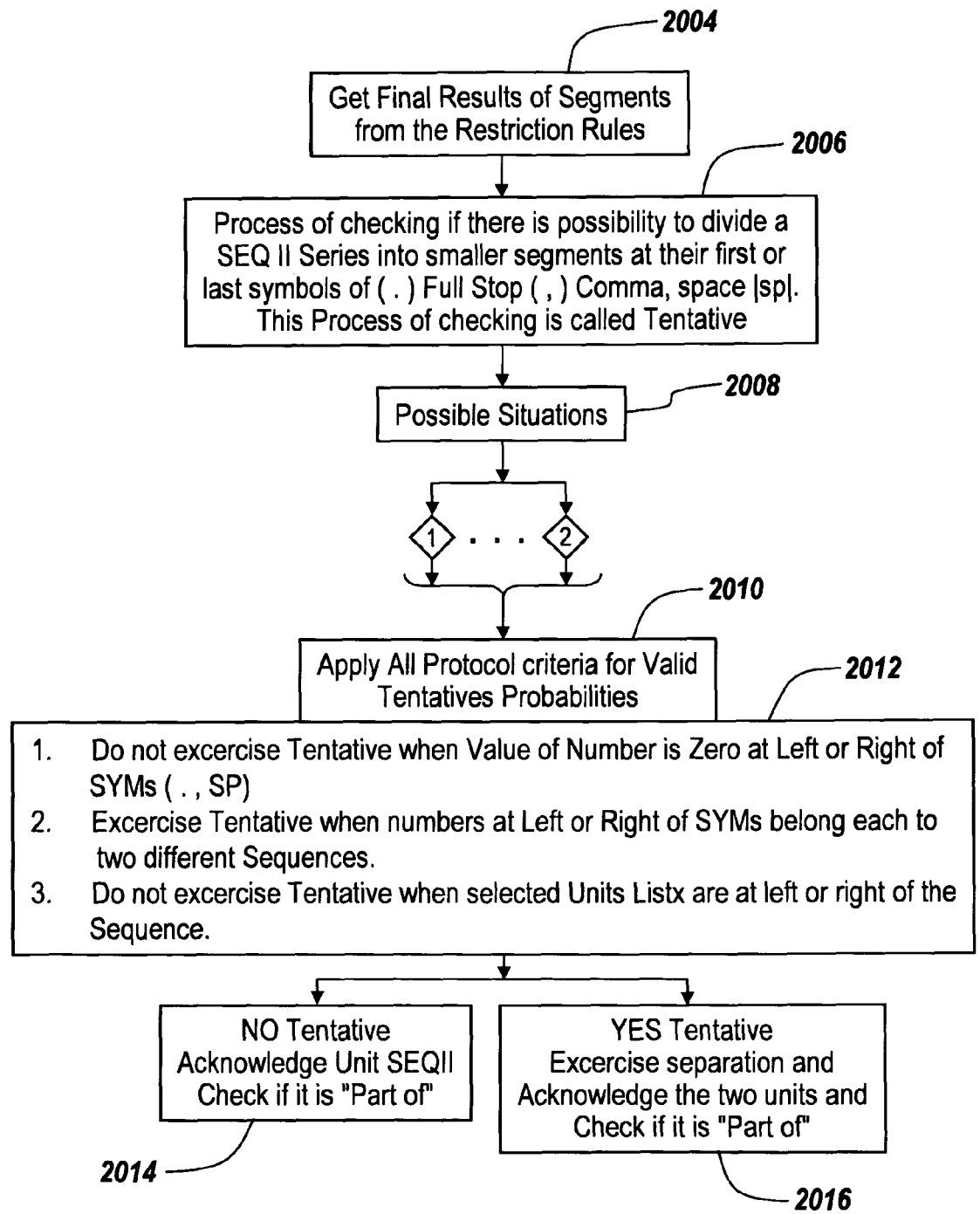
FIG. 20I is a diagrammatic illustration to check and see if the sequence can be divided or not.

Referring to FIG. 20I, as illustrated at 2004 one obtains final results from restriction rules after which there is a process of checking if there is a possibility to divide a Sequence II series into smaller sequences or segments at their first and last symbols of (.) full stop (,) comma, space [sp]. This is illustrated at 2006 and is a process of checking called "Tentative". This is a process by which sequence 2 units can be checked to see if they contain at their first or last symbols a period, a comma or a space and if so they are labeled "Tentative". Thus, the possible solutions are the result as illustrated at 2008 after which one applies an all protocol criteria for valid "Tentative" probabilities as illustrated 2010. As illustrated 2012 one does not exercise the "Tentative" process when the value of the number is 0 at the left or right of the symbols or spaces. One does exercise the "Tentative" process when numbers at the left or right of symbols belong to two different sequences. The system also does not exercise a "Tentative" protocol when selected units listx are to the left or the right of the sequence.

As will be seen if there is a NO tentative protocol one acknowledges Unit Sequence II and checks if it is part of another sequence as illustrated at 2014. On the other hand if the "Tentative" process is activated or YES, then one exercises a separation process and acknowledges the two units and thereafter checks as if the result is "part of" as illustrated at 2016.

When certain data or information or sequences are combined it is important to be able to check whether it is one sequence or separate entities or separate information.

Referring to 20J what is described is the process of defining an entity which is called out by reference character 780 in FIG. 20A. This is illustrated at 2020 where the entity definition describes units that are related to PATEX parametric tables TI#21-TI#36. These are the PATEX tables 21-36 of FIG. 10. If there is a match to a list of entities in the database at set up time this is determined at 2022. If such is the case the list is checked against a "part of" process as illustrated at 2024. On the other hand at run time as illustrated at 2026 one identities entities with a number as illustrated at 2028 or without a number as illustrated at 2030. If the entities at run time have a number it is either complete as illustrated at 2032 or is incomplete as illustrated at 2034. If complete, then the entity is determined as to what type of entity it is as illustrated at 2036. However, if the entity is described at run time by a number but is incomplete then there are tools 2040 used to satisfy the completeness. Likewise if the entity does not have a number and is incomplete as illustrated at 2042 then it can be completed at 2040. However if the entity without a number and is in fact complete as illustrated at 2044 then it can be passed to type of entity analysis at 2036.

In order to complete an entity to make sure one understands what entity is being referred to there are a number of tables which are preset for instance based on knowledge as illustrated at 2046 which is a preset database A or a preset database B as illustrated at 2048. Alternatively one can copy a unit from text to make an incomplete entity a complete entity as illustrated at 2050. The result of all of this is to be able to understand what entity is being referred to at run time and to thereby assemble what type of entity it is based on an analysis at 2036. As illustrated at 2052 if the entity relates to measurement it can be for instance a linear measurement as shown at 2054, and area measurement as illustrated at 2056, a volume measurement as illustrated at 2058, a height measurement as illustrated at 2060, or other types of measurements as illustrated at 2062.

If for instance the entity is a price this is determined at 2064, a rank at 2066, as an address at 2068, as a reference at 2070, a quantity at 2072, a size at 2074, a date at 2076, a time at 2078, a duration at 2080, a telephone number at 2082 or others as illustrated at 2084.

As illustrated at 2086 the system then determines the coordinates of the entity units in the read process.

Figure 20J:
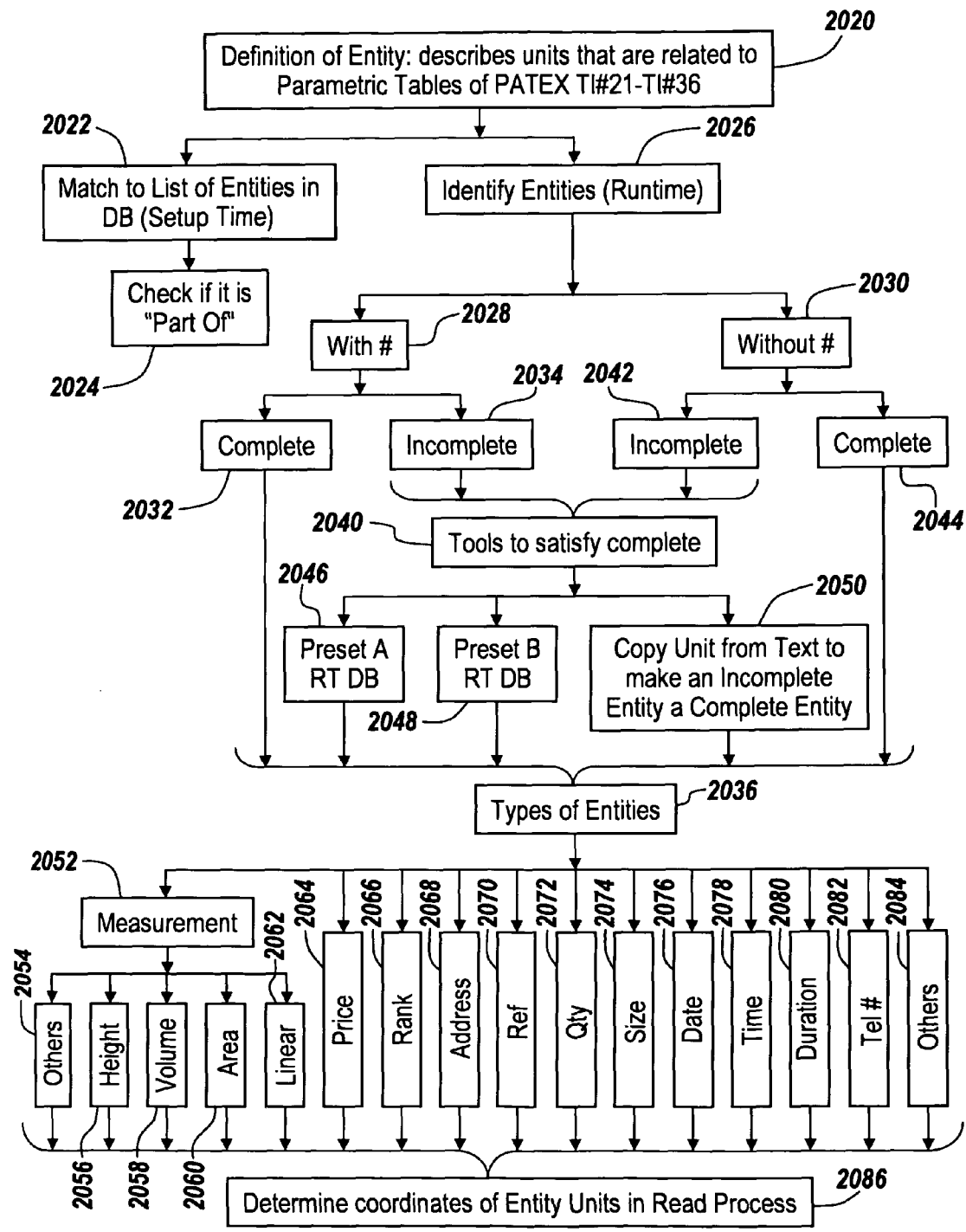
FIG. 20J is a diagrammatic illustration showing the types of entities that are ascertainable showing the processes for ascertaining the entities both at set up time and at run time.

Referring now to FIG. 20K, in order to ascertain whether an entity is complete as illustrated at 2040 in FIG. 20J one refers to the table illustrated at 2090 which establishes complete entities. This establishes whether a given element is part of a complete entity. In order for an entity to be complete the information must meet the criteria of complete entity listed at 2090. It will be appreciated that entities include linear areas, volumes, weights, dates, times, size, duration, quantity, rank, telephone number, addresses, references and prices. All of these are the types of entities by definition.

Referring now to FIG. 20L, what is shown is a listing referred to as Preset A which is referred to in FIG. 20J by reference character 2046. As can be seen Preset A refers to a number of different units and it is through these units that one can attempt to satisfy the completeness requirement for an entity.

Referring to FIG. 20M, Preset B corresponds to Preset B 2048 in FIG. 20J. Here it can be seen that Preset B refers to units in terms of centimeters and is associated with actual units for instance for mattress, glass, tubes, leaves and seats as well as the resultant thicknesses, diameters, gauges, widths, thicknesses and lengths.

Taking ID number 1 to be a mattress having a number 10-51 then the number TI#21.300.4 is the number relating to the thickness of the mattress. It will be appreciated that Preset B relates to measurements in which one has an article with a particular thickness namely that of a mattress in the illustrated embodiment. Preset B is but a small portion of the preset tables that are utilized in the subject invention. What will be seen is that Preset B takes an item ID and relates it to an actual unit and then relates it to a particular measurement. The system is then able to specify what type of measurement it is based on.

Recognition

Figure 21:
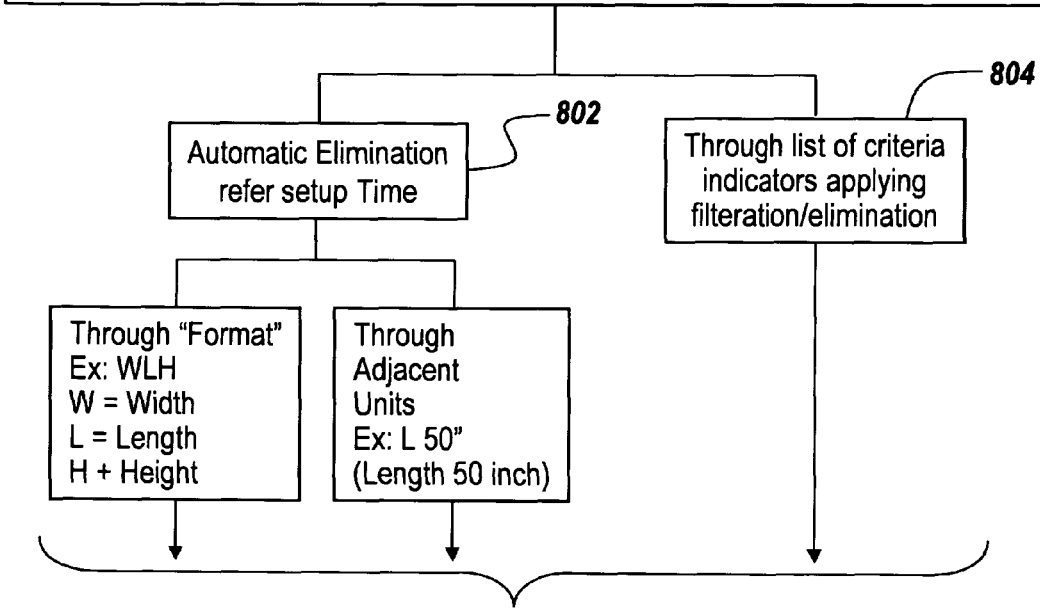

Referring now to FIG. 21, as can be seen from 800, recognition is a process to filter different contextual meanings of a unit at run time. It will be appreciated that a word has many different parametric tables and it is important to be able to establish which parametric table corresponds to the particular word for the particular context involved. In so doing all forms of units namely forms #1-#36 at setup time are entered into parametric tables in different classifications depending on how Ostrong they are. The strength of a unit is how strongly it corresponds to the particular parametric table shown in FIGS. 10A and 10B. It will be appreciated that the TI number represents a certain parametric table which indicates certain contextual meaning in a language. The contextual meanings are classified from most strong to less strong in contextual meaning. Taking for example that a parametric table number 5 corresponds to color, then with respect to the contextual meaning of color one refers to for instance the title which can be a color, refers to an implied parametric table Z which in this case refers to a glaze. The active component may be that the color is red, whereas the passive component may be almond and for instance the background can be for instance iron. Thus how strong the unit is corresponds to how strong it is with respect to various elements in a parametric table. As the relationship becomes weaker it needs more protocol processing in order to associate it with the parametric table.

In short, recognition is the process to determine which of the parametric tables and its contextual meaning correspond to a unit at run time and its particular position in a text.

At set up, there is an automatic elimination in run time through set up protocols at 802 which determines for a number of different units whether there is a single parametric table which corresponds to that unit. If so then one can establish the fact that the two units refer to the same parametric table or have a common parametric table. Thus for instance if the system can use the automatic elimination to filter the contextual meaning the units are said to have a strong relationship to one particular parametric table or another.

For instance in analyzing the letter M one would like to say for instance it might be a day of the week such as Monday where T may be another day of the week namely Tuesday. In order for the system to be able to understand that what is being talked about are days of the week the automatic elimination filter engine ascertains that all of the M, T, Ws and so forth are days of the week and therefore provides a unique filtering mechanism so that the commonality of where the particular units are assigned in a parametric table can actually drill down and determine the parametric table to which they all belong.

Referring to reference character 804 there is a universal protocol that establishes a list of criteria indicators that apply to filtration and elimination processes.

Referring to FIG. 22 what is shown are the general protocols for recognition. These are protocols of criteria to determine the parametric tables of a unit in run time. There are a set of 13 universal horizontal protocols for recognition. As used in the past, horizontal means universal.

Thus, there are 13 universal horizontal protocols used for recognition. These protocols convert multi-TI to a single TI for a particular unit. The first horizontal protocol is simply the title next to a passive multi parametric table unit. This filters the unit which is next to the TI from multi-TI to a single TI.

It will be appreciated that there are 88 different parametric tables and each unit can be associated with single or multiple parametric tables.

It will be appreciated the horizontal protocols are used to establish the meaning of a unit in a particular context. The question then becomes if one has a unit how to establish the meaning of a unit in a context. In order to do this there are 13 generalized protocols that are used to identify the Single TI, STIs, or Multiple, MTIs, to which a unit applies. Thus protocols are utilized to find the corresponding single TI and thus the meaning of a unit.

In terms of filtering if one has a strong relationship such as the title of a URL and it is next to a passive multi TI unit meaning that the unit can belong to multiple TIs, then by placing the title next to a passive MTI unit it specifies a single TI for that passive MTI.

If one has an active TI next to a passive MTI one still specifies an STI for Unit X. On the other hand if one has an active TI next to an inferential MTI Unit X, that also specify a single TI. If one has an inferential TI next to a passive MTI one can still again specify an STI for Unit X. Likewise for a passive TI next to a passive MTI one can have a single TI for Unit X.

However, if one has an active or passive MTI, then assuming that one has established a nucleus if one has an ISH action unit and one can establish that the STI title is not altered by the ISH, therefore the unit with the ISH is still a single STI.

Another combination will be where a title is next to an inferential MTI which nonetheless results in a single STI for Unit X. Further the title can be next to an active MTI Unit X and this also specifies an STI Unit X.

There are other combinations which yield sums of units such that if Unit 1 is associated with TI 1 and Unit 2 is associated with an MTI then the sum of the units would be Unit 1 plus Unit 2 and results in an STI TI #1.

On the other hand if one has Unit 1 TI 3 and combines it with Unit 2 MTI then the sum of the units includes Unit 1+Unit 2 that establishes STI #1.

However, with Unit 1 TI #1 combined with Unit 2 an MTI unit involving for instance TI #3, then the sum of the units Unit 1+Unit 2 is established as STI #3.

Finally, when Unit 1 TI #3 is combined with Unit 2 MTI TI#3, then the combination is Unit 1+Unit 2 is STI #3.

What this shows is that with active and passive units of various strengths and with titles one can uniquely establish the context of a unit based on the above combinations.

Again referring to FIG. 22, after exercising the protocols a final result 810 is either an STI shown at 812 or an MTI shown at 814, where the MTI can either be a valid duality 816 or a non-valid duality 818. As shown at 820 the non-valid qualities are displayed. It will be appreciated one unit can have either a number of valid tables and therefore a valid duality or they do not have more than one valid table, in which case they do not have a valid duality. If the MTI does not result in a valid duality then it has not been filtered. When there is a valid duality the MTIs can go together.

Thus the final result as illustrated at 810 is where a single table indicator is indicated at 812 and a multi table indicator is indicated at 814. With the multi table indicators there can either be a valid duality as illustrated at 816 or there is no valid duality as illustrated at 818.

In this particular case shown at 818 there is no valid duality. The system acknowledges the TIs of the units for which there is no valid duality as illustrated at 820.

Thus there are three types of results: single TI, valid MTI or multi TI.

Figure 23:
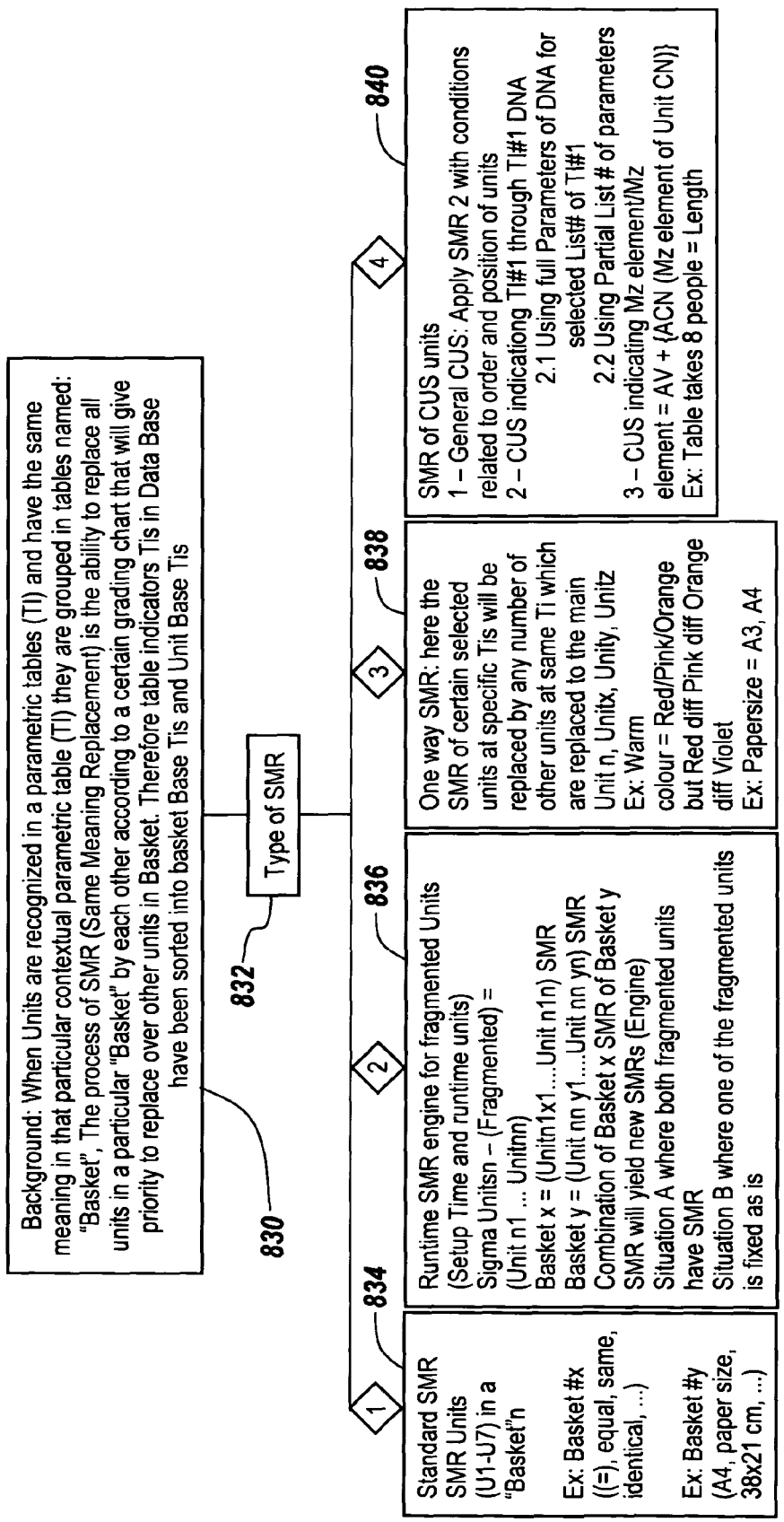
FIGS. 23 and 24 are diagrammatic illustrations of the same meaning replacement process for use in the system of FIGS. 1A and 1B.
Figure 24:
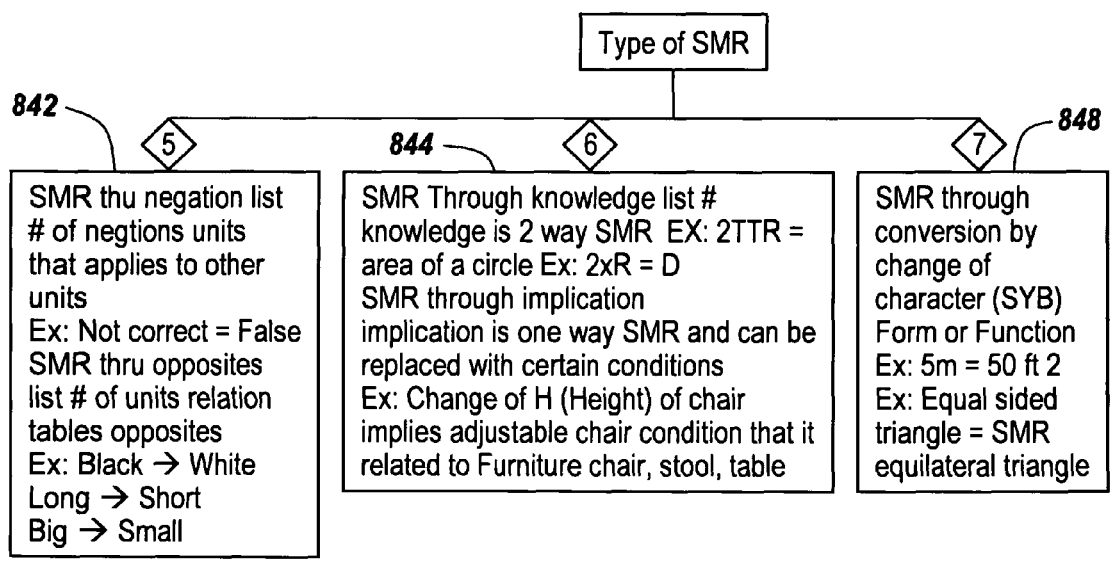

Now that one is able to establish a single table indicator one can establish Same Meaning Replacement as illustrated in FIG. 23 and FIG. 24. As will be seen there are such mechanisms to establish same meaning replacement.

As can be seen at 830 when the units are recognized parametric tables and have the same meaning in that particular contextual parametric table (TIs) are grouped into tables that are named a "basket". The purpose of the Same Meaning Replacement (SMR), is to generate maximum number of units that can replace a unit in the process of matching. The Same Meaning Replacement process has the ability to take all the units in a particular basket and replace them according to a certain grading chart that will give priority to replace other units in the basket and therefore have contextual meaning parametric table indicators or TIs in the database which have been sorted into basket based TIs and unit based TIs. The same meaning replacement is shown at 832 to be the result of processes 834, 836, 838, 840, 842, 844 and 848.

The first process 834 is a standard SMR process in which units U1-U7 are in a basket. This is merely the assigning of same meaning to a number of units.

If as illustrated at 836 one runs the SMR engine for fragmented units, and the Y basket is combined with the X basket, this will yield new same meaning replacement values. Thus one can have more than one same meaning replacement basket, with the combination of the baskets being utilized to process for instance fragmented units. It will be appreciated that with the fragments and there are many possibilities for same meaning replacements of the fragments.

There is also a so-called one-way SMR unit 838. One-way SMRs apply to the fact that when one has a more generic meaning, one can have a number of same meaning replacements which are less generic but one cannot go the other way from the less generic to the more generic.

As seen, there is the SMR of CUS units where CUS means Combined Unit Structures. In this case different units can give the same meaning to the units in the Combined Unit Structures.

Referring to FIG. 24, as can be seen at 842 there is a same meaning replacement through a negation list. This same meaning replacement can be the negative of the original meaning. One can make a same meaning replacement through the opposite or the negative of a meaning of a unit.

There is also as illustrated at 844 same meaning replacement through a knowledge list so that one can refer to a list and say this has the same meaning as that.

Finally, with respect to process 848 there is a same meaning replacement through conversion by the change of a character such as a symbol, form or function. Thus, one can get same meaning replacement through a mathematical formula in which the formula itself specifies the relationship. Thus, conversion tables such as numeric conversion tables can be utilized for same meaning replacements.

Relation

Figure 25:
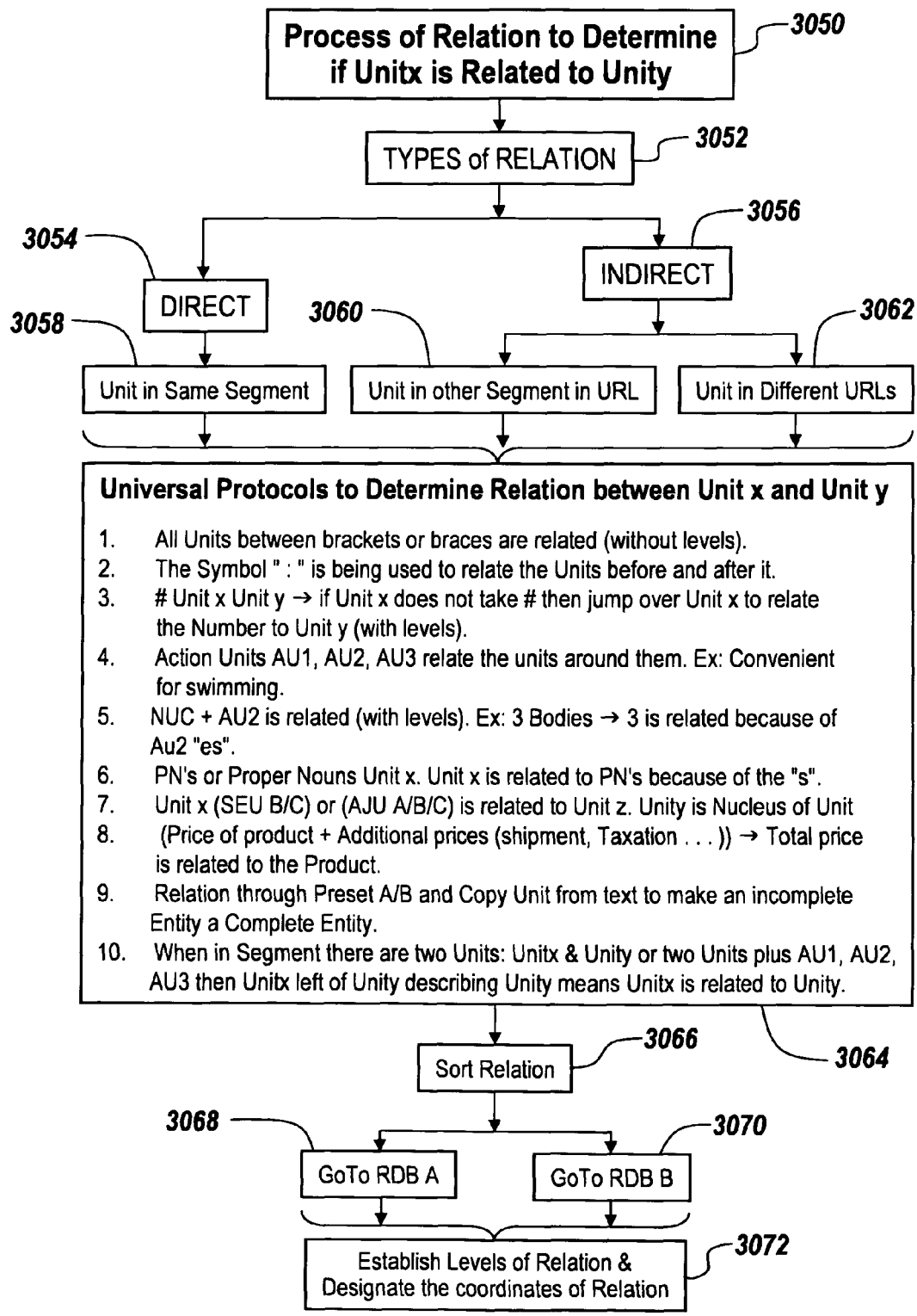
FIG. 25 is a diagrammatic illustration of the relation process used in the subject invention to ascertain if a Unit X is related to a Unit Y, showing both direct and indirect relation possibilities and universal protocols to determine the relation between Unit X and Unit Y ending in the establishment of levels of relation between the 2 units.

Referring to FIG. 25, as to the relation component of the matrix such as that shown in FIG. 8 the process 3050 of determining when a Unitx is related to unity starts with the types of relation 3052. It will be appreciated that there are two types of relations. One is a direct relation as illustrated at 3054 and the other is an indirect relation as illustrated at 3056.

Note, relation refers to a unit that describes another unit. When a unitx describes another unit, then that establishes a unit description tie (UDT) or relation level and when a unit that has been described has a certain leveln then the level of unitx will be leveln+1 or UDTn+1.

If there is a direct relation between Unitx and Unity then the unit is in the same segment as illustrated at 3058. However, if the units are only indirectly related then there is a unit like in another segment in the URL as illustrated at 3060 or the unit is in different URLs as illustrated at 3062. The indirect relationship is interesting because if the unit under question is in another segment of a URL they are indirectly related.

In order to determine the relationship between Unitx and Unity is illustrated at 3064 there are a series of protocols to establish relationships. This protocol list is self-explanatory such that at the end of the determination of whether or not there is a relationship between Unitx and Unity one sorts the relationships at 3066. The sorting of the relationships can result in relationships going to result database A as illustrated at 3068 or result database B as illustrated at 3070, with the levels of relation determining and designating the coordinates of the relation component of the matrix as illustrated 3072.

What will therefore be seen is that through the process of the relationship process one can specify the relationship of a Unitx to a Unity and thereby populate the appropriate relation component in the matrix.

Referring back to FIG. 2E the relationship plays a part in the "part of" process 202, the DNA process 204, the number protocols 206 and the entity protocols 208. Thus, the establishment of the relationship between two units can be called upon in other parts of the processing to be able to establish meaning.

Figure 26:
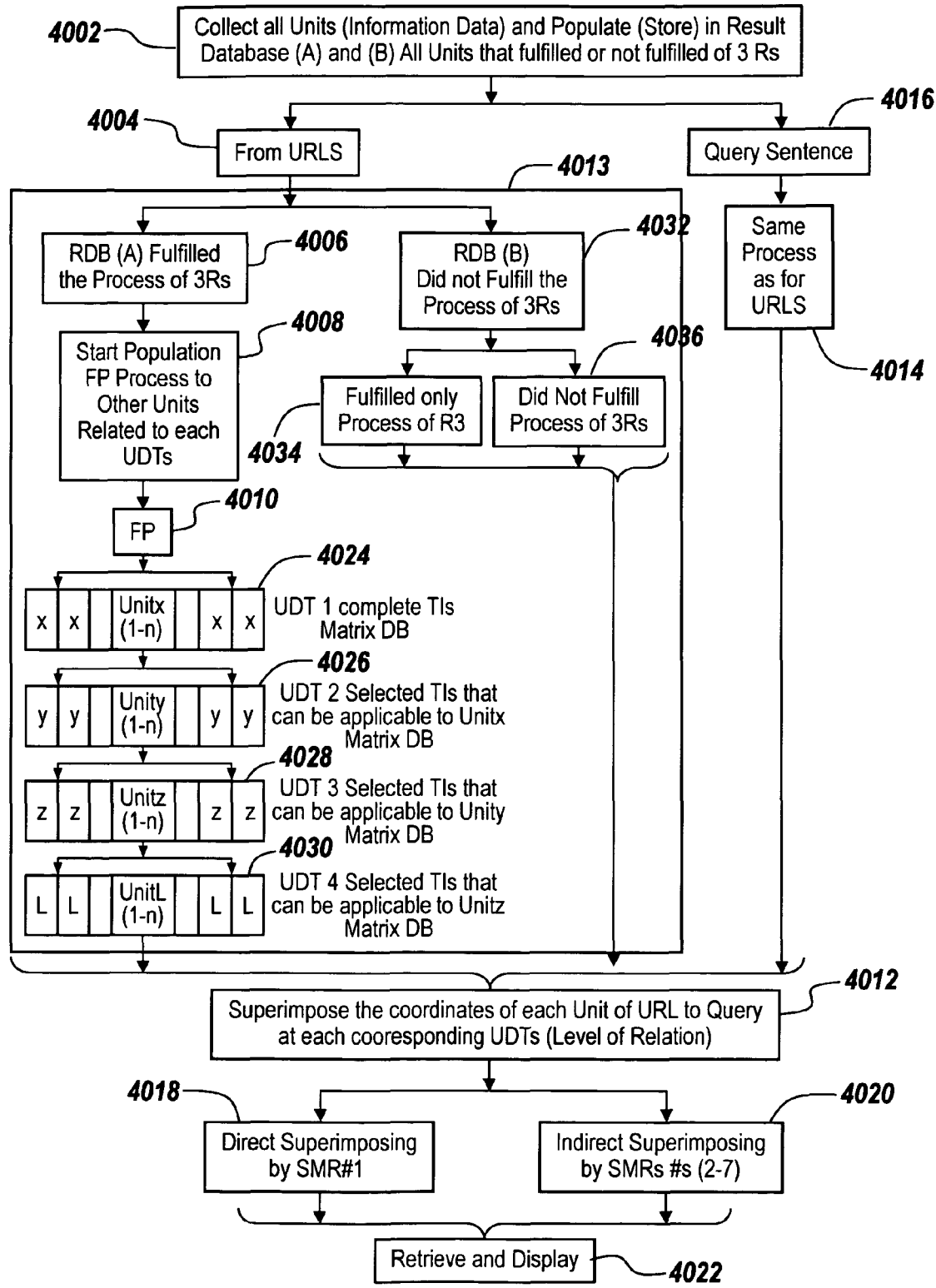
FIG. 26 is a diagrammatic illustration showing the population of the matrices of FIGS. 1A and 1B starting with the focal point and its associated contextual parametric tables, followed by units associated with the focal point and the unit's own contextual parametric tables, also showing the superposition of the coordinates in each of the matrices using same meaning replacement to be able to retrieve and display the results of a query.

While the result database has been previously described in FIG. 2G, referring now to FIG. 26 how the results are collect and displayed is now more fully described.

Population and Retrieval

What is now described is the process for populating the matrices from the point of view of a focal point. It will be appreciated that for each focal point there are various branchings from the focal point which further describe the words related to the focal point. For instance, for Unit Description Type 1 or UDT1 there can be a complete description of the focal point and its branching.

For each of the units in the focal point branch there may be likewise a branching to describe the particular URL or query. This is shown at 4026 for URLs in which it will be noted that sub matrix 4026 describes a unit in the primary focal point matrix.

Likewise as shown at 4028 for the unit described at 4026 there may be other units that may be related or describe it according to the UDT level designated. Finally as shown at 4030 the particular unit described in 4028 there is a further branch in accordance with another UDT level such that upon populating of the matrix with all of these sub matrices one has a complete description of either the URL or Query. If one refers back to FIG. 8 it will be seen that there is a focal point 1 with a UDT running to a point 1.2 which is in turn branched to another focal point 1.2.1 which is in turn branched to focal point 1.2.1.1 finally branched to a focal point 1.2.1.1.1. Each of these focal points is at a different level from the primary focal point 1. However, the description of the URL or query is based on the focal point and all of the sub focal points at various levels as described in FIG. 8.

In short, one populates the URL database or the Query database with a series of matrix values for a number of levels corresponding to the focal point and the sub focal points, with the values being determined by selected parametric tables. Thus if one goes from for instance the outer ring or level of FIG. 8 to the focal point one can see that the outer ring is composed of all of the intermediate units and their related parametric tables that relate to the primary focal point. As a result each unit will have its own coordinates at that particular level.

More particularly, the purpose of the result database is to make sure that it is populated such that the result databases are filled or not filled at the 3 Rs of the matrix namely the read, recognize and relation values. This is shown at 4002. From the URL point of view the population of database A and database B shown at 4004 are for instance the matrices of FIG. 2G. From the URLs the result database A is filled at 4006 utilizing the process of the 3Rs mentioned above.

The population is started utilizing the Focal Point followed by population unitsx (1-n) into matrix DB 4024 that have coordinates related to the Focal Point at unit description tie UDT1 or relation level1 shown at FIG. 8.

Then through branching all unitsy(1-n) at selected matrix DB 4026 are populated into that database that have coordinates related to unitsx at UDT2 or relation level2.

Further branching populates all unitsz(1-n) into selected matrix DB 4028 that have coordinates related to unitsy at UDT3 or relation level 3.

The same applies to units L(1-n) that are populated into database 4030.

Those units that did not fulfill the 3Rs process are shown at 4032. As shown at 4034 for units that partially fulfill the relation process this unit is at least partially related. Here the partial relation is the R3 relation.

For those units that do not fulfill the 3Rs process, then they are designated at 4036 and are returned as key words only.

Note that the TIs in a matrix always are a result of the 88 parametric tables TIs.

It will be appreciated that what is shown is the ability to cascade the results into a final matrix based on a number of sub matrices within the process. What is then shown as illustrated at 4012 is the super position of the coordinates of each unit of a URL to a query at each corresponding UDT in relation to the level of relation that exists. It will be appreciated that the process for the Query Sentence 4016 shown in box 4014 is identical to that for the URLs i.e. in box 4013.

After the super position there is a direct superimposing basket 4018 and indirect superimposing basket 4020, in which the superimposing is accomplished using the same meaning replacements described above.

Finally, as illustrated at 4022 the results of the superposition are displayed by returning an answer to a query.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method of using a text-based search engine implemented on a data processing machine having non-transitory memory, the method comprising:
    conducting a query answer process for understanding text by converting a query text and an answer text in to corresponding numerical values using a number encoding process by numerically encoding the query text and the answer text with numerical values that reflect an accurate, contextual understanding of the query text and the answer text, wherein the number encoding process uses a read process, a recognize process and a relate process;
    populating an answer matrix and a query matrix with the numerical values corresponding to the query text and the answer text, respectively, whereby the numerical values are populated in the answer matrix and the query matrix as matrix coordinates values;
    comparing the matrix coordinate values in the answer matrix and the matrix coordinate values in the query matrix to ascertain a match therebetween; and
    providing a results matrix upon ascertaining the match between matrix coordinate values of the answer matrix and the query matrix, wherein the results matrix provides a contextual, non-natural language understanding of the query text, which is used to provide a contextual, natural language response to the query text displayable to a user.

2. The method of claim 1, wherein converting the query text and the answer text using the number encoding process uses at least one mold to reflect the accurate, contextual understanding of the query text and the answer text.

3. The method of claim 1, wherein converting the query text and the answer text using the number encoding process includes determining an existence of an entity or a completion of an entity.

4. The method of claim 1, wherein converting the query text and the answer text using the number encoding process includes contextual parametric tables to classify the numerical values of the query text and the answer text into predetermined contexts.

5. The method of claim 1, wherein converting the query text and the answer text using the number encoding process includes a filter for determining different contextual meanings of at least one of the query text and the answer text.

6. The method of claim 1, converting the query text and the answer text using the number encoding process includes a same meaning replacement process for determining all possible ways that the numerical values of the query text and the answer text can be substituted for another numerical value of the query text and the answer text.

7. The method of claim 1, wherein converting the query text and the answer text using the number encoding process includes a focal point detecting process.

8. The method of claim 7, wherein the relate process establishes a relationship between the query text and the answer text at different levels.

9. The method of claim 8 wherein the different levels start at a focal point.

10. The method of claim 1, wherein comparing the matrix coordinate values in the answer matrix and the matrix coordinate values in the query matrix further includes a result database matrix having at least two sections, a first of the at least two sections containing coordinates of at least one of the query text and the answer text for which values correspond to the matrix coordinate values in the answer matrix and the matrix coordinate values in the query matrix, respectively, associated with the read process, the recognize process and the relate process, and wherein a second of the at least two sections correspond to at least one of the query text and the answer text which does not completely satisfy the read process, the recognize process, and the relate process.

11. The engine method of claim 10, further comprising comparing the values in the first of the at least two sections of the results database matrix to see if there is a match between the matrix coordinate values in the answer matrix and the matrix coordinate values in the query matrix.

12. The method of claim 11, further comprising ascertaining a level of the match between the matrix coordinate values in the answer matrix and the matrix coordinate values in the query matrix.

13. The method of claim 1, wherein converting the query text and the answer text using the number encoding process utilizes databases and further includes a no-database process for determining when at least one of the query text and the answer text is not captured in any one of the databases.

14. The method of claim 1, wherein converting the query text and the answer text using the number encoding process converts the query text and the answer text into units comprising letters, numbers, symbols and spaces.

15. The method of claim 14, wherein the units are characterized in terms of combinations of units.

16. The method of claim 15, wherein the units further comprises at least seven types of units.

17. The method of claim 14, wherein the at least seven types of units further comprise at least thirty-six possible forms of units.

18. The method of claim 17, wherein the at least thirty-six possible forms of units form a basis of acknowledging any associated natural language words.

\* \* \* \* \*